US012623369B2

(12) United States Patent
Zhang et al.

(10) Patent No.: US 12,623,369 B2
(45) Date of Patent: May 12, 2026

(54) CONTAINER, COVER AND CHAINSAW

(71) Applicant: Greenworks (Jiangsu) Co., Ltd., Changzhou (CN)

(72) Inventors: Lingao Zhang, Changzhou (CN); Jun Shen, Changzhou (CN); Jingshan Li, Changzhou (CN); Shu Huang, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 219 days.

(21) Appl. No.: 18/452,571

(22) Filed: Aug. 21, 2023

(65) Prior Publication Data

US 2023/0398712 A1 Dec. 14, 2023

Related U.S. Application Data

(63) Continuation of application No. PCT/CN2022/080098, filed on Mar. 10, 2022.

(30) Foreign Application Priority Data

| | | |
|---|---|---|
| Mar. 12, 2021 | (CN) | 202110270231.4 |
| Mar. 12, 2021 | (CN) | 202120520553.5 |
| Mar. 12, 2021 | (CN) | 202120522708.9 |
| Apr. 8, 2021 | (CN) | 202120707984.2 |
| Apr. 8, 2021 | (CN) | 202120708037.5 |
| Apr. 19, 2021 | (CN) | 202110420249.8 |

(Continued)

(51) Int. Cl.
*B27B 17/12* (2006.01)
*B27B 17/08* (2006.01)

(52) U.S. Cl.
CPC ............ *B27B 17/12* (2013.01); *B27B 17/083* (2013.01)

(58) Field of Classification Search
CPC ...................................................... B27B 17/12
See application file for complete search history.

(56) References Cited

U.S. PATENT DOCUMENTS 1,701,726 A * 2/1929 Mould ...................... F16N 7/36 184/13.1
2,688,989 A * 9/1954 Smith ..................... B27B 17/12 30/515

(Continued)

FOREIGN PATENT DOCUMENTS

CN 107120510 A 9/2017
CN 207099788 U 3/2018

(Continued)

*Primary Examiner* — Michael A Riegelman

(57) ABSTRACT

The disclosure provides a container, a cover and a chainsaw. The container includes a box body, a cover, a suction device, a first tube and a second tube. The box body is provided with a liquid storage cavity provided with a liquid filling opening and a liquid suction opening. The cover is detachably mounted on the liquid filling opening and is provided with a one-way ventilation structure. The suction device is arranged outside the box body. One end of the first tube is connected with the liquid suction opening, and the other end is connected with a liquid suction port of the suction device. One end of the second tube is connected with a liquid drainage port of the suction device, and the other end extends to a part to be lubricated or cooled of the cutting tool.

7 Claims, 30 Drawing Sheets

(30) Foreign Application Priority Data

Apr. 19, 2021 (CN) ......................... 202120797983.1
Aug. 13, 2021 (CN) ........................ 202121895190.X

(56) References Cited

U.S. PATENT DOCUMENTS 3,044,506 A * 7/1962 Oehrli ..................... B27B 17/12 30/387
3,777,848 A * 12/1973 Schaeffer ............... F01M 11/10 123/41.86
3,938,692 A * 2/1976 Crute ................. B60K 15/0406 137/533.15
4,353,163 A * 10/1982 Overbury ................ F16N 27/00 137/543.13
4,401,093 A * 8/1983 Gates, Jr. ........... F01M 13/0405 123/573
4,540,103 A * 9/1985 Kasugai ............. B60K 15/0406 220/203.23
4,572,396 A * 2/1986 Kasugai ............. B60K 15/0406 220/203.25
4,600,042 A * 7/1986 York ...................... F01M 11/04 141/330
4,802,555 A * 2/1989 Matsunaga ............. B27B 17/12 184/55.1
4,867,337 A * 9/1989 Eichenseer .......... B65D 55/165 220/375
5,341,951 A * 8/1994 Springston ......... F01M 13/0405 220/374
5,718,050 A * 2/1998 Keller ...................... A01G 3/08 30/296.1
5,907,284 A * 5/1999 Israel ................. B60K 15/0409 340/693.9
6,015,444 A * 1/2000 Craft ..................... F16H 57/027 74/606 R
6,508,374 B1 * 1/2003 Griffin ............... B60K 15/0406 220/288
7,954,660 B2 * 6/2011 Fishman ............ B60K 15/0406 220/304
8,672,162 B2 * 3/2014 Okouchi ................... B25F 5/00 220/203.14
9,010,365 B2 * 4/2015 Cella ..................... B60T 17/222 60/453
9,403,226 B2 * 8/2016 Fu ........................ B23D 57/023
10,307,931 B2 * 6/2019 Haney ...................... F16N 7/385
11,267,160 B2 * 3/2022 Bylund .................. B23D 59/04
11,543,125 B2 * 1/2023 Cervantes ................. F23K 5/18
11,713,699 B2 * 8/2023 Bykowski ............ B01D 35/306 184/6.5
12,370,714 B2 * 7/2025 King ....................... F16N 13/06
2002/0017024 A1 * 2/2002 Uhl ......................... B27B 17/00 30/123.4
2008/0237179 A1 * 10/2008 Fishman ............ B60K 15/0406 215/344
2010/0043234 A1 * 2/2010 Pellenc ................... B27B 17/12 30/515
2013/0320016 A1 * 12/2013 Schiel ..................... B60T 11/26 220/288
2014/0163781 A1 6/2014 Vian et al.
2015/0107938 A1 * 4/2015 Cervenka ................. B62J 31/00 184/55.1
2015/0298344 A1 * 10/2015 Hallendorff ............. F16N 19/00 184/15.1
2016/0129570 A1 * 5/2016 Marchiando ........ B25B 27/0042 81/3.29
2017/0021523 A1 * 1/2017 Haney ..................... B27B 17/12
2017/0066119 A1 * 3/2017 Fu ........................... B25F 5/008
2019/0100310 A1 4/2019 Flood et al.
2019/0200534 A1 7/2019 Hawkins
2023/0398712 A1 * 12/2023 Zhang .................. B27G 19/003
2024/0075649 A1 * 3/2024 Yu ........................... B27B 17/12
2025/0100174 A1 * 3/2025 Krantz .................... B27B 17/12

FOREIGN PATENT DOCUMENTS

CN 210615352 U 5/2020
CN 113001480 A 6/2021
CN 113118554 A 7/2021
CN 214430394 U 10/2021
CN 214482361 U 10/2021
CN 214593308 U 11/2021
CN 214618953 U 11/2021
CN 214772616 U 11/2021
CN 215702396 U 2/2022
DE 102018210195 A1 12/2019
EP 3175700 A1 6/2017
WO WO-2022188828 A1 * 9/2022 ................ B25F 5/02

* cited by examiner

CONTAINER, COVER AND CHAINSAW

CROSS REFERENCE TO RELATED APPLICATION

The present application is a Continuation application of PCT application No. PCT/CN2022/080098 filed on Mar. 10, 2022, which claims the benefit of CN202120522708.9 filed on Mar. 12, 2021, CN202110270231.4 filed on Mar. 12, 2021, CN202120520553.5 filed on Mar. 12, 2021, CN202110420249.8 filed on Apr. 19 12, 2021, CN202120797983.1 filed on Apr. 19 12, 2021, CN202120708037.5 filed on Apr. 8, 2021, CN202120707984.2 filed on Apr. 8, 2021, CN202121895190.X filed on Aug. 13, 2021. All the above are hereby incorporated by reference.

TECHNICAL FIELD

The disclosure relates to a technical field of cutting machine, specifically relates to a container, a cover and a chainsaw.

BACKGROUND

With the development of mechanization, hand-held cutting devices have been widely used. Conventional hand-held cutting devices, such as chainsaws, include a motor, a saw chain and a container. The motor drives the saw chain for cutting. Containers are often used to store lubricating oils for lubricating the saw chains. When the chainsaw is in a working state, a suction device is required to pump the lubricating oil in the container to the saw chain. However, the cover of the conventional container is mostly sealed on the liquid filling opening of the container, and the air cannot be replenished in time when the suction device is sucking. Although there are air supplement holes on the cover, it is easy to cause the lubricating oil to overflow from the air supplement holes, which results in leakage pollution. Thus it is necessary to provide a container, a cover and a cutting tool.

With the improvement of people's life, more and more electric cutting tools are used in garden and housework, such as chainsaws, hedge trimmers and cutting saws, etc. The hand-held power tools are required to stop the cutting operation in the case of a severe impact such as falling or logging. In the process of violent acceleration operation, the braking device is started to brake the cutting assembly through the inertia of the recoil or the impact of the protective shield, so that the power assembly stops rotating, thereby achieving the function of braking. Moreover, dust and wood chips are likely to enter the gap between the conventional protective shield and the housing, thereby affecting the performance of the whole machine. And there are assembly errors or assembly size errors in the assembly process, these errors will lead to failure of the electronic braking system of the braking device of the power tool. Therefore, it is necessary to provide a braking device, a trigger and a chainsaw to improve the above situations.

In addition, the safety of the tool operator must also be considered. The conventional chainsaw is driven by the motor to move the sprocket, and the sprocket teeth drive the chain transmission teeth to move the chain to achieve the cutting function. The function of the sprocket gasket is to be fixed on the end surface of the sprocket teeth of the sprocket disc, which may strengthen the chain and prevent the chain from running away. The sprocket disc and the sprocket gasket are fixed on the same output shaft. Since there is an assembly gap between the sprocket disc and the sprocket gasket of the conventional structure, and the outer diameter of the conventional sprocket gasket is the same as or close to the outer diameter of the sprocket teeth. During the movement of the chain, the transmission teeth of the chain are often caught in the gap between the sprocket disc and the sprocket gasket, causing the chain to be stuck and even high-risk failures such as chain running, chain jumping, and de-chaining. The chainsaw needs to be paused or turned on frequently during use, and the load of the chainsaw frequently braking or blocking is directly loaded on the motor shaft and the rest of the mechanical structure, which is easy to cause damage to the mechanical structure. And most conventional chainsaws integrate the braking handle and the protective shield together, if the chainsaw encounters a relatively hard object such as a tree knot or a metal object when cutting trees, the chainsaw may jump in the direction of the operator's body, On the one hand, the operator may push the protective shield, which enables the chainsaw to execute emergency brake and stops the chain movement in a very short time. On the other hand, the protective shield integrated on the braking handle may block the sawdust from cutting or prevents the operator from being cut by the chain. At the same time, the conventional chainsaw will generate a lot of sawdust during use, and some sawdust will enter the chainsaw body from the rotation position of the rotatable braking handle, threaten the operation of the internal brake and transmission structure of the chainsaw, and reduce the service life of the chainsaw. Therefore, it is necessary to provide a chainsaw to improve the problems mentioned above.

SUMMARY

The disclosure provides a container and a cutting tool with the container to improve the problem that the conventional containers used for cutting tools cannot be filled with air in time or are likely to cause leakage pollution.

The disclosure provides a container for a cutting tool and the cutting tool with the container. The container includes a box body, a cover, a suction device, a first tube and a second tube. The box body is provided with a liquid storage cavity, the liquid storage cavity is provided with a liquid filling opening and a liquid suction opening. The cover is detachably mounted on the liquid filling opening, and the cover is provided with a one-way ventilation structure. The suction device is arranged outside the box body. One end of the first tube is connected with the liquid suction opening, and the other end of the first tube is connected with a liquid suction port of the suction device. One end of the second tube is connected with a liquid drainage port of the suction device, and the other end of the second tube extends to a part to be lubricated or cooled of the cutting tool.

In an embodiment of the disclosure, the cover is provided with an external thread matched with the liquid filling opening, the external thread is provided with a screw positioning rib, the liquid filling opening is provided with an internal thread, and when the cover is screwed to a set position, an end of the internal thread facing the cover side abuts on the screw positioning rib.

In an embodiment of the disclosure, when the cover is screwed to the set position, a rotational torque of the cover is from 4 N·m to 7 N·m.

In an embodiment of the disclosure, the cover further comprises a flip cover rotatably connected and mounted on the cover, the flip cover is provided with a protruding structure, the cover is provided with an groove, ends of the groove are respectively provided with a first limiting groove and a second limiting groove, the first limiting groove and the second limiting groove are separated from the groove by the protruding structure, the flip cover rotates to enable the protruding structure to slide back and forth in the groove, the protruding structure is located in the first limiting groove where the flip cover is fully closed, and the protruding structure is located in the second limiting groove where the flip cover is fully opened.

In an embodiment of the disclosure, a filter device is arranged at an end of the first tube connected with the liquid suction opening.

In an embodiment of the disclosure, the filter device includes a filter tip and a filter screen.

In an embodiment of the disclosure, the one-way ventilation structure includes a through hole arranged on the cover and a one-way valve mounted in the through hole, and the one-way valve allows air to enter from an outside of the container to an inside of the container.

In an embodiment of the disclosure, a filter part to filter air is mounted on a side of the one-way valve away from an oil storage cavity of the container.

In an embodiment of the disclosure, the cover is provided with a sinking groove matched with a disassembling tool.

In an embodiment of the disclosure, the cover further includes a pulling wire to prevent the cover from being lost.

In an embodiment of the disclosure, one end of the pulling wire is connected with the cover, and the other end of the pulling wire extends into the liquid filling opening and is connected with a blocking part that may enter the container.

In an embodiment of the disclosure, the blocking part is an elastically deformable bracket.

In an embodiment of the disclosure, the blocking part is a blocking rod, the pulling wire is connected with a middle of the blocking rod, the blocking rod may enter the liquid filling opening and is blocked by the liquid filling opening when lifted.

In an embodiment of the disclosure, the cover is provided with a sealing part.

In an embodiment of the disclosure, the cover is provided with an annular protrusion, the sealing part is provided with an annular groove, the sealing part is arranged on the annular protrusion in a wrapping way, and a sealing structure is defined between a side of the sealing part facing the liquid filling opening and the container.

The disclosure further provides a cutting tool. The cutting tool includes a housing, a handle, a cutter assembly, a power assembly and a container. The container is arranged on the housing. The container includes a box body, a cover, a suction device, a first tube and a second tube. The box body is provided with a liquid storage cavity, the liquid storage cavity is provided with a liquid filling opening and a liquid suction opening. The cover is detachably mounted on the liquid filling opening, and the cover is provided with a one-way ventilation structure. The suction device is arranged outside the box body. One end of the first tube is connected with the liquid suction opening, and the other end of the first tube is connected with a liquid suction port of the suction device. One end of the second tube is connected with a liquid drainage port of the suction device, and the other end of the second tube extends to a part to be lubricated or cooled of the cutting tool.

In an embodiment of the cutting tool of the disclosure, the cover of the container is provided with an external thread matched with the liquid filling opening, the external thread is provided with a screw positioning rib, the liquid filling opening is provided with an internal thread, and when the cover is screwed to a set position, an end of the internal thread facing the cover side abuts on the screw positioning rib.

In an embodiment of the cutting tool of the disclosure, the container is fixedly mounted inside the housing, the box body of the container is partially exposed to show an oil quantity or a scale line indicating a liquid level, and the liquid filling opening and the cover are exposed outside the housing.

In an embodiment of the cutting tool of the disclosure, the container is arranged close to the power assembly.

The cover of the container of the disclosure is provided with the one-way ventilation structure, which may allow air to enter from the outside of the container, but may prevent the liquid in the container from overflowing from the one-way ventilation structure, which not only can replenish the air in time during a suction process of the suction device, but also can prevent the liquid in the container from overflowing, thereby causing loss and leakage pollution. The cutting tool of the disclosure is provided with the container of the disclosure, which may lubricate or cool required parts through the container, and can replenish the air through the one-way ventilation structure arranged on the container. In this way, not only a reliability of air replenishment is high, but also an anti-pollution ability of lubricating oil is strong.

Considering that the conventional covers are mostly mounted on the opening of the container through a threaded connection, and the covers are manually tightened, however, since a manual tightening strength varies from person to person, a tightening state of the covers are different. If the manual tightening strength is small, it is often not tightened tightly, and a sealing effect is poor. If the manual tightening strength is large, it is often over-tightened. In addition to an adhesion of lubricating oil, it is difficult to open it again. The disclosure provides a cover and a cutting tool with the cover, so as to improve the problem that a tightening position of the conventional cover cannot be accurately determined when the cover is rotated and tightened and the tightening state is different.

The cover includes a rotational tightening part and a one-way ventilation structure. The rotational tightening part is provided with an enternal thread matched with an internal thread of a liquid filling opening of a container. The one-way ventilation structure is arranged on the rotational tightening part. An end of the external thread is provided with a screw positioning rib, when the rotational tightening part is screwed to a set position, an end of the internal thread facing a side of the rotational tightening part abuts against the screw positioning rib.

In an embodiment of the disclosure, the cover further includes a flip cover rotatably connected and mounted on the rotational tightening part, the flip cover is provided with a protruding structure, the rotational tightening part is provided with an arc-shaped groove, both ends of the arc-shaped groove are respectively provided with a first limiting groove and a second limiting groove. The first limiting groove and the second limiting groove are separated from the arc-shaped groove through a limiting protrusion. The flip cover rotates to enable the protruding structure to slide back and forth in the arc-shaped groove, the protruding structure is located in the first limiting groove where the flip cover is fully closed, and the protruding structure is located in the second limiting groove where the flip cover is fully opened.

In an embodiment of the disclosure, the one-way ventilation structure includes a through hole arranged on the rotational tightening part and a one-way valve mounted in the through hole, and the one-way valve allows the air to enter from the outside of the container to the inside of the container.

In an embodiment of the disclosure, a filter part to filter the air is mounted on a side of the one-way valve away from an oil storage cavity of the container.

In an embodiment of the disclosure, the rotational tightening part is provided with a sinking groove matched with a disassembling tool.

In an embodiment of the disclosure, the cover further includes a pulling wire to prevent the cover from being lost.

In an embodiment of the disclosure, one end of the pulling wire is connected with the rotational tightening part, and the other end of the pulling wire extends into the liquid filling opening of the container and is connected with a blocking part that may enter the container.

In an embodiment of the disclosure, the blocking part is an elastically deformable bracket.

In an embodiment of the disclosure, the blocking part is a blocking rod, the pulling wire is connected with a middle of the blocking rod, the blocking rod may enter the liquid filling opening of the container and is blocked by the liquid filling opening of the container when lifted.

In an embodiment of the disclosure, the cover is provided with a sealing part.

In an embodiment of the disclosure, the cover is provided with an annular protrusion, the sealing part is provided with an annular groove, the sealing part is arranged on the annular protrusion via covering ways, and a sealing structure is defined between a side of the sealing part facing the liquid filling opening of the container and the container.

In an embodiment of the disclosure, an end of the internal thread facing the cover side abuts on the screw positioning rib, and a rotational torque of the cover is from 4 N·m to 7 N·m.

The disclosure further provides a cutting tool. The cutting tool includes a housing, a handle, a cutter assembly and a power assembly. A container for lubricating or cooling the cutter assembly is mounted on the cutting tool. Any one of the above-mentioned covers is mounted on the container.

In summary, the cover of the disclosure is provided with the screw positioning rib, and a corresponding position of the liquid filling opening of the container is provided with the limiting groove matched with the screw positioning rib. When reaching the set tightening position, the screw positioning rib is tightened into the limiting groove to stop a limit of screwing, so that the screwing and tightening between the cover and the liquid filling opening of the container can meet the set screwing requirements, which enables the cover and the liquid filling opening of the container can be kept neither loose nor tight. The cutting tool of the disclosure has a high limiting reliability when the cover is tightened, and the cover is provided with the one-way ventilation structure, so that the cutting tool can be lubricated or cooled smoothly, and the reliability is relatively high.

In addition, with the improvement of people's life, more and more power cutting tools are used in garden and housework, such as chainsaws, hedge trimmers and cutting saws, etc. These hand-held power tools utilize power assemblies to drive chains or cutters for cutting, generally for cutting branches and wood, but also for cutting bricks, cement, etc. In the process of use, the hand-held power tools are required to stop the cutting operation in the case of a severe impact such as falling or logging. In the process of violent acceleration operation, the braking device is started to brake the cutting assembly through the inertia of the recoil or the impact of the protective shield, so that the power assembly stops rotating, thereby achieving the function of braking. Therefore, the disclosure further provides a braking device and a cutting tool. With the braking device of the disclosure, an operability and accuracy of the braking device and the cutting tool may be increased.

The braking device includes a protective shield, a braking component, a braking switch and a switch trigger part. One end of the protective shield is axially connected with a housing of the cutting tool and can rotating about a connecting shaft thereof. The braking component is connected with one side of a protective shield body. The braking switch is mounted on the housing and is located on a side of the braking component away from the protective shield body. The switch trigger part is rotatably connected with the braking switch. The switch trigger part is close to the braking component and keeps a predetermined distance from the braking component.

In an embodiment of the braking device of the disclosure, a side of the braking component close to the switch trigger part is arc-shaped.

In an embodiment of the braking device of the disclosure, one end of the switch trigger part close to the braking component is arc-shaped, the arc-shaped end of the switch trigger part and the arc-shaped side of the braking component are concentric circles, and the arc-shaped end of the switch trigger part is arranged in parallel with the arc-shaped side of the braking component.

In an embodiment of the braking device of the disclosure, the braking switch further includes an elastic structure, and the elastic structure is located between the switch trigger part and the braking switch.

In an embodiment of the braking device of the disclosure, the protective shield further includes a limiting protruding block, and the limiting protruding block is arranged on an end surface of the protective shield close to the connecting shaft.

In an embodiment of the braking device of the disclosure, the braking device further includes a leaf spring, and the leaf spring is located on a side of the limiting protruding block away from the connecting shaft.

In an embodiment of the braking device of the disclosure, the braking device further includes a connecting plate, and the connecting plate is arranged on the limiting protruding block and covers a contact surface of the limiting protruding block and the leaf spring.

In an embodiment of the braking device of the disclosure, one end of the protective shield is provided with a through hole to axially connect the protective shield and a housing.

In an embodiment of the braking device of the disclosure, the limiting protruding block includes a first plane and a second plane, and the first plane is a plane close to the housing, and the second plane is a plane away from the housing.

In an embodiment of the braking device of the disclosure, the first plane is provided with two L-shaped concave parts, back surfaces of the two L-shaped concave parts are opposite to each other and symmetrically arranged on the first plane, the two L-shaped concave parts are kept in a predetermined distance, and a depth of the L-shaped concave parts is a first depth.

In an embodiment of the braking device of the disclosure, a first concave part is arranged on the first plane, and the first concave part is arranged between the two L-shaped concave parts and communicates with the two L-shaped concave parts.

In an embodiment of the braking device of the disclosure, a bottom surface of the first concave part is a stepped surface; on a side close to a top of the L-shaped concave part, a depth of the first concave part is less than half of the first depth; on a side close to a bottom of the L-shaped concave part, and the depth of the first concave part is greater than three-quarters of the first depth.

In an embodiment of the braking device of the disclosure, the connecting plate includes a main body, and the main body is attached to a side surface of the limiting protruding block.

In an embodiment of the braking device of the disclosure, the main body is U-shaped, the connecting plate comprises two symmetrical clamping components, the clamping components are extended curved surfaces at both ends of the main body, the clamping components are L-shaped, and the clamping components are arranged corresponding to the L-shaped concave parts.

In an embodiment of the braking device of the disclosure, the housing is provided with a third dust-proof rib and a fourth dust-proof rib, the third dust-proof rib and the fourth dust-proof rib are arranged in a gap between the protective shield and a nearest rib on the housing.

In an embodiment of the braking device of the disclosure, the housing is provided with a first dust-proof rib, the first dust-proof rib is located at a gap between the protective shield and the housing, and when the protective shield is in a first position, the first dust-proof rib, the third dust-proof rib and the fourth dust-proof rib enable an interior of the housing to be closed.

In an embodiment of the braking device of the disclosure, the protective shield is provided with a second dust-proof rib, the second dust-proof rib is located at the gap between the protective shield and the housing, and when the protective shield is in a second position, the second dust-proof rib, the third dust-proof rib and the fourth dust-proof rib enable the interior of the housing to be closed.

The disclosure further provides a cutting tool. The cutting tool includes a braking device, a power assembly, a controller and a cutter assembly. The braking device includes a protective shield, a braking component, a braking switch, and a switch trigger part. One end of the protective shield is axially connected with a housing and can rotate about a connecting shaft. The braking component is connected with one side of a protective shield body. The braking switch is mounted on the housing and is located on a side of the braking component away from the protective shield body. The switch trigger part is rotatably connected with the braking switch, the switch trigger part is close to the braking component and keeps a predetermined distance from the braking component. The controller is connected with the braking switch. The power assembly is connected with the controller. The cutter assembly is connected with the power assembly.

With the braking device of the disclosure, the side of the braking component in contact with the braking switch is set to be circular arc-shaped, and at the same time, the side of the switch trigger part that is in contact with the braking component is set to be circular arc-shaped. Further, a contact between the braking switch and the braking component is set as a line-to-surface contact, so as to ensure that the braking component can trigger the switch trigger part without over-triggering. At the same time, a contact end of the switch trigger part and the braking component is concentric and arranged in parallel, so as to ensure the maximum safety distance between the braking component and the switch trigger part. It is ensured that the braking switch will not be triggered by mistake. Through the braking device provided by the disclosure, a precise control of the braking switch is realized.

Considering that the conventional protective shield is generally a plastic protective shield, a thrust will be reduced after the protective shield is pushed and worn for many times, which will affect a duration life of the protective shield and enable the cutting tool not to meet the safety requirements, thereby reducing the duration life of the protective shield and the cutting tool. The disclosure provides a trigger and a cutting tool. The trigger of the disclosure may increase the duration life of the protective shied.

The trigger includes a protective shield, a limiting protruding block, a leaf spring, and a connecting plate. One end of the protective shield is axially connected with a housing and can rotate about a connecting shaft. The limiting protruding block is arranged on an end surface of the protective shield close to the connecting shaft. The leaf spring is located on a side of the limiting protruding block away from the connecting shaft and is provided with a protruding part. The protruding part is close to the limiting protruding block, and a distance between the protruding part and the limiting protruding block is less than a length of the limiting protruding block. The connecting plate is arranged on the limiting protruding block and covers a contact surface of the limiting protruding block and the leaf spring.

In an embodiment of the trigger of the disclosure, one end of the protective shield is provided with a through hole to axially connect the protective shield and a housing.

In an embodiment of the trigger of the disclosure, the limiting protruding block is located on an end surface of the through hole.

In an embodiment of the trigger of the disclosure, the limiting protruding block includes a first plane and a second plane, the first plane is a plane close to the housing, and the second plane is a plane away from the housing.

In an embodiment of the trigger of the disclosure, the limiting protruding block includes a first side surface, a second side surface and a third side surface, the first side surface and the second side surface are connected with the end surface of the through hole, the third side surface is smoothly connected with the first side surface and the second side surface, and the first side surface, the second side and the third side define a U-shaped structure.

In an embodiment of the trigger of the disclosure, the first plane is provided with two L-shaped concave parts, back surfaces of the two L-shaped concave parts are opposite to each other and symmetrically arranged on the first plane, and the two L-shaped concave parts are kept in a predetermined distance.

In an embodiment of the trigger of the disclosure, a depth of the L-shaped concave parts is a first depth.

In an embodiment of the trigger of the disclosure, a first concave part is arranged on the first plane, and the first concave part is arranged between the two L-shaped concave parts and communicates with the two L-shaped concave parts.

In an embodiment of the trigger of the disclosure, a bottom surface of the first concave part is a stepped surface; on a side close to a top of the L-shaped concave part, a depth of the first concave part is less than half of the first depth; on a side close to a bottom of the L-shaped concave part, and the depth of the first concave part is greater than three-quarters of the first depth.

In an embodiment of the trigger of the disclosure, a plurality of bumps are arranged on an inner side wall of the L-shaped concave part, and the bumps are located at a corner of the inner side wall of the L-shaped concave part.

In an embodiment of the trigger of the disclosure, a concave point is arranged on an outer side wall of the L-shaped concave part, and the concave point is located on a bottom wall of the outer side wall of the L-shaped concave part.

In an embodiment of the trigger of the disclosure, buckles are arranged on the first side surface and the second side surface, and the buckles are located at a top end of a horizontal part of the L-shaped concave part.

In an embodiment of the trigger of the disclosure, the connecting plate includes a main body, the main body is attached to the first side surface, the second side surface and the third side surface, and a width of the main body is less than a width of the third side surface.

In an embodiment of the trigger of the disclosure, the main body is U-shaped, the connecting plate includes two symmetrical clamping components, the clamping components are extended curved surfaces at both ends of the main body, the clamping components are L-shaped, and the clamping components are arranged corresponding to the L-shaped concave parts.

In an embodiment of the trigger of the disclosure, a width of the clamping component is less than a width of the main body, and one side of the clamping component and one side of the main body are located on the same plane.

In an embodiment of the trigger of the disclosure, the connecting plate comprises two symmetrical limiting components, the limiting component is an extension plane at both ends of the main body, a width of the limiting component is less than the width of the main body, and one side of the limiting component and the other side of the main body are located on a same plane.

In an embodiment of the trigger of the disclosure, a groove is arranged between the connecting plate and the clamping component, and a width of the groove is equal to a width of the buckle.

The disclosure further provides a cutting tool. The cutting tool includes a trigger, a braking switch, a controller, a power assembly and a cutter assembly. The trigger includes a protective shield, a limiting protruding block, a leaf spring and a connecting plate. One end of the protective shield is axially connected with a housing and can rotate about a connecting shaft. The limiting protruding block is connected on an end surface of the protective shield close to the connecting shaft. The leaf spring is located on a side of the limiting protruding block away from the connecting shaft and provided with a protruding part. The protruding part is close to the limiting protruding block, and a distance between the protruding part and the limiting protruding block is less than a length of the limiting protruding block. The connecting plate is arranged on the limiting protruding block and covers a contact surface of the limiting protruding block and the leaf spring. The braking switch is connected with the trigger. The controller is connected with the braking switch. The power assembly is connected with the controller. The cutter assembly is connected with the power assembly.

As mentioned above, the disclosure provides the trigger device and cutting tool, through arranging the leaf spring, the chainsaw may meet safety requirements. Through arranging the connecting plate on the limiting protruding block, a duration life of the protective shield and a duration life of the cutting tool are increased at the same time. Through arranging the L-shaped concave part on the first side surface of the limiting protruding block, the connecting plate is fixed. Through arranging buckles on the limiting protruding block, the connecting plates do not be shifted. The trigger and the cutting tool provided by the disclosure increase the duration life of the protective shield, thereby increasing the duration life of the cutting tool.

The cutting tool of the disclosure is a chainsaw. Chainsaw is a kind of mechanical tool for logging commonly used in the garden market. With the development of animal husbandry and gardening and the requirements for environmental protection, chainsaws have good development prospects. Lithium chainsaw has developed rapidly in recent years, and they have quickly occupied the market with their environmental protection, energy saving, portability and other characteristics. A conventional chainsaw is driven by a motor to move the sprocket disc. The sprocket teeth drive the chain transmission teeth to move the chain to achieve the cutting function. The function of the sprocket gasket is to be fixed on the end surface of the sprocket teeth of the sprocket disc, which may clamp the chain and prevent the chain from running away. The sprocket disc and the sprocket gasket are fixed on the same output shaft. Since there is an assembly gap between the conventional sprocket disc and the sprocket gasket, and the outer diameter of the conventional sprocket gasket is the same as or close to the outer diameter of the sprocket teeth. During the movement of the chain, the transmission teeth of the chain are often caught in the gap between the sprocket disc and the sprocket gasket, causing the chain to be stuck and even high-risk failures such as chain running, chain jumping, and de-chaining. The disclosure provides a chainsaw to improve the problems that the transmission teeth of the chain are often caught in the gap between the sprocket disc and the sprocket gasket during the movement of the chain, causing the chain to be stuck and even high-risk failures such as chain running, chain jumping, and de-chaining.

The disclosure provides a chainsaw. The chainsaw includes a guiding plate, a sprocket, a chain and a sprocket gasket. The sprocket is arranged on one side of the guiding plate, and includes a sprocket disc and a sprocket teeth. The sprocket teeth is fixedly connected with the sprocket disc and located on one side of the sprocket disc. The chain is arranged along a circumference of the guiding plate and meshes with the sprocket teeth to transmit. The sprocket gasket is connected with the sprocket and located between the sprocket gasket and the sprocket disc, and an outer diameter of the sprocket gasket is greater than an outer diameter of a riveting head where the chain meshes with the sprocket teeth.

In an embodiment of the disclosure, the chain includes a plurality of links, each link of the chain includes a plurality of transmission teeth and at least one cutting tooth, each two of the transmission teeth are connected through a connecting link plate, and at least one or more of the connecting link plates are provided with integrally formed cutting teeth.

In an embodiment of the disclosure, the connecting link plate is riveted with the transmission teeth, and the connecting link plate and the transmission teeth rotate relative to each other.

In an embodiment of the disclosure, a distance between a top of the riveting head and a surface of the transmission teeth is greater than a distance between the sprocket gasket and the sprocket teeth.

In an embodiment of the disclosure, a transmission protruding part is arranged on the transmission teeth, and the transmission protruding part meshes with the sprocket teeth to transmit.

In an embodiment of the disclosure, the guiding plate is provided with a positioning groove along its circumference, and the transmission teeth are located in the positioning groove.

In an embodiment of the disclosure, the cutting tooth is located on a side of the connecting link plate away from the positioning groove.

In an embodiment of the disclosure, the cutting tooth includes a cutting part and a depth limiting part, and the cutting part and the depth limiting part are located at both ends of the connecting link plate.

In an embodiment of the disclosure, the sprocket gasket is provided with a plurality of ventilation holes.

In an embodiment of the disclosure, the chainsaw further includes a housing and a power source. A driving motor is mounted in the housing. An output shaft of the driving motor is connected with the sprocket, and the power source is connected with the driving motor to supply power for the driving motor.

With the chainsaw of the disclosure, the chain meshing with the sprocket teeth is located within the outer diameter of the sprocket gasket through enlarging the diameter of the sprocket gasket. And the distance between the top of the riveting head and the surface of the transmission teeth is greater than the distance between the sprocket gasket and the sprocket teeth, so that there is a large fall between the riveting head of the chain and the transmission teeth, and the fall is far larger than the gap between the sprocket teeth and the sprocket gasket, thus the transmission teeth of the chain being caught in a gap between the sprocket teeth and the sprocket gasket is avoided and a chain movement stuck and even an occurrence of high-risk failures such as chain running, chain jumping, and de-chaining are avoid.

The chainsaw of the disclosure is provided with a plurality of ventilation holes on the sprocket gasket, so that when the sprocket is running, the sprocket may enable the air to enter through holes on a side sprocket gasket and follow the tooth shape of the sprocket teeth to exhaust radially, so that airflow generated by an operation of the sprocket is equivalent to a small fan. In this way, the airflow is used to synchronously blow sawdust generated in a process of cutting, so as to avoid a continuous accumulation of sawdust in a gap between the sprocket disc and the housing and prevent the sawdusts from filling the braking steel belt or other internal components. This eliminates an occurrence of failures, such as micro switch braking steel belt stuck and so on, due to the sawdusts accumulation.

Regarding that the chainsaw needs to be paused or turned on frequently during use, and the load of the chainsaw frequently braking or blocking is directly loaded on the motor shaft and the rest of the mechanical structure, which is easy to cause damage to the mechanical structure, the disclosure further provides a chainsaw. The chainsaw may improve the problems that the mechanical structure is easy to be damaged caused by a frequent braking or a stuck load of the chainsaw directly loaded on a motor shaft and the rest of the mechanical structure. The chainsaw includes a sprocket, a clutch, a guiding plate and a chain. The sprocket includes a sprocket disc and sprocket teeth. The sprocket teeth are fixedly connected with a side of the sprocket disc. The clutch is arranged on a side of the sprocket disc opposite to the sprocket teeth, and is connected with the output shaft of the driving motor. The clutch includes at least two clutch blocks, a clutch block holder and a tension spring. The clutch blocks are located on both sides of the clutch block holder, and the two clutch blocks are connected by the tension spring. The guiding plate is located at a side of the sprocket teeth, and the chain is arranged along a circumferential direction of the guiding plate and meshes with the sprocket teeth for transmission.

In an embodiment of the disclosure, a clutch accommodating cavity is arranged on a side of the sprocket disc away from the sprocket teeth, and the clutch is located in the clutch accommodating cavity.

In an embodiment of the disclosure, the clutch block holder includes a driving block and at least two limiting blocks, the limiting blocks are arranged on both sides of the driving block, and an output shaft connecting hole is arranged in a middle position of the driving block for a fixed connection with the output shaft of the driving motor.

In an embodiment of the disclosure, the limiting blocks includes a first limiting block and a second limiting block, and the first limiting block and the second limiting block are center-symmetrical with respect to a center of the output shaft connecting hole.

In an embodiment of the disclosure, the clutch block includes a first clutch block and a second clutch block, the first clutch block and the second clutch block are respectively mounted on the first limiting block and the second limiting block, and both ends of the first clutch block and the second clutch block are respectively connected by the tension springs.

In an embodiment of the disclosure, when outer sides of the first clutch block and the second clutch block are in contact with an inner wall of the sprocket disc, and a distance between inner sides of the first clutch block and the second clutch block is smaller than a distance between outer sides of the first limiting block and the second limiting block.

In an embodiment of the disclosure, a groove is arranged on a side of the clutch block connected with the clutch block holder, the limiting block is located in the groove, the limiting block is adapted to a shape of the groove, and when the driving motor drives the output shaft to rotate, the clutch block rotates under a driving of the clutch block holder, so that the clutch block moves away from the clutch block holder along the limiting block and contacts an inner wall of the sprocket disc.

In an embodiment of the disclosure, the chainsaw further comprises a sprocket gasket. The sprocket gasket is fixedly connected with the sprocket teeth and a meshing position of the chain with the sprocket teeth is located between the sprocket disc and the sprocket gasket.

In an embodiment of the disclosure, both ends of the clutch block are provided with tension spring connecting holes.

In an embodiment of the disclosure, the chainsaw further includes a housing and a power source. The driving motor is mounted in the housing, the output shaft of the driving motor is connected with the clutch, and the power source is connected with the driving motor to supply power for the driving motor.

The disclosure provides a transmission assembly and a chainsaw. Through mounting the clutch in the sprocket disc, when an operator brakes or a tool suddenly stalls during a work process, a rotation speed of the motor decreases in a short time, and a centrifugal force of the clutch block of the clutch is less than a tension force of the tension spring, so that an outer surface of the clutch block will be separated from an inner surface of the sprocket disc, and the machine stops working to avoid sudden braking or stuck load directly loading on a motor shaft and the rest of the mechanical structure, which increases the duration life of the machine, reduces costs and is easy for maintenance.

Chainsaws are hand-held saws powered by gasoline, electricity or hydraulics, which are mainly used for logging and lumbering. Currently, most conventional chainsaws integrate the braking handle and the protective shield together, if the chainsaw encounters a relatively hard object such as a tree knot or a metal object when cutting trees, the chainsaw may jump in the direction of the operator's body, On the one hand, the operator may push the protective shield, which enables the chainsaw to execute emergency brake and stops the chain movement in a very short time. On the other hand, the protective shield integrated on the braking handle may block the sawdust from the chainsaw cutting or prevents the operator from being cut by the chain. Considering that the conventional chainsaw will generate a lot of sawdust during use, and some sawdust will enter the chainsaw body from the rotation position of the rotatable braking handle, threaten the operation of the internal brake and transmission structure of the chainsaw, and reduce the duration of the chainsaw, the disclosure further provides a chainsaw to solve the problems that the generated sawdust will enter the chainsaw body from the rotation position of the rotatable braking handle when the chainsaw is cutting woods. The chainsaw includes a housing, a braking handle and a dust-proof plate. The braking handle is rotatably mounted in the housing, and the housing is provided with an opening for the braking handle to move. The dust-proof plate is arranged on the braking handle, abuts against an inner side wall of the opening on the housing and is used to close the opening. The dust-proof plate is arc-shaped, and its arc is from 60 degrees to 180 degrees.

In an embodiment of the disclosure, a rotation range of the braking handle is from 0 degree to 30 degrees.

In an embodiment of the disclosure, a plurality of weight reduction grooves are opened on a side wall of the dust-proof plate, and the plurality of weight reduction grooves are arranged at intervals along an arc of the dust-proof plate.

In an embodiment of the disclosure, the dust-proof plate and the inner side wall of the opening of the housing are rotatably matched with each other.

In an embodiment of the disclosure, the braking handle includes an eccentric block and a shaft hole. The eccentric block is integrally formed with the dust-proof plate and is located at a rotational connection position between the braking handle and the opening. The shaft hole is opened at a center of the eccentric block and is rotatably connected with a pin inside the housing.

In an embodiment of the disclosure, the chainsaw further includes a middle blocking plate, the middle blocking plate is connected with an outer side wall of the housing, a sealing plate matched with a structure of the dust-proof plate is defined at a position of the middle blocking plate corresponding to the eccentric block, and a side wall of the sealing plate abuts against the inner side wall of the dust-proof plate.

In an embodiment of the disclosure, a guard plate is integrally formed on the braking handle, and a plate surface of the guard plate faces towards an extension direction of a cutter assembly in the chainsaw.

In an embodiment of the disclosure, the chainsaw further includes a cutter assembly and a power assembly. The cutter assembly is mounted on the housing and includes a chain and a guiding plate for holding the chain. The power assembly includes a driving unit for driving the cutter assembly and a power source for supplying power to the driving unit.

In an embodiment of the disclosure, the housing includes a front handle and a rear handle. The front handle is arranged around the housing and is located on a side of the braking handle away from the cutter assembly. The rear handle is defined on an end of the housing away from the cutter assembly, and a control trigger for controlling the driving unit is arranged on the rear handle.

In an embodiment of the disclosure, the power source includes at least one battery pack. The housing is provided with an engaging component for engaging the battery pack, and the engaging component is arranged on any side of the housing.

As mentioned above, the chainsaw of the disclosure has at least one of the following beneficial effects:

1. Through abutting the dust-proof plate with the inner side wall of the opening of the housing, the opening can be closed, thereby reducing an occurrence of sawdusts entering the chainsaw from the opening of the housing, achieving a dust-proof effect and prolonging the duration life of the machine.
2. According to the rotation range of the braking handle from 0 degree to 30 degrees, the arc of the dust-proof plate is designed to be from 60 degrees and 180 degrees, so that when the braking handle is rotated to a braking limit position, the opening of the housing may always be closed by the dust-proof plate, and the gap between the inner side walls of the opening of the housing and the dust-proof plate does not change, which achieves a dustproof effect.
3. Through embedding the sealing plate on the middle blocking plate into the eccentric block, and enabling the side wall of the sealing plate to abut against the inner side wall of the dust-proof plate, a sealing of a rotating part of the braking handle may be realized, which may further improve the sealing performance, thereby preventing sawdusts from entering the chainsaw through the gap and causing damage to the chainsaw.

BRIEF DESCRIPTION OF THE DRAWINGS

In order to explain technical solutions of embodiments of the disclosure more clearly, the following will briefly introduce drawings used in the description of the embodiments or prior art. Obviously, the drawings in the following description are only some embodiments of the disclosure. For those of ordinary skill in the art, other drawings may be obtained based on these drawings without creative work.

PART NUMBER DESCRIPTION

Figure 1:
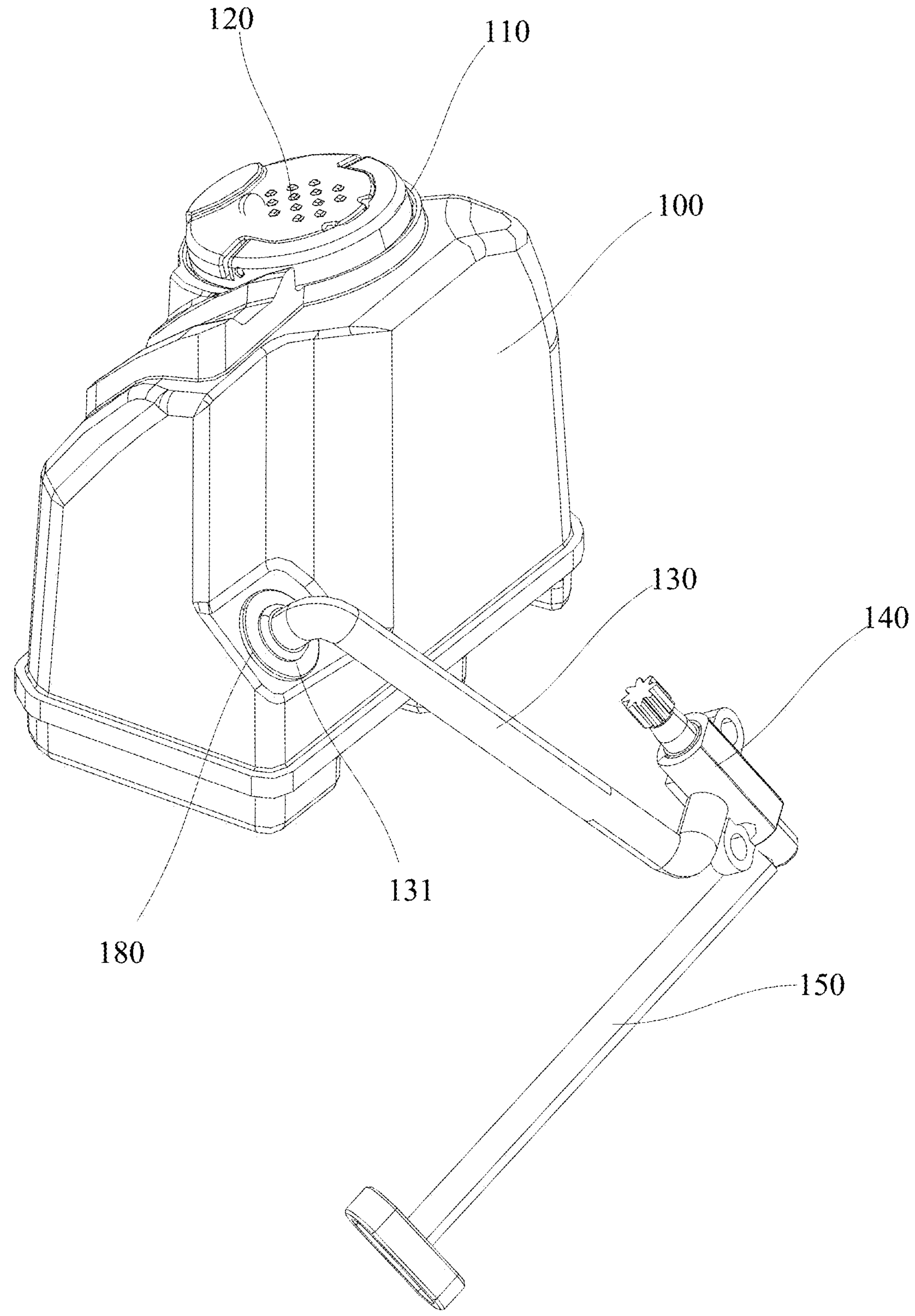
FIG. 1 is a three-dimensional schematic view of an embodiment of a container of the disclosure.

1—housing, 10—container, 11—first housing, 12—second housing, 13—third housing, 14—rear handle, 15—front handle, 16—opening, 17—power socket, 151—holding part, 152—first fixing part, 153—second fixing part, 101—housing cavity, 102—connecting shaft, 100—box body, 110—liquid filling opening, 111—internal thread, 112—internal thread end, 120—cover, 130—first tube, 131—leakage-proof ring, 1311—first flanging, 1312—cylindrical outer wall, 1313—second flanging, 140—suction device, 150—second tube, 160—filter tip, 170—filter screen, 180—liquid suction opening, 1201—external thread, 1202—screw positioning rib, 1203—annular protrusion, 1204—sinking groove, 1205—groove, 1206—first limiting groove, 1207—second limiting groove, 1208—sealing part, 1209—annular groove, 1210—mounting hole, 1211—spherical cavity, 1212—opening groove, 1213—one-way ventilation structure, 12131—filter part, 12132—one-way valve, 1216—flip cover, 1217—point-shaped protrusion, 1218—wrench, 1219—protruding structure, 1220—rotation shaft, 1221—pulling wire, 1222—blocking part, 1223—blocking rod, 1224—rotational tightening part, 2—power assembly, 21—power source, 22—driving motor, 221—output shaft, 3—cutter assembly, 31—guiding plate, 311—positioning groove, 32—sprocket, 321—sprocket disc, 322—sprocket teeth, 323—accommodating cavity, 33—chain, 331—transmission tooth, 3311—transmission protrusion, 332—cutting tooth, 3321—cutting part, 3322—depth limiting part, 333—connecting link plate, 334—riveting head, 34—sprocket gasket, 341—ventilation hole,

35—clutch, 351—clutch block, 3511—first clutch block, 3512—second clutch block, 3503—tension spring connecting hole, 3504—groove, 352—clutch block holder, 3521—driving block, 3522—limiting block, 3501—first limiting block, 3502—second limiting block, 3523—output shaft connecting hole, 353—tension spring, 4—suction driving assembly, 41—worm, 42—worm gear, 5—braking device, 510—protective shield, 511—protective shield body, 512—braking component, 513—limiting protruding block, 5130—first plane, 5131—second plane, 5132—first side surface, 5133—second side surface, 5134—third side surface, 5135—L-shaped concave part, 5135*a*—bump, 5135*b*—concave point, 5136—first concave part, 5137—buckle, 514—connecting plate, 5140—main body, 5141—clamping component, 5142—limiting component, 5143—groove, 515—through hole, 520—leaf spring, 530—braking switch, 531—switch trigger part, 532—elastic structure, 550—controller, 5100—trigger, 5101—second dust-proof rib, 5102—third dust-proof rib, 5103—forth dust-proof rib, 5104—first dust-proof rib, 6—braking assembly, 641—braking steel belt, 642—braking handle, 6421—guard plate, 6422—eccentric block, 64221—rotation shaft hole, 64222—protrusion, 65—dust-proof plate, 651—weight reduction groove, 652—clamping groove, 66—middle blocking plate, 661—sealing plate, 662—arc-shaped clamping block, 663—accommodating cavity, 7—tension mechanism, 8—control assembly.

DETAILED DESCRIPTION

In view of the above shortcomings in the background art, the disclosure provides a container for cutting tools and a cutting tool having the container, so as to improve the problems that the conventional containers for cutting tools cannot replenish air in time or are easily cause leakage pollution.

Figure 16:
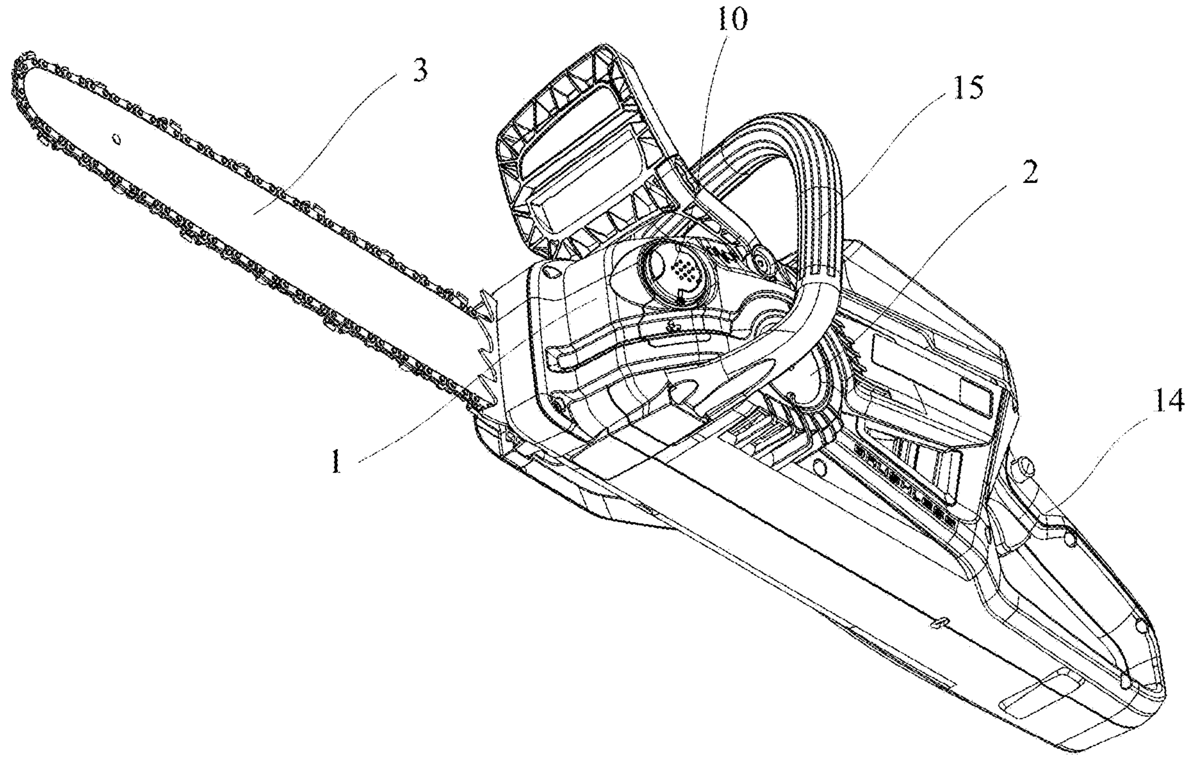
FIG. 16 is a schematic structural view of an embodiment of a cutting tool of the disclosure.
Figure 17:
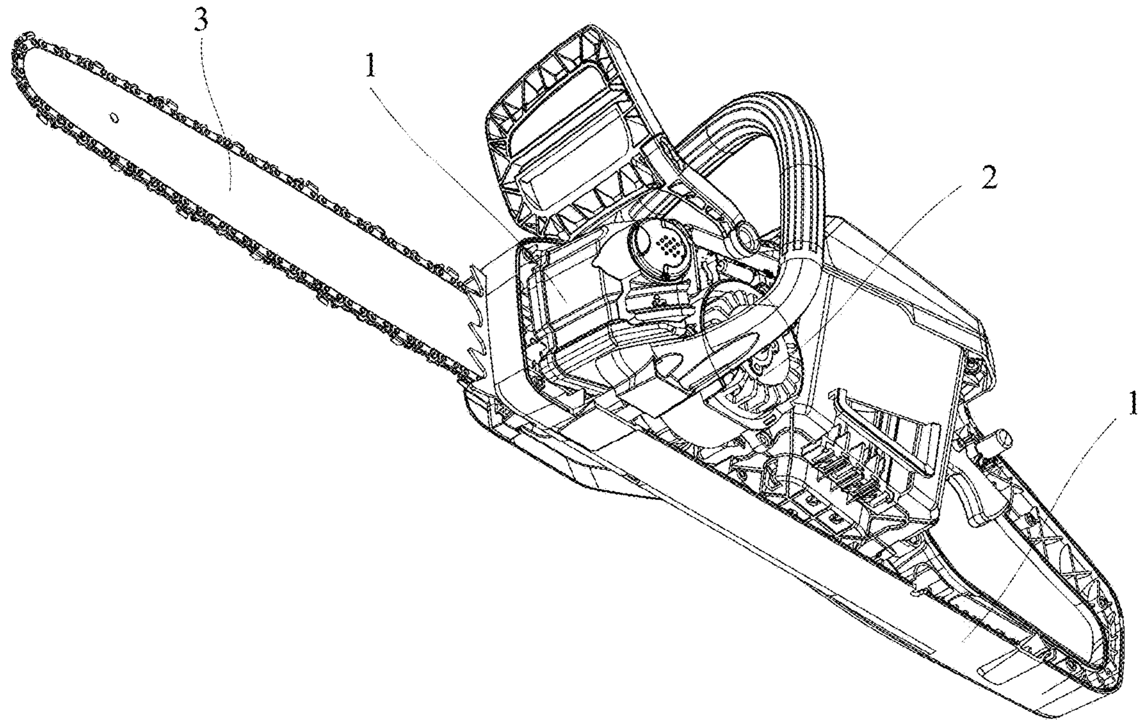
FIG. 17 is a schematic structural view of the cutting tool according to an embodiment of the disclosure when part of a housing is removed to expose the container.

Please refer to FIG. 16 and FIG. 17. FIG. 16 is a schematic structural view of an embodiment of a cutting tool of the disclosure. FIG. 17 is a schematic structural view of the cutting tool according to an embodiment of the disclosure when part of a housing 1 is removed to expose a container 10. The cutting tool includes the container 10, the housing 1, a cutter assembly 3 and a power assembly 2. The power assembly 2 supplies power for the cutter assembly 3. The container 10 is mounted in the housing 1, which may contain lubricant or coolant. Please refer to FIG. 1 and FIG. 4. A suction device 140 on the container 10 draws out the lubricant or coolant in the container 10, and pumps it to a set part to be lubricated or to be cooled. The cover 120 of the container 10 is provided with a one-way ventilation structure 1213, which may allow air to enter from an outside of the container 10, but can prevent liquid in the container 10 from overflowing from the one-way ventilation structure 1213. This not only can replenish the air in time during a suction process of the suction device 140, but also can prevent the liquid in the container 10 from overflowing, thereby causing loss and leakage pollution.

Figure 4:
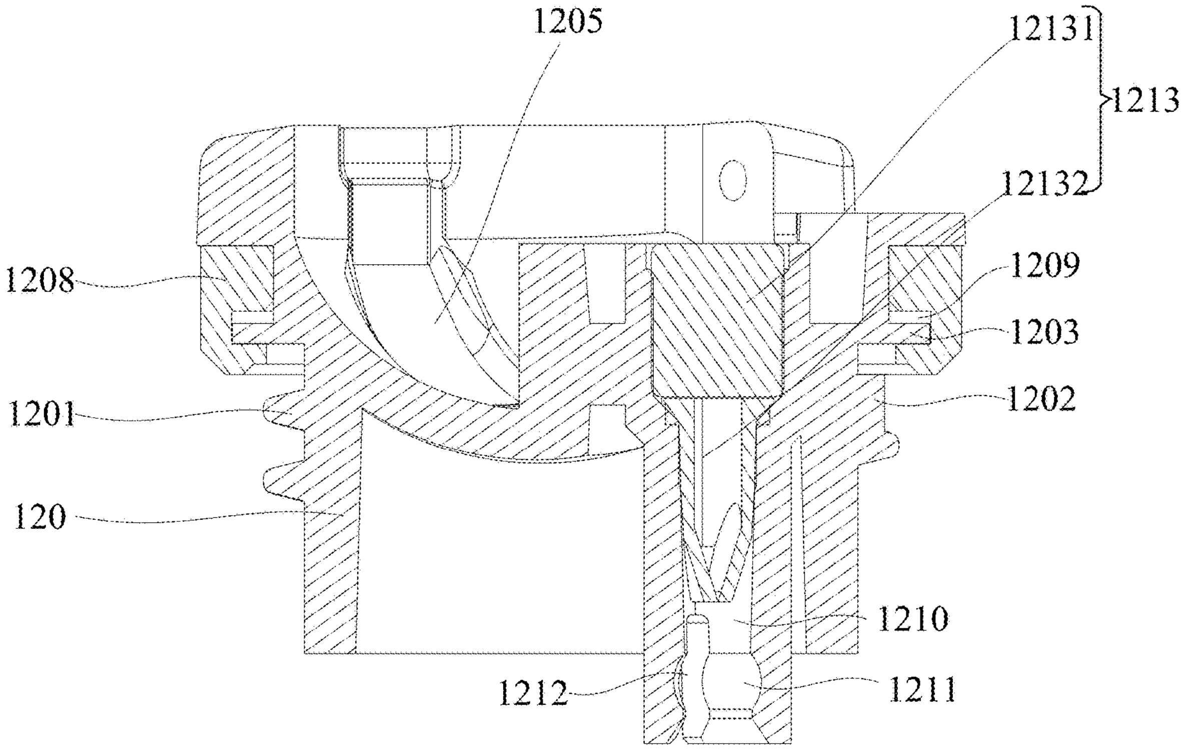
FIG. 4 is a schematic cross-sectional view of an embodiment of a cover of the disclosure.

Please refer to FIG. 1 and FIG. 4. The container includes a box body 100, the cover 120, the suction device 140, a first tube 130 and a second tube 150. The box body 100 defines a liquid storage cavity, and the liquid storage cavity is provided with a liquid filling opening 110 and a liquid suction opening 180. The cover 120 is detachably mounted on the liquid filling opening 110. The suction device 140 is arranged outside the box body 100. One end of the first tube 130 is connected with the liquid suction opening 180 through a leakage-proof ring 131.

Figure 15:
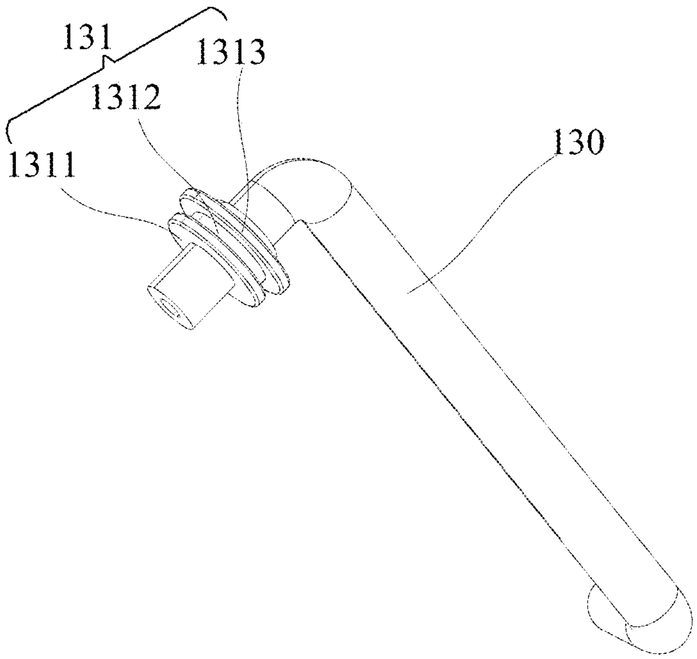
FIG. 15 is a schematic structural view of the first tube in an embodiment of the container of the disclosure.

Please refer to FIG. 15. FIG. 15 is a schematic structural view of the first tube 130 in an embodiment of the container 10 of the disclosure. The liquid suction opening 180 is a circular hole. The leakage-proof ring 131 is arranged at an end of the first tube 130. The leakage-proof ring 131 has elasticity and may be bonded to the first tube 130 or integrally formed with the first tube 130. The leakage-proof ring 131 is provided with a cylindrical outer wall 1312 matched with the liquid suction opening 180 on the box body 100, and a first flanging 1311 and a second flanging 1313 respectively arranged at both ends of the cylindrical outer wall 1312. The cylindrical outer wall 1312 is clamped into the liquid suction opening 180 by interference to define a radial sealing structure. The first flanging 1311 and the second flanging 1313 rely on their own elastic force to press and seal on a surrounding wall of the liquid suction opening 180 to define an end surface sealing structure. The other end of the first tube 130 is connected with a liquid suction port of the suction device 140. One end of the second tube 150 is connected with the liquid drainage port of the suction device 140, and the other end of the second tube 150 extends to a part to be lubricated or cooled of the cutting tool.

Figure 7:
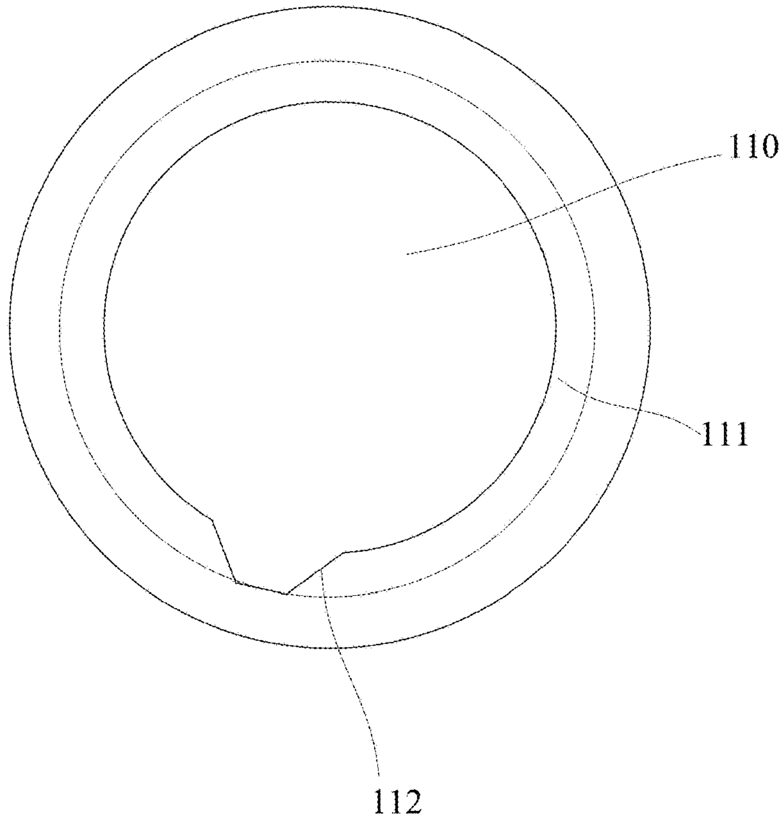
FIG. 7 is a schematic structural view of a position of a liquid filling opening in an embodiment of the container of the disclosure.

Please refer to FIG. 4 and FIG. 7. In an embodiment of the disclosure, the cover 120 is provided with an external thread 1201 matched with the liquid filling opening 110. The external thread 1201 is provided with a screw positioning rib 1202. The screw positioning rib 1202 is located between adjacent external threads, and its extending direction is substantially parallel to a rotation direction of the cover 120. The liquid filling opening 110 is provided with an internal thread 111 matched with the external thread 1201. When the cover 120 is screwed to a set position, an internal thread end 112 (which means an end part of the internal thread 111 facing a side of the cover 120) abuts on the screw positioning rib 1202, so that the cover may not continue to be rotated and tightened. In this way, a screwing and tightening between the cover 120 and the liquid filling opening 110 can meet a set screwing requirement, so that the cover 120 and the liquid filling opening 110 can be kept neither loose nor tight. In some embodiments, when the screw positioning rib 1202 of the cover 120 reaches the internal thread end 112, a sealing state and a smoothness of screwing and opening are better when a rotational torque of the cover 120 is from 4 N·m to 7 N·m.

Please refer to FIG. 10 through FIG. 13. In an embodiment of the disclosure, the cover 120 further includes a flip cover 1216 rotatably connected and mounted on the cover 120. The flip cover 1216 is rotatably mounted on the cover body 120 through a rotation shaft 1220. A rotation axis of the flip cover 1216 passes through a center of a top circle of the cover 120. One end of the flip cover 1216 is provided with a protruding structure 1219. The other end of the flip cover 1216, which is away from the protruding structure 1219, is provided with a wrench 1218, which is convenient for an operator to flip the flip cover 1216. A rough pattern is arranged on a surface of the flip cover 1216 near a side of the wrench 1218. The pattern may be rough point-shaped protrusions 1217, so that when the operator has poor vision, a position can be determined by touching the flip cover 1216 with a finger.

Figure 12:
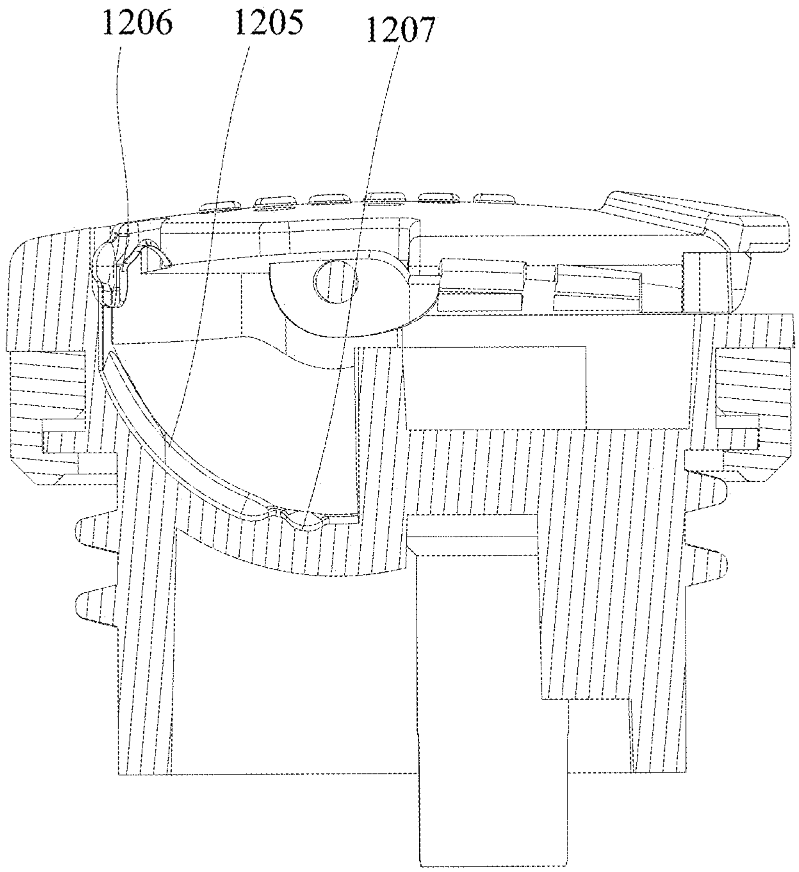
FIG. 12 is a cross-sectional of FIG. 11 in an A-A direction.
Figure 13:
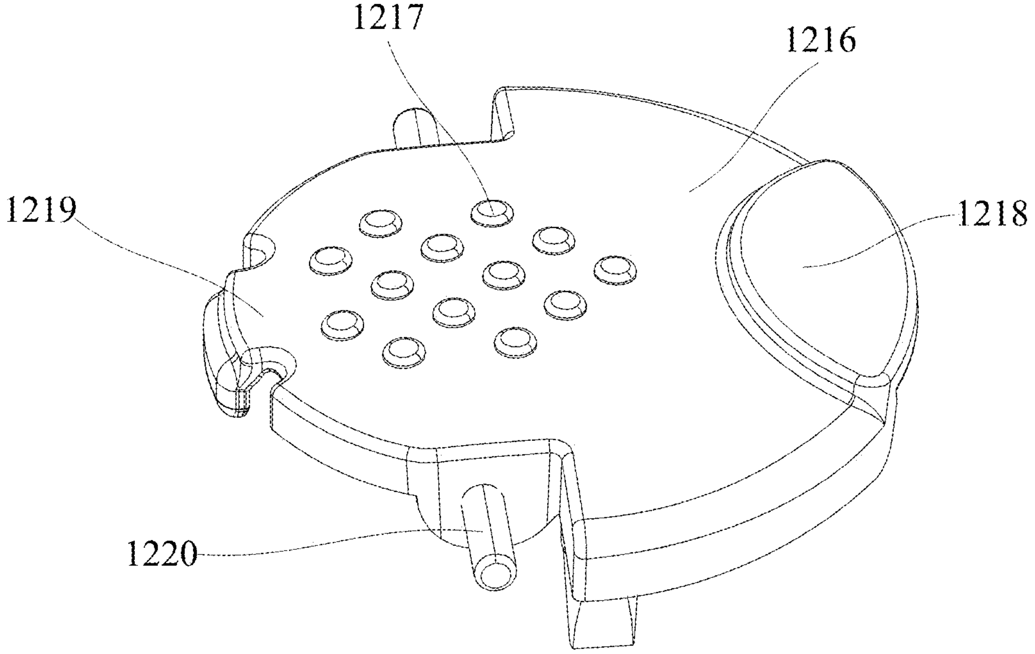
FIG. 13 is a schematic view of a flip cover in an embodiment of the cover of the disclosure.

Please refer to FIG. 12 and FIG. 13. The cover 120 is provided with a concave part for the flip cover 1216 to drive one end of the protruding structure 1219 to move when the flip cover 1216 is turned over. A groove 1205, a first limiting groove 1206 and a second limiting groove 1207 are arranged in the concave part at a position corresponding to the protruding structure 1219 and the first limiting groove 1206 and the second limiting groove 1207 are respectively located at both ends of the groove 1205. The first limiting groove 1206, the second limiting groove 1207 are separated with the groove 1205 by limiting protrusions. A rotation of the flip cover 1216 enables the protruding structure 1219 to slide back and forth in the groove 1205. The protruding structure 1219 is located in the first limiting groove 1206 where the flip cover 1216 is fully closed, and the protruding structure 1219 is located in the second limiting groove 1207 where the flip cover 1216 is fully opened. This structural may enable the flip cover 1216 to flip more accurate, not only can a positioning switch be realized when the flip cover 1216 is opened or closed, but also through a switch of a meshing point of a protruding point and a concave point, an opening and closing limits can be judged by hand or sound. With the first limiting groove 1206 and the second limiting groove 1207, the flip cover 1216 may be kept in a relatively stable working state when it is opened or closed. In an embodiment of the disclosure, when the flip cover 1216 is in an open position, the operator may operate the flip cover 1216 to tighten or loosen the cover 120. After the cover 120 is fixed, the flip cover 1216 is in a closed position, so as to avoid an operation interference caused by a protrusion of the flip cover 1216. It should be noted that ventilation holes are arranged on both sides of the protruding structure 1219, so the opening and closing of the flip cover 1216 does not affect a normal air replenish of the one-way ventilation structure 1213.

Figure 2:
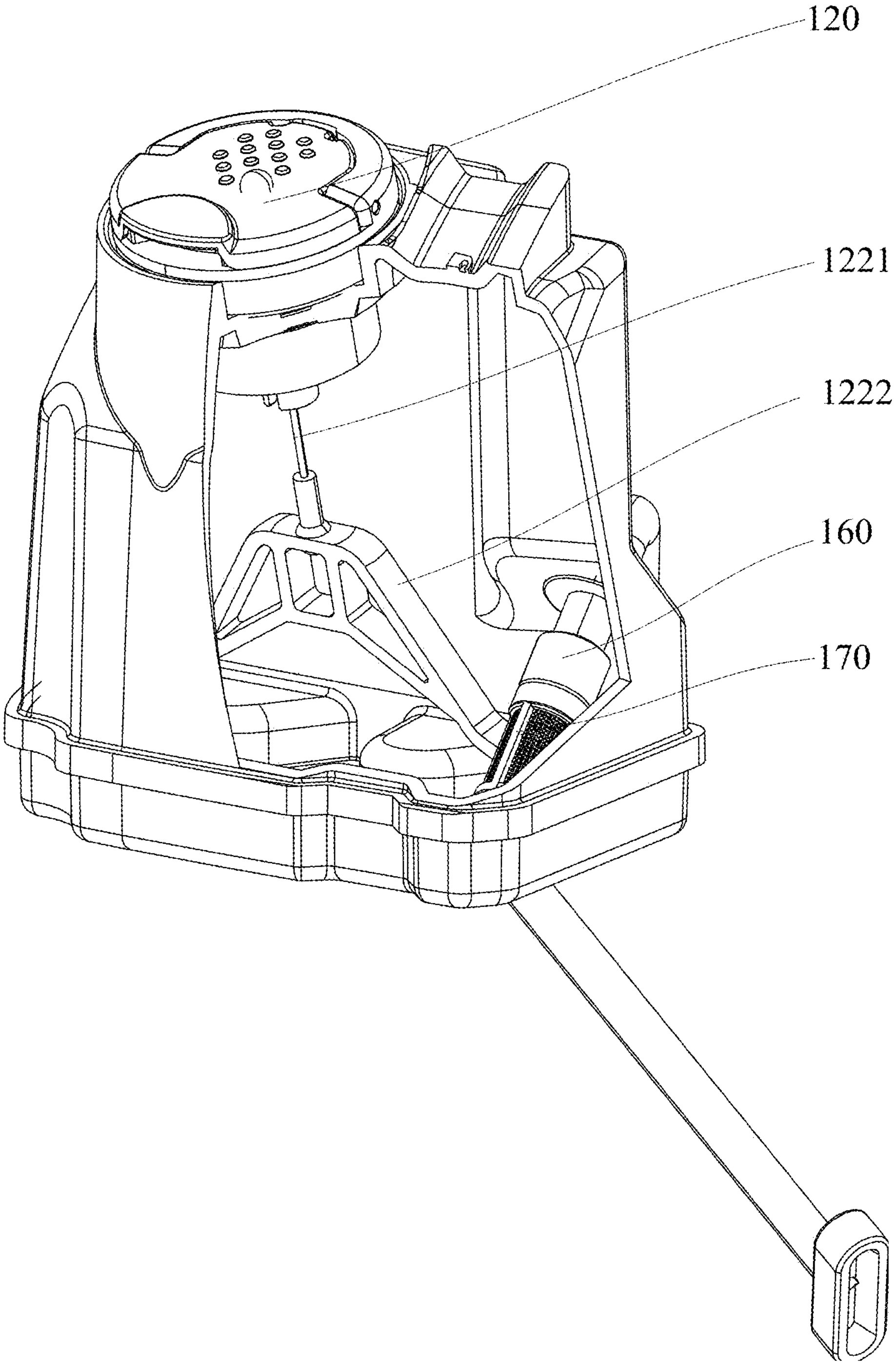
FIG. 2 is a schematic partially cross-sectional view of an embodiment of the container of the disclosure.
Figure 3:
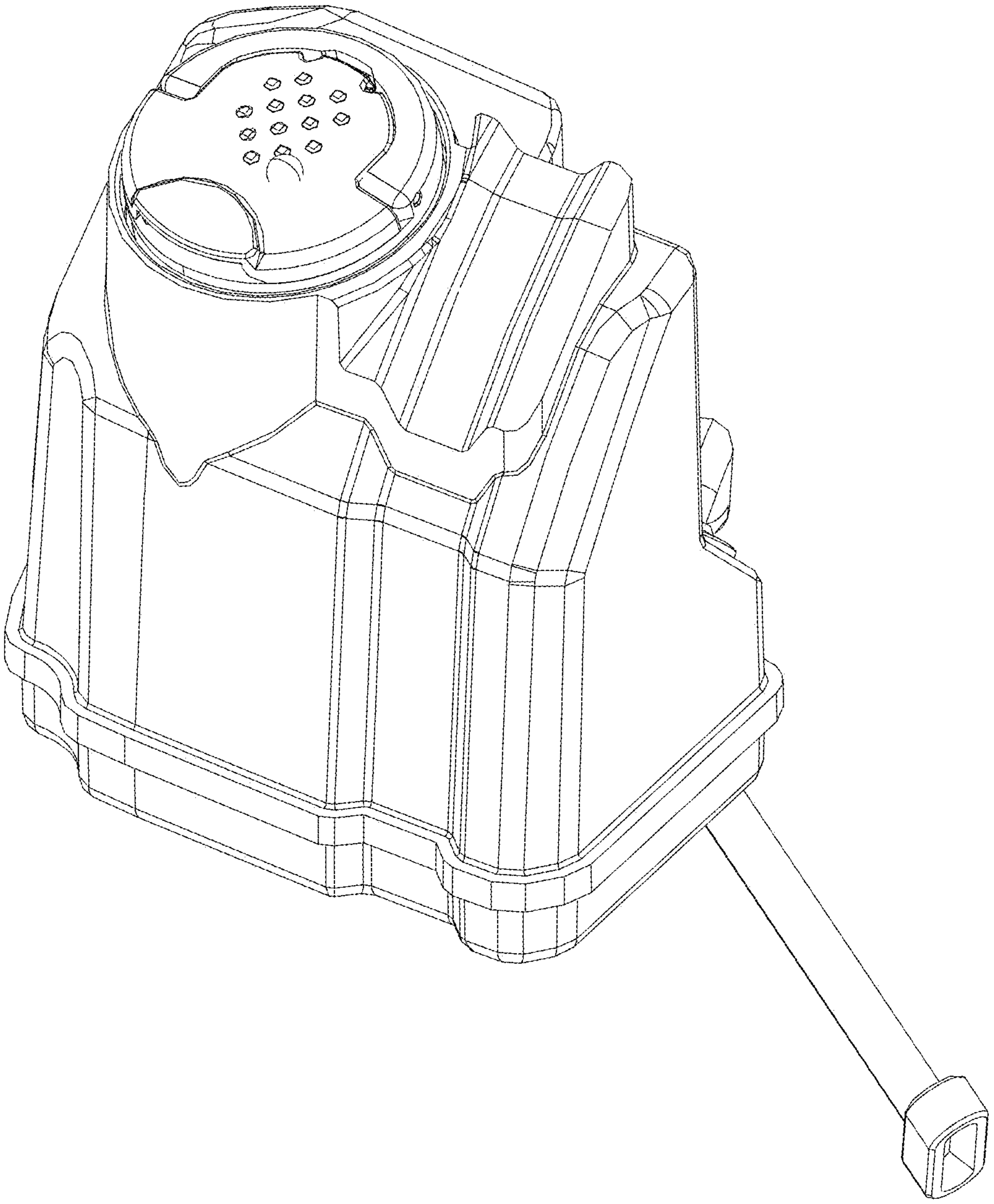
FIG. 3 is a three-dimensional schematic view of an embodiment of a container of the disclosure.

Please refer to FIG. 2. In an embodiment of the disclosure, a filter device is arranged at one end of the first tube 130 connected with the liquid suction opening 180. The filter device includes a filter tip 160 and a filter screen 170. The filter tip 160 may be made of metal or plastic material. One end of the filter tip 160 is tightened with the first tube 130, and the other end of the filter tip 160 is tightened with the filter screen 170. The filter screen 170 is integrally injection-molded by a plastic component and a metal screen. The metal screen adopts 50 meshes to 90 meshes to prevent lubricating oil impurities and dust from entering an oil pump, which causes the oil pump to block.

Please refer to FIG. 4. In an embodiment of the disclosure, the one-way ventilation structure 1213 includes a through hole arranged on the cover 120 and a one-way valve 12132 mounted in the through hole. The one-way valve 12132 allows the air to enter from the outside of the container 10 to an inside of the container 10. The one-way valve 12132 is a rubber component, which has a one-way ventilation function that can ventilate into the container 10 but cannot leak oil to the outside, which enables a pressure to be from 0.5 bar to 0.8 bar without leakage.

Please refer to FIG. 4. In an embodiment of the disclosure, a filter part 12131 for filtering the air is mounted on a side of the one-way valve 12132 facing away from the oil storage cavity of the container 10. The filter part 12131 is a filter element made of copper powder sintered or PE or other air-permeable materials. It is an air-permeable filter element with 20 meshes to 100 meshes, in some embodiments 60 meshes to 80 meshes, which has a function of dust filtration and protection, and may be press-mounted into a through hole on an upper part of the one-way valve 12132.

Figure 5:
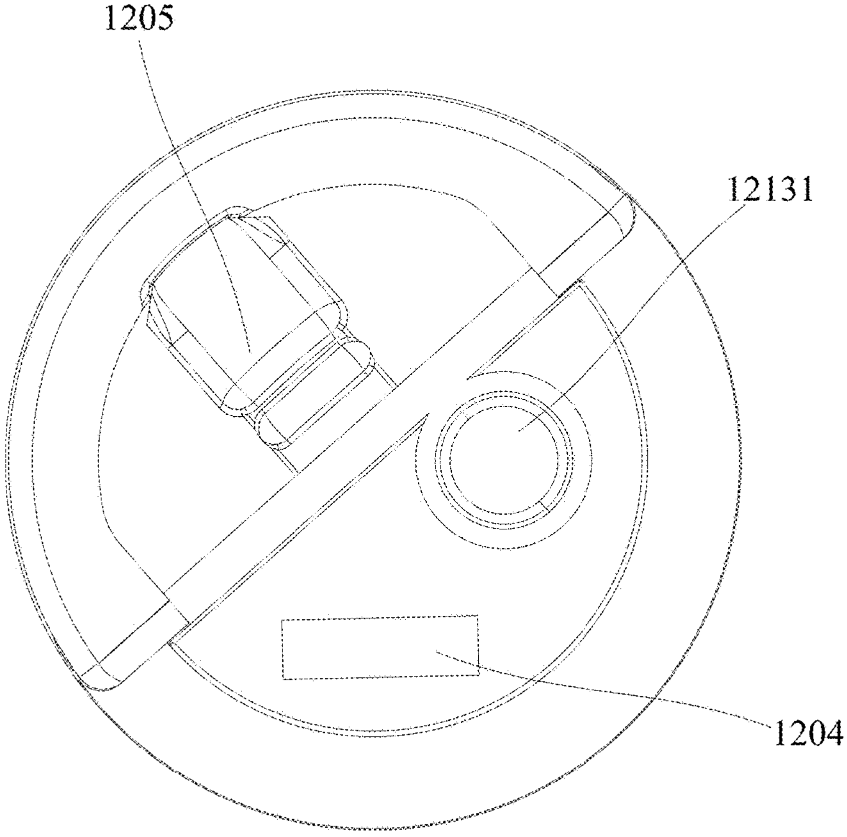
FIG. 5 is a top view of FIG. 4.
Figure 6:
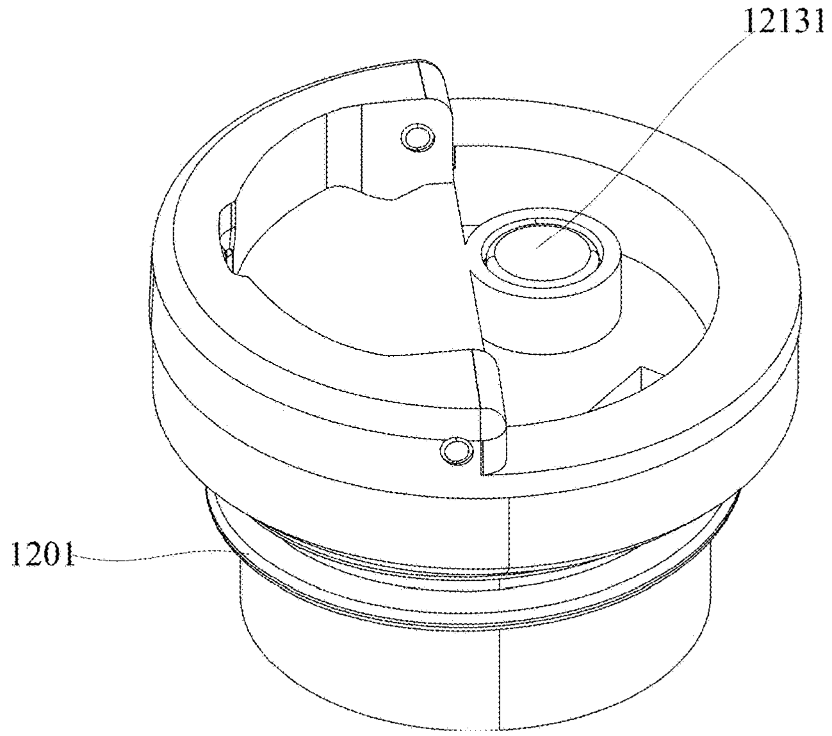
FIG. 6 is a three-dimensional schematic view of a structure in FIG. 4.

Please refer to FIG. 5. In an embodiment of the disclosure, considering an adhesion of the lubricating oil, in order to prevent the cover 120 from being unable to be opened when an adhesion force is large because of not being opened for a long time, the cover 120 is provided with a sinking groove 1204 matched with a disassembling tool. A shape of the sinking groove 1204 matches a connection end of the disassembling tool. In an embodiment of the disclosure, the disassembling tool is a straight-line screwdriver, and the sinking groove 1204 is a rectangle. In another embodiment of the disclosure, the connection end of the disassembling tool is an outer hexagonal head, and the sinking groove 1204 is a hexagon. When the flip cover 1216 is manually rotated and the cover 120 is difficult to rotate, the cover 120 may be rotated with a help of a disassembling tool.

Figure 8:
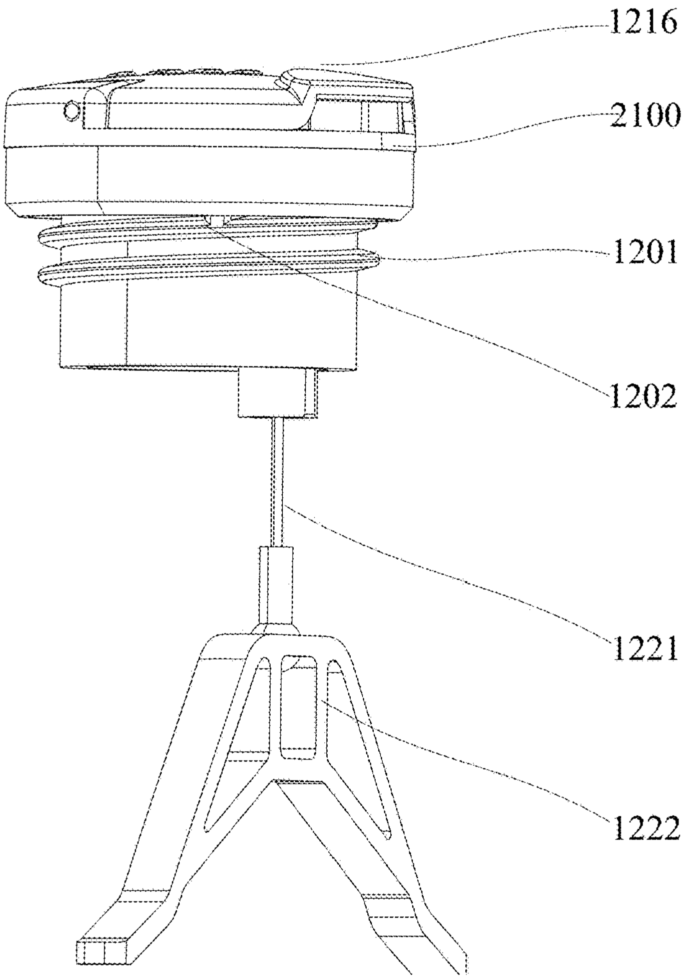
FIG. 8 is a schematic structural view of an embodiment of the cover in the container of the disclosure.

Please refer to FIG. 2 and FIG. 8. In an embodiment of the disclosure, the cover 120 further includes a pulling wire 1221 to prevent the cover 120 from being lost. A connection method between the pulling wire 1221 and the box body 100 or the cover 120 is not limited. In an embodiment of the disclosure, one end of the pulling wire 1221 is connected with an outer wall of the box body 100, and the other end of the pulling wire 1221 is connected with the cover 120, so as to prevent the cover 120 from falling from the container 10 and being lost after the cover 120 is removed, so that the cover 120 is still connected with the container 10 after being removed, which carries out a loss prevention.

Please refer to FIG. 2, FIG. 4, and FIG. 8. In an embodiment of the disclosure, one end of the pulling wire 1221 is connected with a side of the cover 120 facing the liquid storage cavity, and the other end of the pulling wire 1221 extends into the liquid filling opening 110 and is connected with a blocking part 1222 which may enter the container 10. A connection method between the pulling wire 1221 and the cover 120 is not limited, and may be any suitable connection method. In an embodiment of the disclosure, a side of the cover body 120 facing the liquid storage cavity is provided with a mounting hole 1210. One end of the pulling wire 1221 facing the cover 120 is provided with a mounting structure matched with the mounting hole 1210. The pulling wire 1221 is screwed or inserted into the mounting hole 1210 through the mounting structure. In an embodiment of the disclosure, the mounting hole 1210 is provided with a spherical cavity 1211. One end of the mounting hole 1210 facing the pulling wire 1221 is provided with an opening groove 1212 for increasing an elasticity of a wall of the mounting hole 1210. The number of opening grooves 1212 is not limited. One end of the pulling wire 1221 is provided with a sphere (not shown) matched with the spherical cavity 1211. The sphere and the pulling wire 1221 are integrally injection-molded, and the sphere is snapped into the spherical cavity 1211. This arrangement may enable the pulling wire 1221 to rotate at any angle, which not only enables the pulling wire 1221 to rotate flexibly, but also prevents an end of the pulling wire 1221 from falling off or being entangled due to a rotation of the pulling wire 1221. In an embodiment of the disclosure, the blocking part 1222 is an elastically deformable bracket. The bracket is integrally formed with the pulling wire 1221, and may enter into the oil storage cavity of the container 10 from the liquid filling opening 110 along a longitudinal direction of the bracket. After entering the oil storage cavity, the bracket cannot be pulled out from the liquid filling opening 110 without an action of external force. The blocking part 1222 is in a shape of a hanger. The pulling wire 1221 is connected with a position corresponding to a hook of the hanger. The blocking part 1222 with this structure is advantageous for the blocking part 1222 to be elastically compressed and deformed when it is taken out, so as to be taken out from the liquid filling opening 110.

Figure 9:
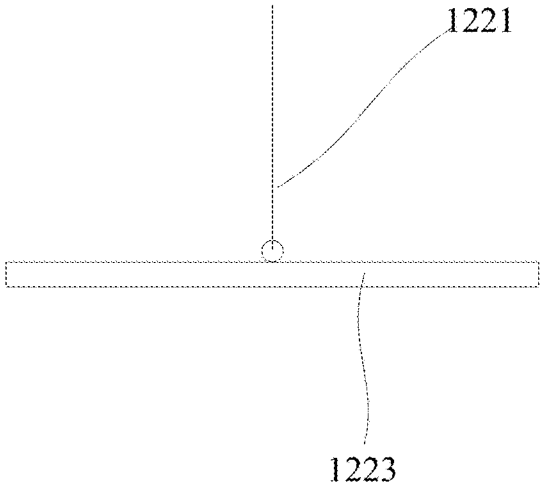
FIG. 9 is a schematic structural view of a blocking part in another embodiment of the cover in the container of the disclosure.
Figure 10:
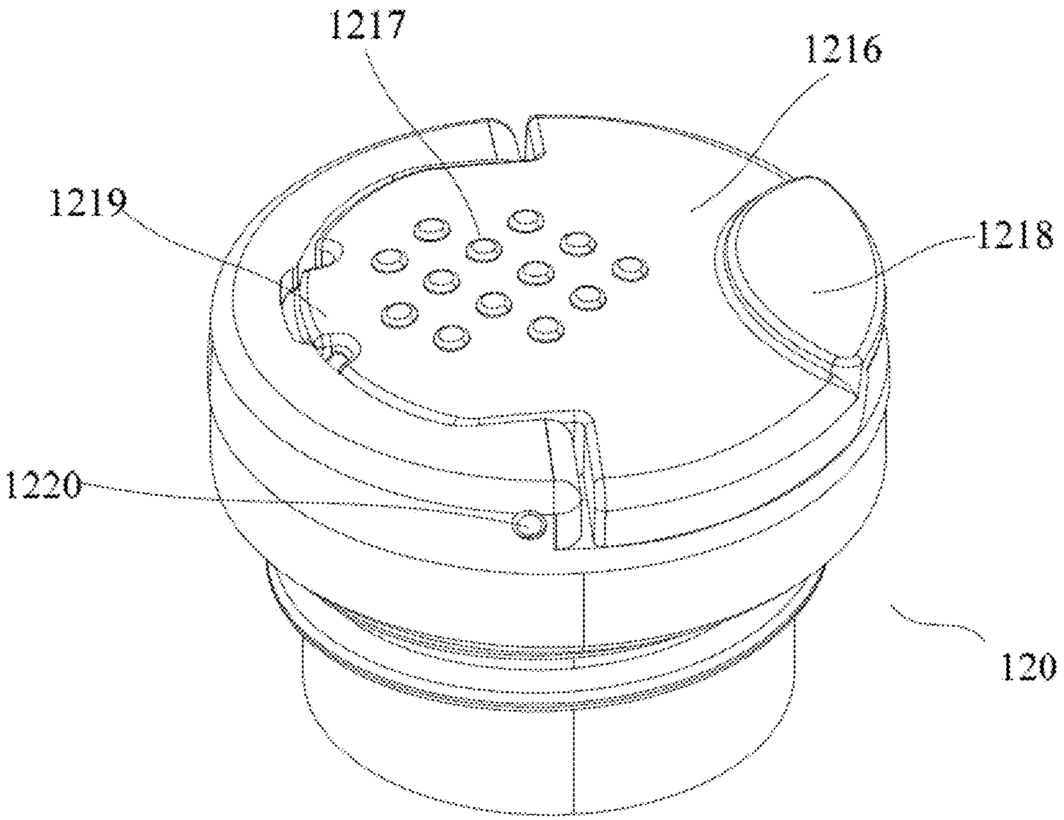
FIG. 10 is a three-dimensional schematic view of an embodiment of the cover of the disclosure.
Figure 11:
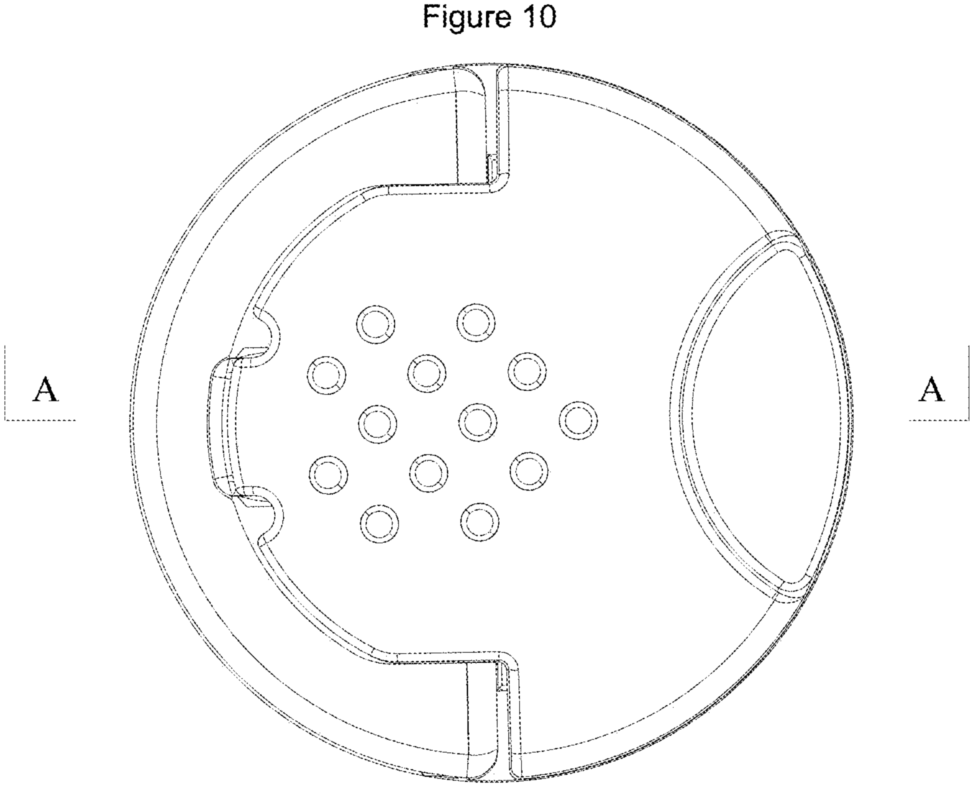
FIG. 11 is a top view of FIG. 10.

Please refer to FIG. 9. In another embodiment of the disclosure, the blocking part is a blocking rod 1223. The pulling wire 1221 is connected with a middle of the blocking rod 1223, the blocking rod 1223 may enter the liquid filling opening 110 in an axial direction, and is blocked by the liquid filling opening 110 when lifted. A diameter of the blocking rod 1223 is smaller than a diameter of the liquid filling opening 110, so the blocking rod 1223 may enter the oil storage cavity of the container 10 from the liquid filling opening 110. A length of the blocking rod 1223 is greater than a diameter of the liquid filling opening 110 and smaller than a minimum width of the oil storage cavity. When the pulling wired is pulled, the blocking rod 1223 is laterally blocked on the liquid filling opening 110 under a dual action of the pulling wire 1221 and gravity.

Figure 14:
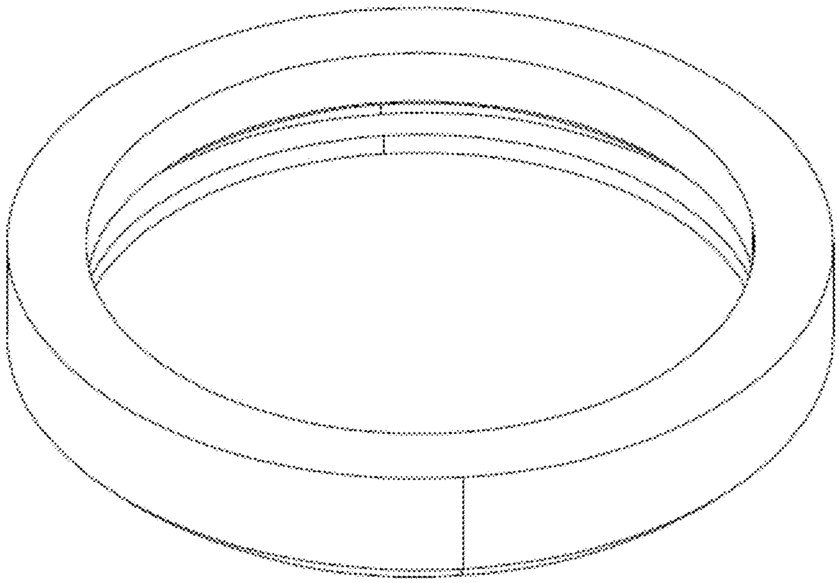
FIG. 14 is a schematic structural view of a sealing part in an embodiment of the cover of the disclosure.

Please refer to FIG. 4 and FIG. 14. FIG. 4 is a schematic cross-sectional view of an embodiment of the cover 120 of the disclosure. FIG. 14 is a schematic structural view of a sealing part 1208 in an embodiment of the cover 120 of the disclosure. In an embodiment of the disclosure, the cover 120 is provided with a sealing part 1208. The sealing part 1208 is made of elastic silicone material, which may be a conventional annular gasket. In an embodiment of the disclosure, the cover 120 is provided with an annular protrusion 1203. The sealing part 1208 is provided with an annular groove 1209. The sealing part 1208 covers and is arranged on the annular protrusion 1203, and a sealing structure is defined between a side of the sealing part 1208 facing the liquid filling opening 110 and the container 10. With this structure, the sealing part 1208 may be mounted on the cover 120 stably and reliably, which prevents the sealing part 1208 from being lost. At the same time, the annular protrusion 1203 may squeeze the sealing part 1208 which is on a lower side, so that there is a larger sealing surface between the cover 120 and the liquid filling opening 110.

Please refer to FIG. 16 and FIG. 17. The disclosure further provides a cutting tool. The cutting tool includes the container 10, the housing 1, the cutter assembly 3 and the power assembly 2. A handle is arranged on the housing 1, and the handle includes a front handle 15 and a rear handle 14. The power assembly 2 supplies power for the cutter assembly 3. The container 10 is used to contain lubricant or coolant. The container 10 is mounted in the housing 1 and is arranged close to the power assembly 2. In this way, the lubricant or coolant in the container 10 may take out part of heat of the power assembly 2 to dissipate heat for the power assembly 2. At least part of the box body 120 of the container is exposed, the part of the box body 120 of the container is made of transparent or translucent material, so as to display an oil amount or indicate a liquid level scale line, which is convenient for the operator to know a remaining liquid amount, and when reaching a warning position, the lubricant oil or coolant should be added.

Figure 18:
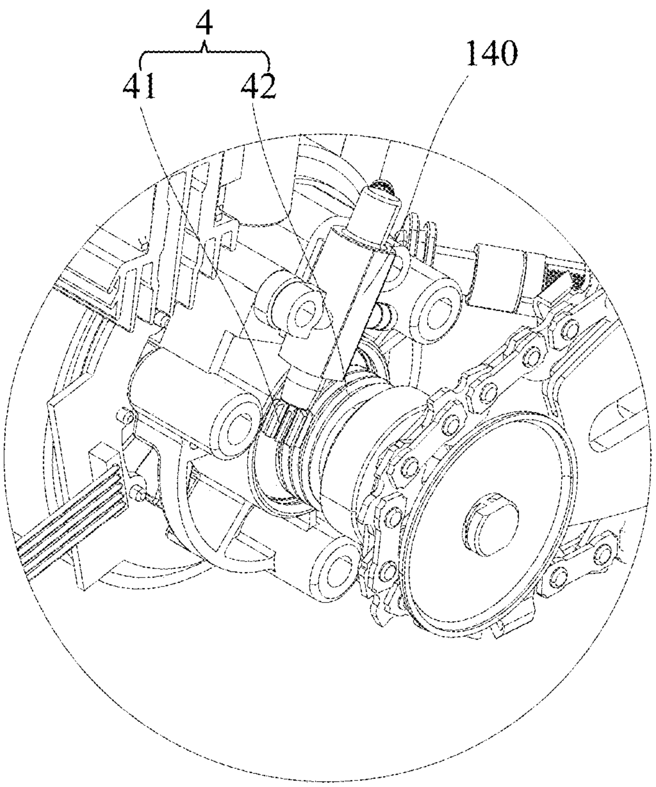
FIG. 18 is a schematic view of a mounting and driving of a suction device in an embodiment of the cutting tool of the disclosure.

Please refer to FIG. 18. The suction device 140 in the disclosure may be any suitable type of pump. In an embodiment of the cutting tool of the disclosure, the suction device 140 is a gear pump, and is driven by a gear pump shaft to perform suction. A suction driving assembly is arranged on the cutting tool. The suction driving assembly includes a worm 41 and a worm gear 42. The worm 41 is mounted on a rotation shaft of the cutting tool, and the worm gear 42 is mounted on a rotation shaft 1220 of the pump. The rotation shaft 1220 of the pump is driven to rotate at a lower speed through a combined structure of the worm gear 42 and the worm 41, thereby providing power for suction.

In summary, The cover of the container of the disclosure is provided with the one-way ventilation structure, which may allow air to enter from the outside of the container, but may prevent the liquid in the container from overflowing from the one-way ventilation structure, which not only can replenish the air in time during a suction process of the suction device, but also can prevent the liquid in the container from overflowing, thereby causing loss and leakage pollution. The cutting tool of the disclosure is provided with the container of the disclosure, which may lubricate or cool required parts through the container, and can replenish the air through the one-way ventilation structure arranged on the container. In this way, not only a reliability of air replenishment is high, but also an anti-pollution ability of lubricating oil is strong.

Figure 19:
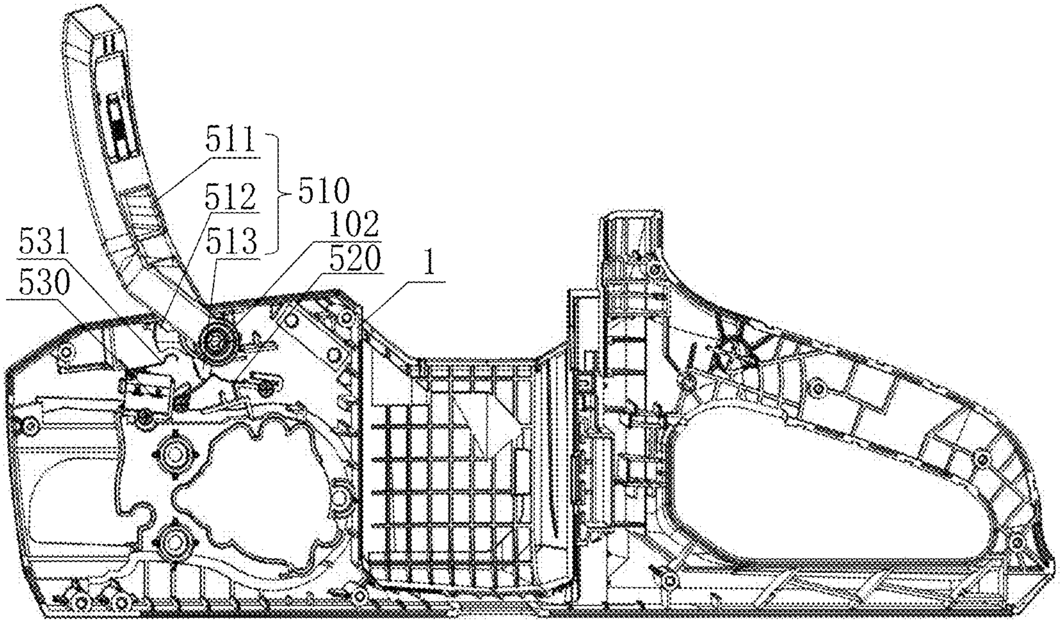
FIG. 19 is a structural view of a braking device when a protective shield is in a first position according to an embodiment of the disclosure.
Figure 20:
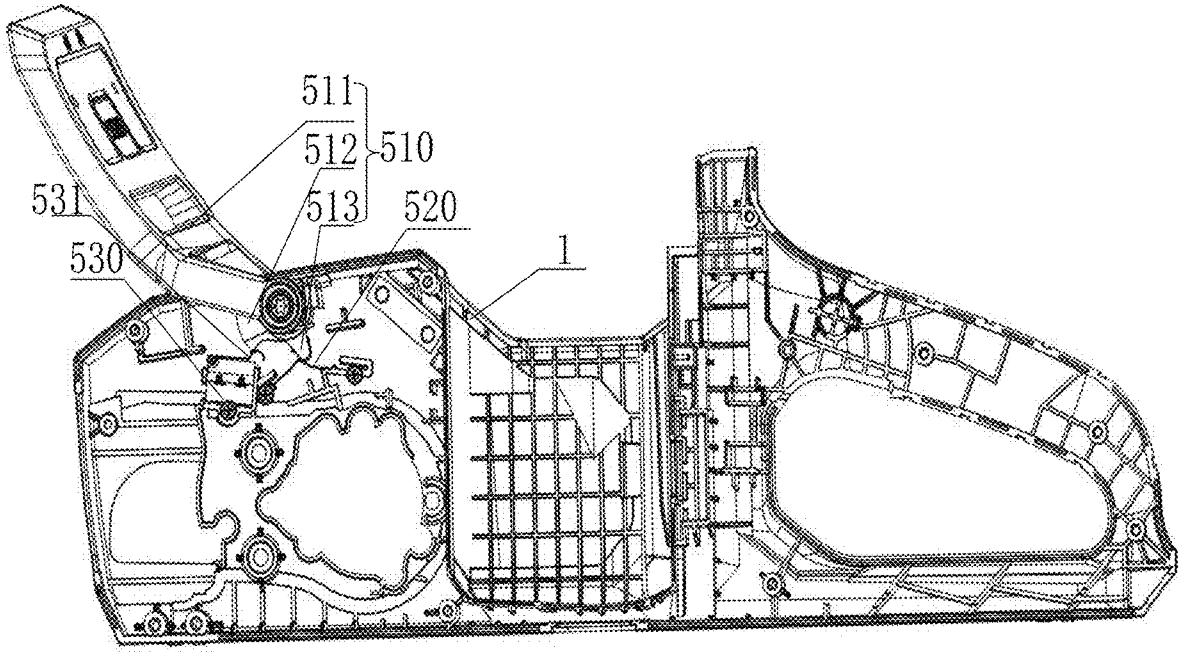
FIG. 20 is a structural view of the braking device when the protective shield is in a second position according to an embodiment of the disclosure.

Please refer to FIG. 19 and FIG. 20. The disclosure provides a power tool. In this embodiment, the power tool is a chainsaw. However, in other embodiment, the power tool may also be a hand-held power tool such as a cutting saw and a hedge trimmer, and a specific structure of the power tool is not limited in the disclosure. A protective shield 510 is mounted on the housing 1 of the chainsaw, and the protective shield 510 is a movable component that may be toggled back and forth to control a braking of a machine during a normal operation. In an embodiment of the disclosure, when the protective shield 510 is in a state (a first position) in FIG. 19, the protective shield 510 will not trigger a braking switch, and the chainsaw is in a braking protection state. When the protective shield 510 rotates counterclockwise to a state (a second position) shown in FIG. 20, the protective shield 510 activates the braking switch, so that the chainsaw is in a normal working state. In another embodiment of the disclosure, when the protective shield 510 is in the first position, the protective shield 510 will not trigger the braking switch, and the chainsaw may be in a normal working state; when the protective shield 510 rotates counterclockwise to the second position, the protective shield 510 will trigger the braking switch, and the chainsaw may be in a braking protection state. There is a gap where the protective shield 510 and the housing 1 are connected. When the chainsaw is in use, the sawdusts are likely to enter the whole machine of the chainsaw, and other dust will also enter after being left for a long time. In addition, the protective shield 510 of the conventional chainsaw is generally made of plastic. When the protective shield 510 is switched between the first position and the second position for many times, a limiting protruding block 513 of the protective shield 510 will be worn out, so that a pulling force exerted on the protective shield 510 is less than a pulling force required by safety regulations, which means that through pushing the protective shield 510 to change a state of the chainsaw, it is easy to cause a misoperation of a braking of the chainsaw and reduce a duration life of the chainsaw.

Figure 31:
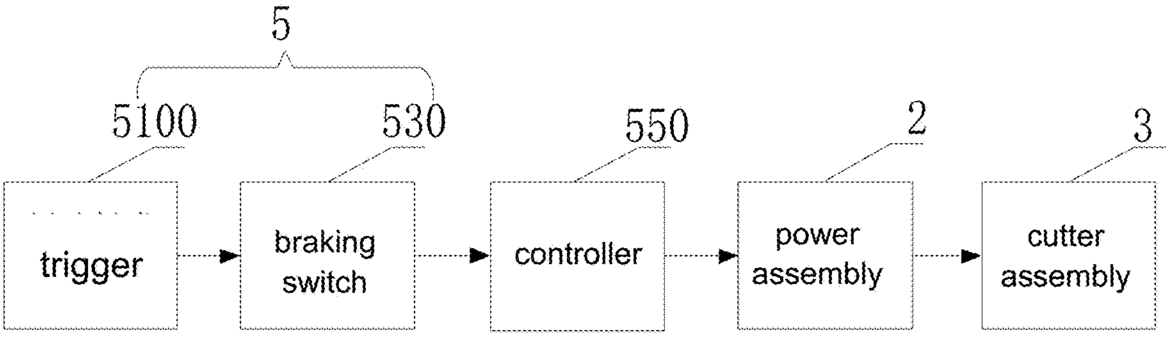
FIG. 31 is a structural block view of the chainsaw according to an embodiment of the disclosure.

Please refer to FIG. 19, FIG. 20 and FIG. 31. A braking device triggers the braking switch 530 through the protective shield 510. The braking switch 530 sends a braking signal to a controller 550. The controller 550 stops the chainsaw from working by controlling the power assembly 2, for example, controlling a rotation of the motor to stop the chainsaw, and the chainsaw is in the braking protection state.

Please refer to FIG. 19 through FIG. 21 and FIG. 31. In an embodiment of the disclosure, a braking device 5 includes a trigger 5100 and the braking switch 530. The braking switch 530 may be triggered by the trigger 5100. The trigger 5100 includes the protective shield 510 and a leaf spring 520. The protective shield 510, the braking switch 530 and the leaf spring 520 are mounted on the housing 1 of the chainsaw, and are used to control the braking of the chainsaw to be on and off. One end of the protective shield 510 is axially connected with the housing 1 of the chainsaw, and allows the protective shield 510 to rotate around a connecting shaft 102. The leaf spring 520 and the braking switch 530 are located on an inner side of the housing 1 and on a side of the connecting shaft 102 of the protective shield 510 away from an edge of the housing 1.

Further, the protective shield 510 includes a protective shield body 511, a braking component 512 and the limiting protruding block 513. The protective shield body 511 is an operation surface. The protective shield body 511 is toggled to control the braking of the chainsaw. The limiting protruding block 513 is used to stabilize an overall state of the protective shield 510. The braking component 512 is used to trigger the braking switch 530 to turn on and off of a braking of the chainsaw. A connecting plate 514 is also mounted on the limiting protruding block 513 to prevent the protective shield 510 from being worn and ensure the safety requirements of the chainsaw. The leaf spring 520 is located on the inner side of the housing 1 and on the side of the connecting shaft 102 of the protective shield 510 away from the edge of the housing 1. The braking switch 530 is provided with a switch trigger part 531, and the braking component 512 changes a state of the braking switch 530 by changing a position of the switch trigger part 531, thereby changing an on and off of the braking of the chainsaw.

Figure 21:
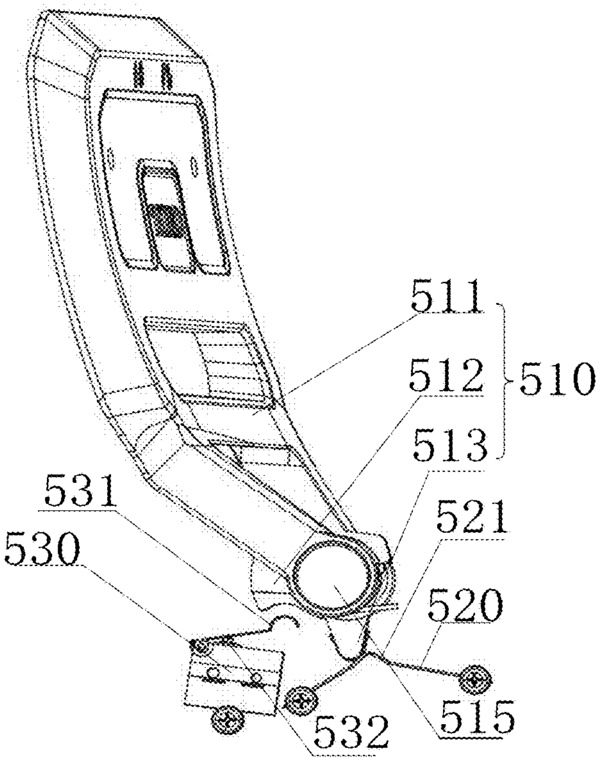
FIG. 21 is a structural view of a braking device of a chainsaw in an embodiment of the disclosure.

Please refer to FIG. 19 through FIG. 21. In an embodiment of the disclosure, one end of the protective shield 510 is axially connected with the housing 1 of the chainsaw, and allows the protective shield 510 to rotate around the connecting shaft 102. One end of the protective shield 510 connected with the housing 1 of the chainsaw is a pincer-like structure, and the housing 1 of the chainsaw is clamped in the pincer-like structure of the protective shield 510. A through hole 515 is arranged at one end of the protective shield 510 connected with the housing 1, a connecting hole is arranged at the position of the housing 1, and the protective shield 510 and the housing 1 are connected with each other through the connecting shaft 102.

Please refer to FIG. 19 through FIG. 21. In an embodiment of the disclosure, the protective shield 510 is a plastic guard plate. The protective shield body 511 is located outside the housing 1, and the protective shield body 511 is an operation surface to trigger the braking of the chainsaw. The limiting protruding block 513 and the braking component 512 are part of the protective shield 510 and are integrally formed with the protective shield 510. In some embodiments, the limiting protruding block 513 is arranged on an end surface of a through hole 515 of the protective shield 510 and is away from a side of the protective shield body 511. The braking component 512 is located on the side of the protective shield body 511, and is located between the protective shield body 511 and the limiting protruding block 513. One side of the braking component 512 is connected with the protective shield body 511, and the other side of the braking component 512 is arc-shaped. When the protective shield 510 rotates toward the braking switch 530, an arc side of the braking component 512 triggers the switch trigger part 531 on the braking switch 530, so that brake of the chainsaw is turned on.

Please refer to FIG. 21. In an embodiment of the disclosure, the limiting protruding block 513 is arranged on the end surface of the through hole 515 of the protective shield 510. In some embodiments, the limiting protruding block 513 is located on a side of the through hole 515 away from the protective shield body 511. The protective shield body 511 and the limiting protruding block 513 are located on opposite sides of the through hole 515, and the limiting protruding block 513 are provided with a connecting plate 514. The connecting plate 514 covers the end surface of the limiting protruding block 513.

Please refer to FIG. 22 through FIG. 25. In an embodiment of the disclosure, the limiting protruding block 513 is arranged in a U-shaped structure on one side of the through hole 515. The limiting protruding block 513 includes a first plane 5130, a second plane 5131, a first side surface 5132, a second side surface 5133 and a third side surface 5134. The first plane 5130 and the second plane 5131 are parallel to a plane where the end face of the through hole 515 is located, and the first plane 5130 is a plane close to the housing 1. The second plane 130 is opposite to the first plane 131 and is a plane away from the housing 1. The first side surface 5132 and the second side surface 5133 are side surfaces connected with the end surface of the through hole 515. The first side surface 5132 and the second side surface 5133 are flat plane. The third side surface 5134 is an end surface of the limiting protruding block 513, which is smoothly connected with the first side surface 5132 and the second side surface 5133, and the third side surface 5134 is arc-shaped. The third side surface 5134, the first side surface 5132 and the second side surface 5133 define the U-shaped structure.

Please refer to FIG. 24 through FIG. 28. In an embodiment of the disclosure, a plurality of concave parts are arranged on the first plane 5130 close to the housing 1 for fixing the connecting plate 514. The concave parts include two L-shaped concave parts 5135 and a first concave part 5136. Back surfaces of the two L-shaped concave parts 5135 are opposite to each other, and are symmetrically arranged on the first plane 5130. Top ends of horizontal parts of the two L-shaped concave parts 5135 are respectively connected with the first side surface 5132 and the second side surface 5133. A depth of the L-shaped concave part 5135 is a first depth D1. The first depth D1 is equal to a depth DO of a clamping component 5141. The clamping component 5141 of the connecting plates 514 are placed in the L-shaped concave part 5135 to fix the connecting plates 514. The back surfaces of the two L-shaped concave parts 5135 are kept in a predetermined distance.

Further, the first concave part 5136 is arranged in a middle part of the two L-shaped concave parts 5135. The first concave part 5136 completely communicates the back surfaces of the two L-shaped concave parts 5135. The two L-shaped concave parts 5135 and the first concave part 5136 define a concave part extending from the first side surface 5132 to the second side surface 5133. A depth of the first concave part 5136 is smaller than a depth of the L-shaped concave part 5135, and a bottom surface of the first concave part 5136 is a stepped surface. On a side near a top of the L-shaped concave part 5135, the first concave part 5136 has a second depth D2. The second depth D2 is much smaller than the first depth D1; in some embodiments, the second depth D2 is smaller than half of the first depth D1. On a side near a bottom of the L-shaped concave part 5135, the first concave part 5136 has a third depth D3, the third depth D3 is close to the first depth D1; in some embodiments, the third depth D3 is greater than three-quarters of the first depth D1. The bottom surface of the first concave part 5136 is set as a stepped surface. The bottom surface of the first concave part 5136 with the second depth D2 may prevent a deformation of the clamping component 5141 placed in the L-shaped concave part 5135. The bottom surface of the first concave part 5136 with the third depth D3 increases a strength of a mold.

Figure 25:
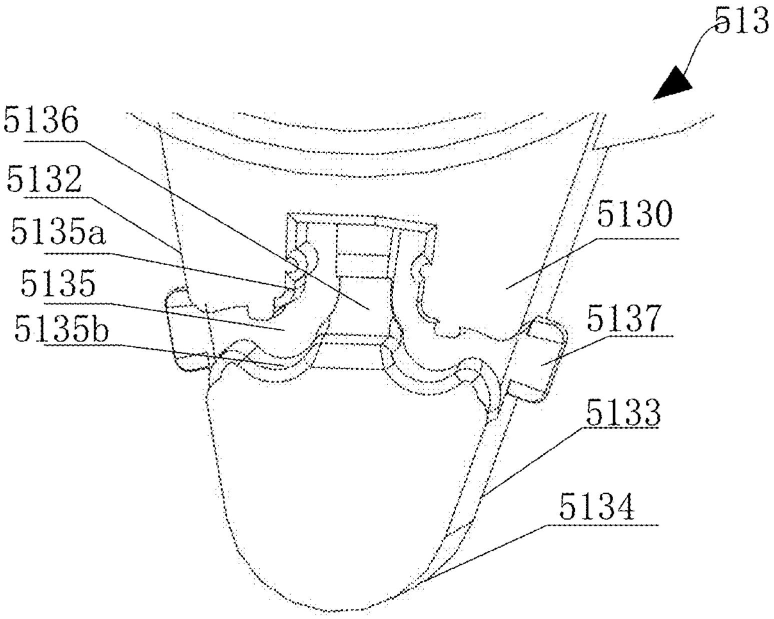
FIG. 25 is a first plan structural view of the limiting protruding block in an embodiment of the disclosure.

Please refer to FIG. 25. In an embodiment of the disclosure, a plurality of bumps 5135*a* are arranged on inner sidewalls of the two L-shaped concave parts 5135 and located at inner sidewall corners of the L-shaped concave parts 5135 to increase a friction between the clamping component 5141 and the sidewalls of the L-shaped concave parts 5135. In order to increase a thickness of the mold used to manufacture the concave part to enhance its robustness, a concave point 5135*b* is arranged on an outer sidewall of the L-shaped concave part 5135 (may be at a position corresponding to the bump 5135*a*). The concave point 5135*b* is located on a bottom sidewall of the outer sidewall of the L-shaped concave part 5135. The concave point 5135*b* is arc-shaped, and one side of the concave point 5135*b* is smoothly connected with a vertical side wall of the outer sidewall of the L-shaped concave part 5135, and the other side of the concave point 5135*b* is smoothly connected with the first side surface 5132 or the second side surface 5133.

Figure 24:
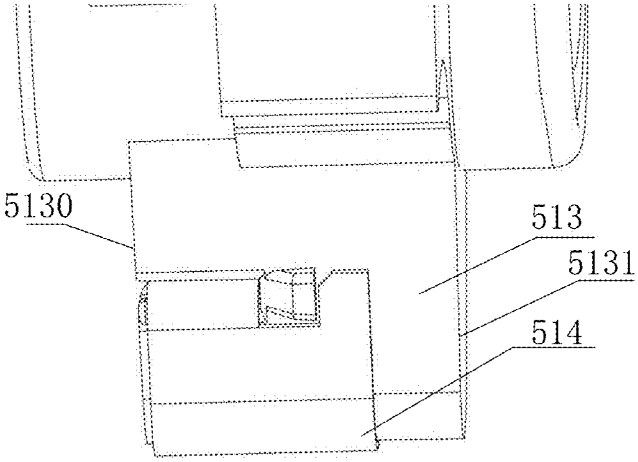
FIG. 24 is a view of a first side surface of a limiting protruding block in an embodiment of the disclosure.

Please refer to FIG. 24 and FIG. 25. In an embodiment of the disclosure, buckles 5137 are respectively arranged on the first side surface 5132 and the second side surface 5133 and are located at the ends of the horizontal parts of the L-shaped concave parts 5135 for defining a position of the connecting plate 514.

Figure 23:
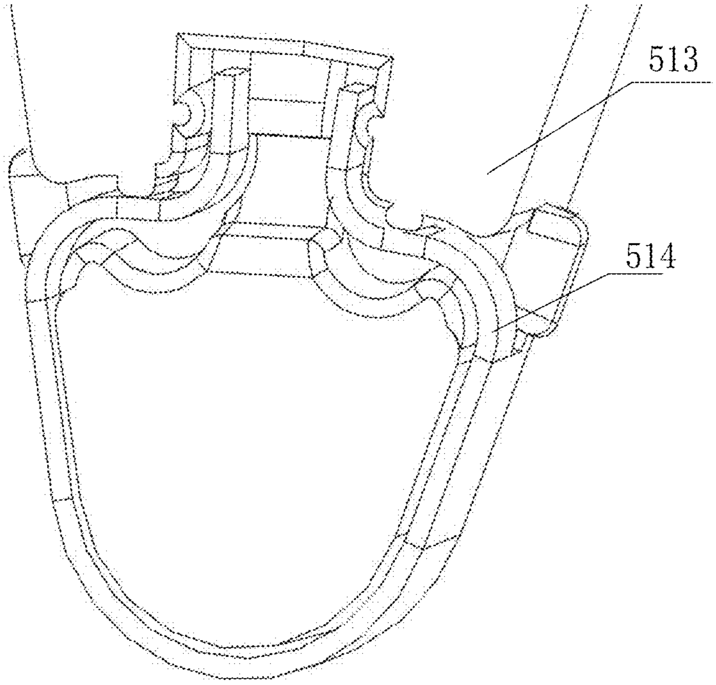
FIG. 23 is a view of a first plan of a limiting protruding block in an embodiment of the disclosure.
Figure 26:
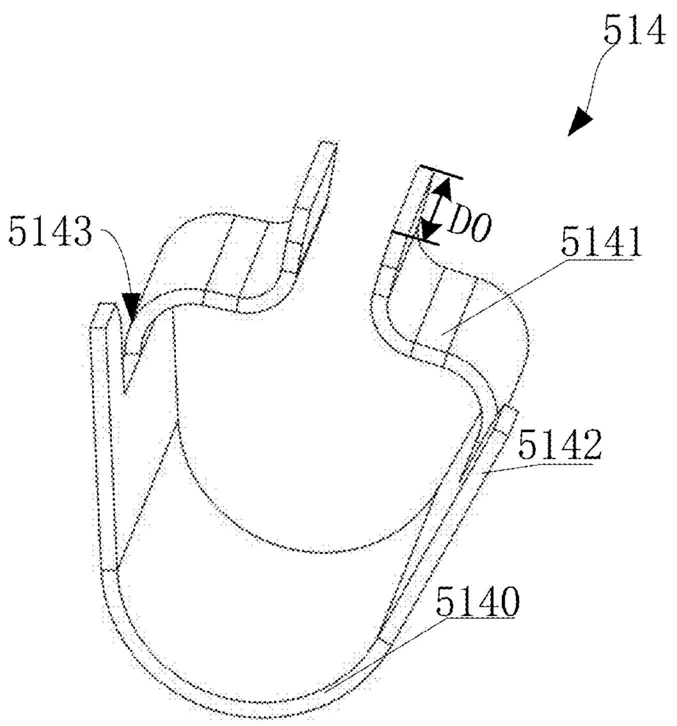
FIG. 26 is a structural view of a connecting plate in an embodiment of the disclosure.
Figure 27:
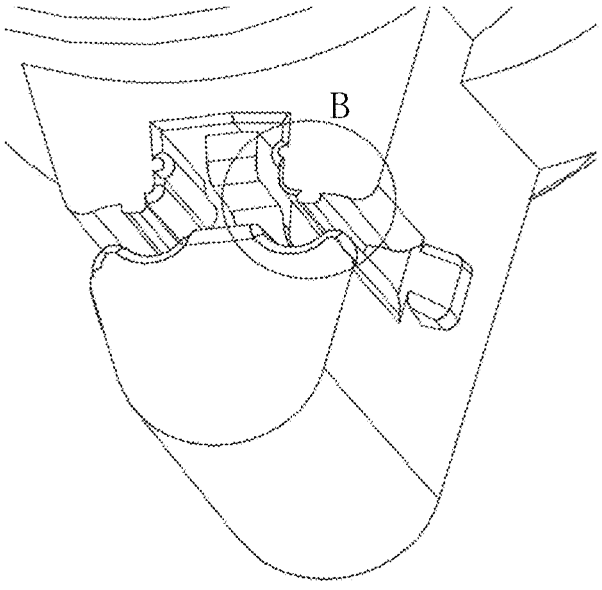
FIG. 27 is a side structural view of the limiting protruding block in an embodiment of the disclosure.
Figure 28:
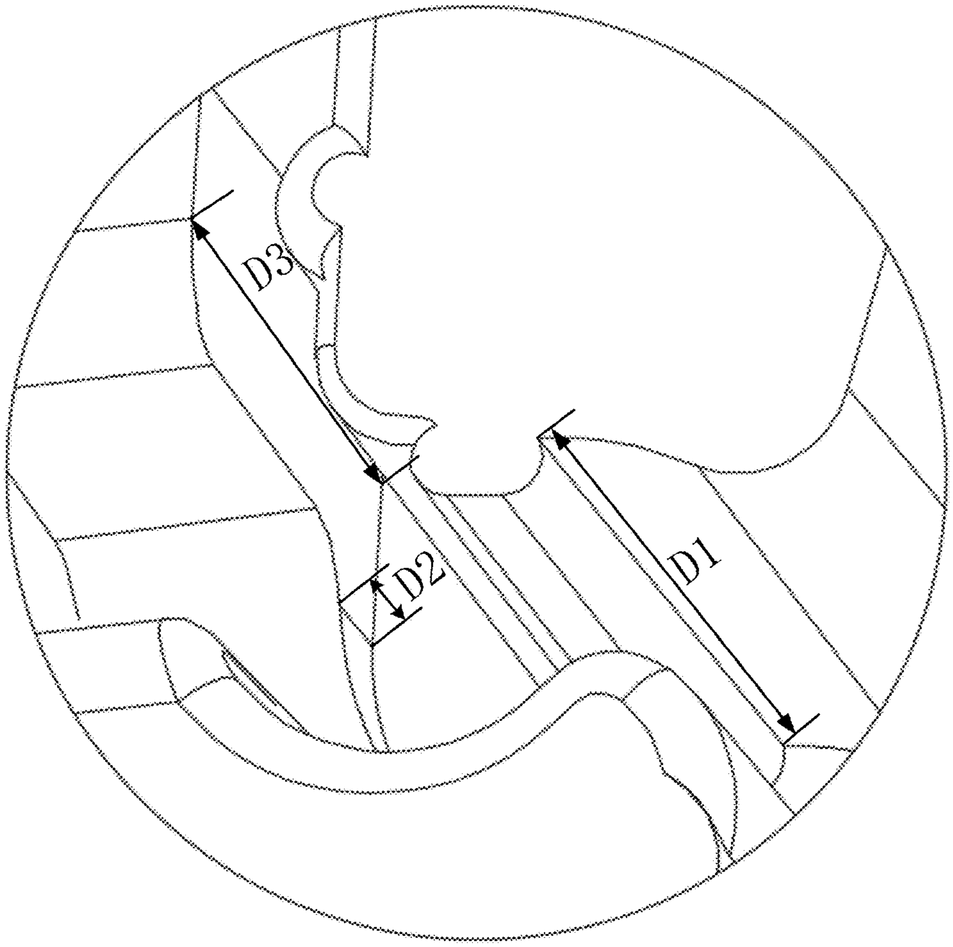
FIG. 28 is an enlarged structural view of B in FIG. 27.

Please refer to FIG. 23 and FIG. 26. In an embodiment of the disclosure, the connecting plate 514 is arranged on the limiting protruding block 513 and covers a contact surface between the limiting protruding block 513 and the leaf spring 520 to prevent the limiting protruding block 513 from being worn. The connecting plate 514 is made of a specific wear-resistant material, such as a metal piece with a certain width. During operation, a contact part between the connecting plate 514 and the leaf spring 520 are coated with grease. The connecting plate 514 is a symmetrical structure, which includes a main body 5140, the clamping component 5141 and a limiting component 5142. An inner side and an outer side of the main body 5140 are respectively fitted with the contact surfaces with the limiting protruding block 513 and the leaf spring 520 to protect the limiting protruding block 513 from being worn. Two symmetrical engaging pieces 5141 are engaged with the L-shaped concave parts 5135 for fixing the connecting plate 514. The two symmetrical limiting components 5142 are arranged corresponding to the buckles 5137.

Please refer to FIG. 23 through FIG. 26. In an embodiment of the disclosure, the main body 5140 of the connecting plate 514 is U-shaped. The main body 5140 is attached to the first side surface 5132, the second side surface 5133 and the third side surface 5134 of the limiting protruding block 513, and a width (depth) of the main body 5140 is less than a width (depth) of the third side surface 5134.

Further, the clamping components 5141 are extended curved surfaces at both ends of the main body 5140. The two symmetrical clamping components 5141 are L-shaped, and backsides of the two symmetrical clamping components 5141 are opposite to each other. The clamping component 5141 is arranged corresponding to the L-shaped concave part 5135. One side of the clamping component 5141 and one side of the main body 5140 are located on the same plane, and a width of the clamping component 5141 is less than a width of the main body 5140.

Further, the limiting components 5142 are extended planes at both ends of the main body 5140, and one side of the limiting component 5142 and the other side of the main body 141 are located on the same plane.

Further, there is a groove 5143 between the limiting component 5142 and the clamping member 5141, and a width of the groove 5143 is substantially equal to a width of the buckle 5137. When the connecting plate 514 is mounted on the limiting protruding block 513, the main body 5140 covers the first side surface 5132, the second side surface 5133 and the third side surface 5134 of the limiting protruding block 513. The clamping component 5141 is clamped in the L-shaped concave part 5135, and the buckle 5137 on the limiting protruding block 513 is located in the groove 5143.

Figure 22:
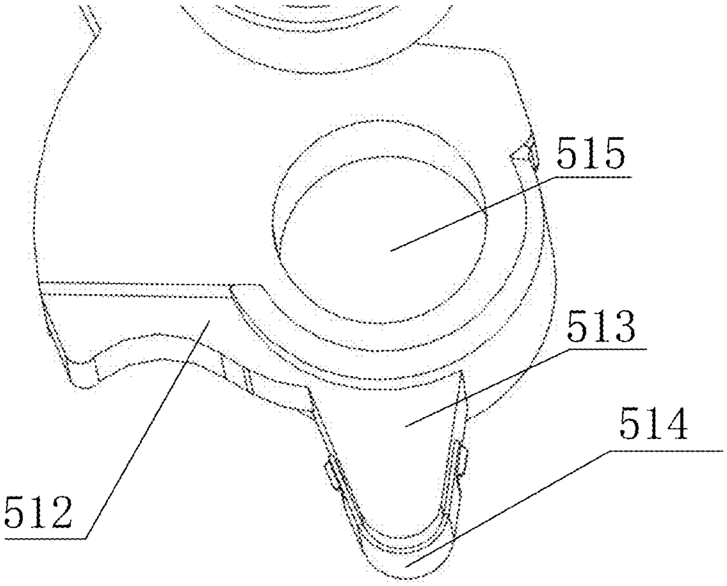
FIG. 22 is a structural view of a limiting protruding block in an embodiment of the disclosure.

Please refer to FIG. 22. In an embodiment of the disclosure, the protective shield 510 further includes the braking component 512. The braking component 512 is located on one side of the protective shield body 511. One side of the braking component 512 is connected with the protective shield body 511, and the other side of the braking component 512 is arc-shaped. In some embodiments, a side of the braking component 512 close to the braking switch 530 is circular arc-shaped.

Please refer to FIG. 19 through FIG. 21. In an embodiment of the disclosure, the leaf spring 520 is mounted on the housing 1 and is located on a side of the limiting protruding block 513 away from the connecting shaft 102, which means on a side of the connecting hole away from the edge of the housing 1. In the embodiment, both ends of the leaf spring 520 are fixed on the housing 1 through screws. The leaf spring 520 is provided with a protrusion 521. The protrusion 521 is located in a middle part of the leaf spring 520, and a distance between the protrusion 521 of the leaf spring 520 and the limiting protruding block 513 is less than a length of the limiting protruding block 513.

Please refer to FIG. 19 through FIG. 21. In an embodiment of the disclosure, the braking switch 530 is mounted inside the housing 1, and is located on a side of the connecting shaft 102 of the protective shield 510 away from an edge of the housing 1. The braking switch 530 is located on a side close to the braking component 512. The braking switch 530 is used to give the controller 550 a control signal of the power assembly to enable the power assembly to be on and off, thus to control the braking of the chainsaw.

Please refer to FIG. 19 through FIG. 21. In an embodiment of the disclosure, the switch trigger part 531 is arranged on the braking switch 530. The switch trigger part 531 is arranged on one side of the braking switch 530 and on a side close to the braking component 512. A first end of the switch trigger part 531 is connected with one side of the braking switch 530, and a second end extends toward the braking component 512 along a side of the braking switch 530 close to the braking component 512.

Further, the braking switch 530 is further provided with an elastic structure 532 on a side close to the braking component 512. The elastic structure 532 is located between the switch trigger part 531 and the braking switch 530. When the braking component 512 is pressed towards the switch trigger part 531, the elastic structure 532 is pressed towards the braking switch 530. When the braking component 512 does not contact the switch trigger part 531, the elastic structure 532 recovers and resets the switch trigger part 531, so that a second end of the switch trigger part 531 keeps a predetermined distance from the braking component 512.

Further, the second end of the braking component 512 in contact with the switch trigger part 531 is set in a circular arc shape, at the same time, the second end of the switch trigger part 531 where the braking switch 530 is in contact with the braking component 512 is set in a circular arc shape. Furthermore, a contact between the braking switch 530 and the braking component 512 is set as a contact between a line (switch trigger part 531) and a surface (the braking component 512), so as to ensure that the braking component 512 can trigger the switch trigger part 531 without over-triggering (the force exerted by the braking component 512 on the switch trigger part 531 is too great). In a embodiment of the disclosure, the circular arc on the braking component 512 and the circular arc on the switch trigger part 531 are concentric circles, and are arranged in parallel to ensure a maximum safe distance between the braking component 512 and the switch trigger part 531, which prevents the braking switch 530 from being triggered by mistake.

Figure 29:
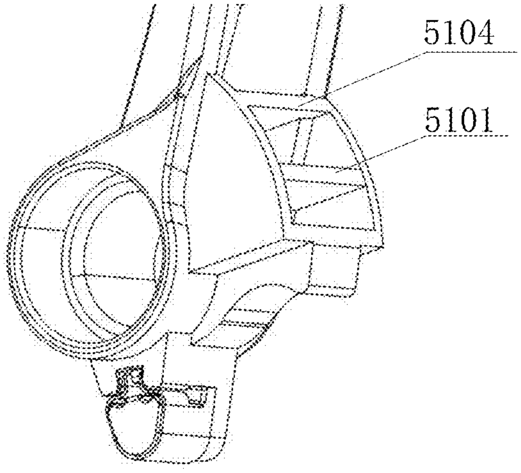
FIG. 29 is a structural view of a dust-proof rib of a protective shield in an embodiment of the disclosure.
Figure 30:
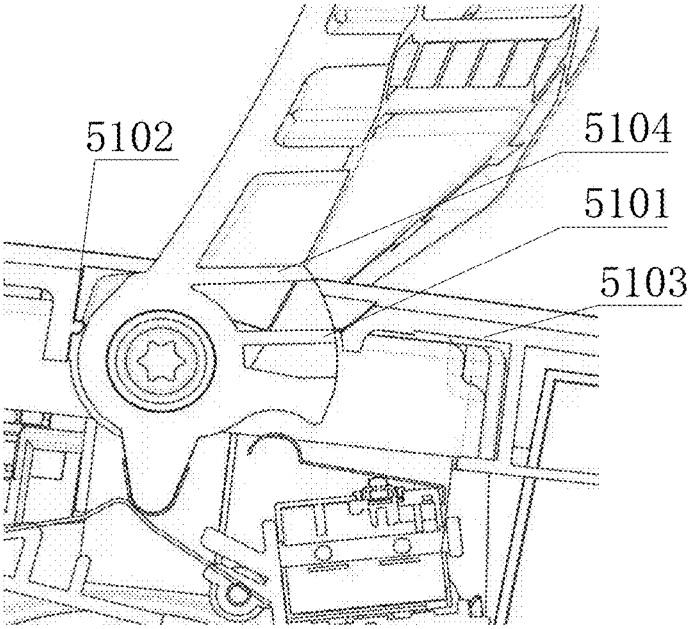
FIG. 30 is a structural view of the dust-proof rib between a protective shield and a housing in an embodiment of the disclosure.

Please refer to FIG. 29 and FIG. 30. In an embodiment of the disclosure, a dust-proof structure is arranged on the protective shield 510 and the housing 1. The protective shield 510 is provided with a first dust-proof rib 5104 and a second dust-proof rib 5101. The first dust-proof rib 5104 and the second dust-proof rib 5101 are located at a gap where the protective shield 11 and the housing 1 are in contact. The first dust-proof rib 5104 is on a contact surface between the protective shield 510 and the housing 1 when the protective shield 510 is in the second position. The second dust-proof rib 5101 is on a contact surface between the protective shield 510 and the housing 1 when the protective shield 510 is in the first position. The housing 1 is provided with a third dust-proof rib 5102 and a fourth dust-proof rib 5103. The third dust-proof rib 5102 and the fourth dust-proof rib 5103 are located at a gap between the protective shield 510 and the housing 1. When the protective shield 510 is in the second position, the first dust-proof rib 5104, the third dust-proof rib 5102 and the fourth dust-proof rib 5103 enable an interior of the housing 1 to be closed. When the protective shield 510 is in the first position, the second dust-proof rib 5101, the third dust-proof rib 5102 and the fourth dust-proof rib 5103 enable the interior of the housing 1 to be closed.

Please refer to FIG. 19 and FIG. 20. In an embodiment of the disclosure, the disclosure further provides a braking control method. When a certain thrust is applied on the protective shield body 511, the braking component 512 approaches the braking switch 530 and triggers the switch trigger part 531, the braking switch 530 outputs a brake off signal, and the chainsaw is in a normal working state. When a certain reverse thrust is exerted on the protective shield body 511, the braking component 512 goes away from the braking switch 530, the braking component 512 does not contact the switch trigger part 531, the braking switch 530 outputs a brake on signal, and the chainsaw returns to a braking protection state.

Please refer to FIG. 19 and FIG. 20. In an embodiment of the disclosure, the chainsaw includes two states: the normal working state and the braking protection state. The protective shield 510 also includes two states: a normal working state and a braking protection state. As shown in FIG. 19, the protective shield body 511 is substantially perpendicular to the edge of the housing 1, and the braking component 512 keeps a predetermined distance from the braking switch 530. The braking component 512 keeps a certain preset distance from an arc end of the switch trigger part 531. The limiting protruding block 513 is located on a side of the protrusion 521 of the leaf spring 520 away from the braking switch 530. At this time, the chainsaw is in the braking protection state. In the disclosure, a normal state of the chainsaw (the braking component 512 is far away from the switch trigger part 531) is set as the braking protection state to avoid a state of braking failure. As shown in FIG. 20, the protective shield body 511 is rotated toward the braking switch 530 by a certain angle. An angle defined between the protective shield body 511 and the edge of the housing 1 is less than a right angle, and the braking component 512 is in contact with the braking switch 530, which enables the switch trigger part 531 of the braking switch 530 to be displaced. The braking component 512 is in contact with the arc end of the switch trigger part 531. The limiting protruding block 513 moves to a side of the leaf spring 520 where the protrusion 521 is close to the braking switch 530, and at this time, the chainsaw is in the normal working state.

Please refer to FIG. 19 and FIG. 20. In an embodiment of the disclosure, when the protective shield 510 is toggled to switch the chainsaw between the braking protection state and the normal working state, the limiting protruding block 513 of the protective shield 510 is switched on both sides of the protrusion 521, and the switch trigger part 531 switches between an opening state and a closed state. When the chainsaw is stabilized in the braking protection state or the normal working state, the protective shield 510 is in a stable state due to a blocking of the leaf spring 520.

Please refer to FIG. 19. In an embodiment of the disclosure, when the chainsaw is in the braking protection state, the limiting protruding block 513 is located on a side of the protrusion 521 of the leaf spring 520 close to the braking switch 530, and the protrusion 521 blocks the limiting protruding block 513 from moving to the other side of the protrusion 521, which means that a movement of the protective shield body 511 to a side close to the braking switch 530 is blocked. A side of the braking component 512 away from the limiting protruding block 513 is limited by ribs on the housing, which means that a movement of the protective shield body 511 to a side away from the braking switch 530 is blocked. Two rotation directions of the protective shield 510 are limited, so that when the chainsaw is shaking, the protective shield 510 will not be displaced.

Please refer to FIG. 19 and FIG. 20. In an embodiment of the disclosure, when a thrust exerted on the protective shield exceeds a certain range, the protrusion 521 on the leaf spring 520 is deformed (a height of the protrusion 521 decreases, and a distance between the limiting protruding block 513 and the protrusion 521 is greater than or equal to the length of the limiting protruding block 513) due to the thrust. The limiting protruding block 513 moves from one side of the leaf spring 520 to the other side of the leaf spring 520, and at the same time, the braking component 512 triggers the braking switch 530, so that the chainsaw is in the normal working state.

Please refer to FIG. 20. In an embodiment of the disclosure, when the chainsaw is in the normal working state, the leaf spring 520 blocks the limiting protruding block 513 from moving towards a direction of the braking switch 530, which means that the movement of the protective shield body 511 to a side away from the braking switch 530 is blocked. At the same time, the braking switch 530 blocks the limiting protruding block 513 from continuing to move towards the side away from the braking switch 530, which means that a movement of the protective shield body 511 to approach the braking switch 530 is blocked. The two rotation directions of the protective shield 510 are limited, so that when the chainsaw is shaking, the protective shield 510 will not be displaced.

Please refer to FIG. 19 and FIG. 20. In an embodiment of the disclosure, when the chainsaw needs to be reset, a reverse thrust is applied on the protective shield body 511 to enable the protective shield 510 to return to the braking protection state. At the same time, the limiting protruding block 513 moves from the other side of the protrusion 521 to one side of the protrusion 521, and the braking component 512 moves away from the braking switch 530. In an embodiment, a range of thrust and reverse thrust is from to 60N.

Please refer to FIG. 19, FIG. 20 and FIG. 31. In an embodiment of the disclosure, the disclosure further provides a cutting tool, such as the chainsaw. The chainsaw includes the braking device 5, the controller 550, the power assembly 2 and the cutter assembly 3. The braking device 5 includes the trigger 5100 and the braking switch 530. The trigger 5100 includes the protective shield 510 and the leaf spring 520. The controller 550 is connected with the braking switch 530 in the braking device 5, the power assembly 2 is connected with the controller 550, and the cutter assembly 3 is connected with the power assembly 2.

Please refer to FIG. 19, FIG. 20 and FIG. 31. In an embodiment of the disclosure, the braking switch 530 is mounted on the housing 1 and is located on a side of the connecting shaft 102 of the protective shield 510 away from an edge of the housing 1. The braking switch 530 is used to give a control signal to the controller 550, thereby controlling the power assembly 2 to start or stop and the braking of the chainsaw. The braking switch 530 is also provided with the switch trigger part 531, the switch trigger part 531 is movably connected with the braking switch 530. The controller 550 is, for example, a control board.

Please refer to FIG. 31. In an embodiment of the disclosure, the power assembly 2 is connected with the controller 550. When the protective shield 510 rotates to a side of the braking switch 530, the braking component 512 on the protective shield 510 triggers the braking switch 530 to enable the braking switch 530 to work. The controller 550 receives the signals and enables the power assembly 2 connected with the controller 550 to work normally. When the protective shield 510 rotates to a side away from the braking switch 530, the braking component 512 on the protective shield 510 leaves the switch trigger part, so that the braking switch 530 is turned off. The controller 550 receives the signals and stops the power assembly 2 connected with the controller 550, and the power assembly 2 is, for example, a motor.

Please refer to FIG. 31. In an embodiment of the disclosure, the cutter assembly 3 is connected with the power assembly 2 through a chain. When the power assembly 2 works normally, a switch of the chainsaw normally turns on and off the cutter assembly 3. When the power assembly 2 is stopped, the cutter assembly 3 is forced to be in a stopped state.

Please refer to FIG. 32 through FIG. 46. The disclosure provides a chainsaw. The chainsaw includes the housing 1, the power assembly 2, the cutter assembly 3 and the braking assembly 6. The power assembly 2 and the braking assembly 6 are located in the housing 1. The power assembly 2 supplies power to the cutter assembly 3. The braking assembly 6 stops the cutter assembly 3 from working in an emergency.

Figure 32:
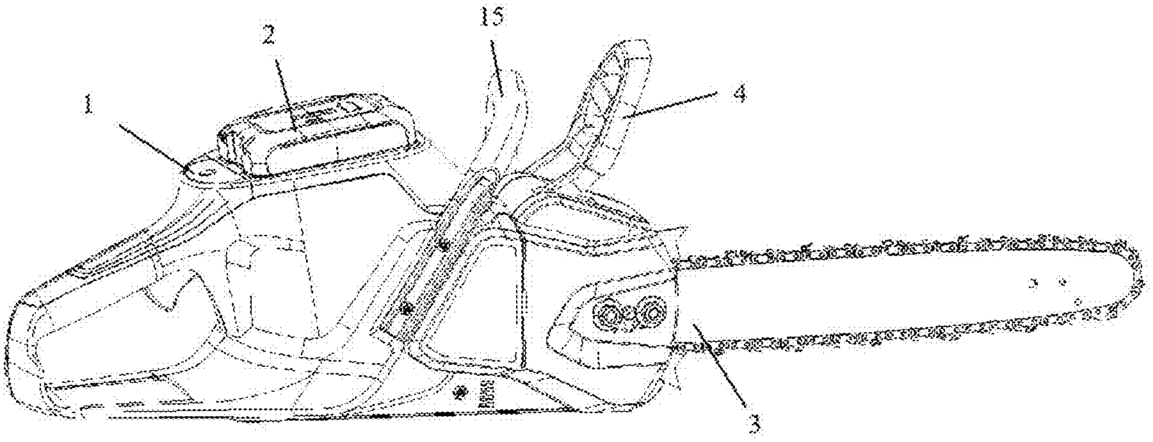
FIG. 32 is a schematic structural view of a chainsaw according to an embodiment of the disclosure.
Figure 33:
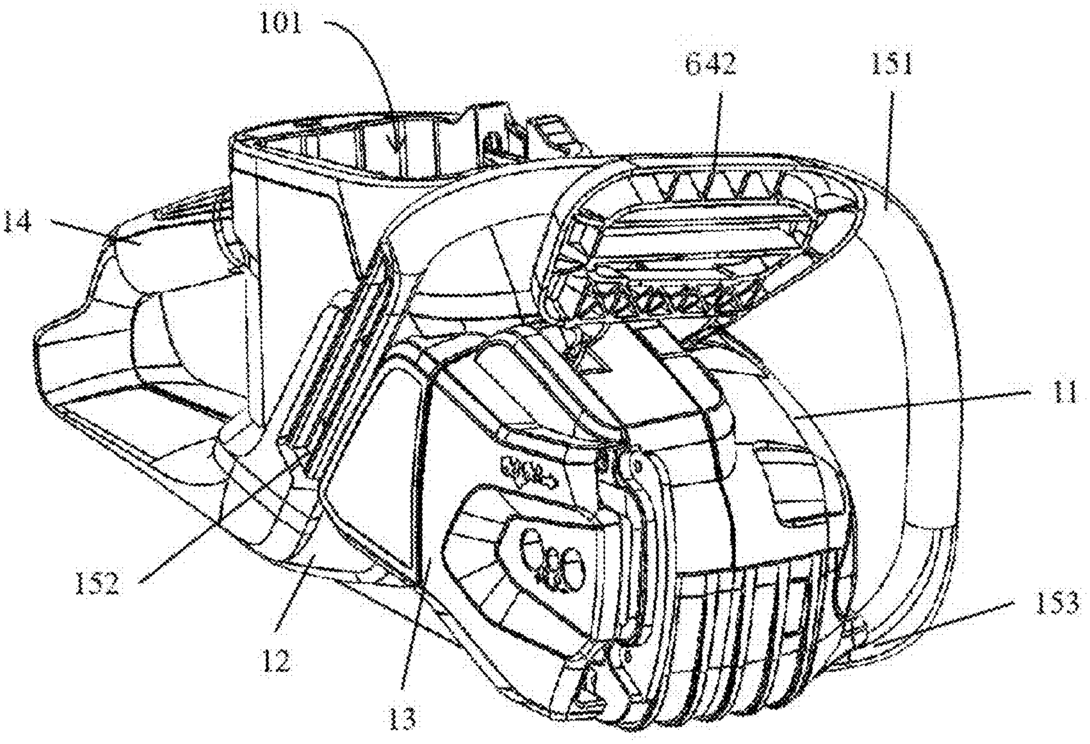
FIG. 33 is a schematic view of a structure of a housing of the chainsaw according to an embodiment of the disclosure.

Please refer to FIG. 32 and FIG. 33. In an embodiment of the disclosure, the housing 1 includes a first housing 11, a second housing 12 and a third housing 13. The first housing 11 and the second housing 12 are arranged to be engaged with each other, and a housing cavity 101 is defined between the first housing 11 and the second housing 12 for placing and mounting the power assembly 2. A side wall of the second housing 12 away from the first housing 11 is provided with a mounting groove recessed toward the first housing 11 and the third housing 13 detachably mounted on the second housing 12. The third housing 13 is engaged with the mounting groove to define a mounting cavity for housing the cutter assembly 30 of the chainsaw.

Please refer to FIG. 32 and FIG. 0.33, in an embodiment of the disclosure, the housing 1 further includes the rear handle 14 arranged at its rear end. In the embodiment, the first housing 11 and the second housing 12 enclosed to defined the rear handle 14, which means that the rear handle 14 is integrally formed with the housing 1. An integral molding of the rear handle 14 and the housing 1 enhances a stability of a connection between the rear handle 14 and the housing 1 and reduces a production cost of the chainsaw. In other embodiments of the disclosure, the rear handle 14 may also be arranged separately from the housing 1, and it is only necessary to ensure the stability of the connection between the rear handle 14 and the housing 1.

Please refer to FIG. 32 and FIG. 0.33, in an embodiment of the disclosure, the housing 1 is provided with the front handle 15. The front handle 15 is detachably connected with the housing 1, and the front handle 15 is provided with a holding part 151, a first fixing part 152 and a second fixing part 153. The first fixing part 152 and the second fixing part 153 are respectively located at both ends of the holding part 151. The first fixing part 152 is fixedly connected with a side wall of the second housing 12, and the second fixing part 153 is arranged at a bottom of the housing 1 and is connected with the first housing 11. The holding part 151 extends from one end of the first fixing part 152 towards a direction away from the second housing 12, and is arranged around the housing 1, so that the housing 1 is surrounded and protected by the holding part 151.

Figure 34:
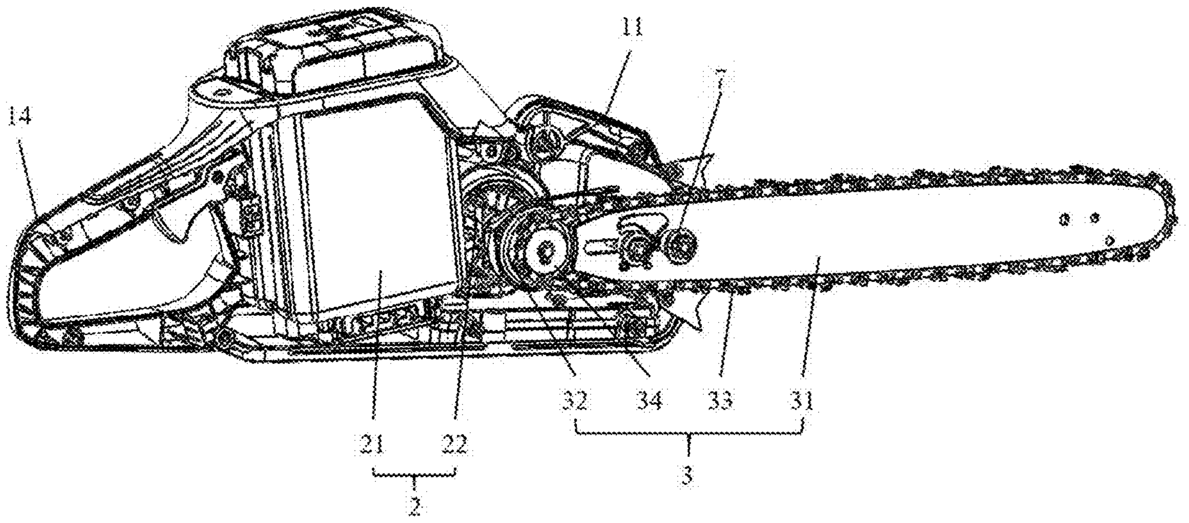
FIG. 34 is another schematic structural view of the chainsaw in an embodiment of the disclosure.

Please refer to FIG. 34, in an embodiment of the disclosure, the power assembly 2 includes a power source 21 and a driving motor 22. The power source 21 and the driving motor 22 are mounted in the housing cavity 101, and the power source 21 is connected with the driving motor 22 and supplies power for it. An output shaft 221 of the driving motor 22 protrudes from a side wall of the second housing 12, extends into the mounting cavity and is connected with the cutter assembly 3 to drive the cutter assembly 3 to rotate. The power source 21 is a battery pack. The battery pack 21 is located between the front handle 15 and the rear handle of the chainsaw. The battery pack 21 is detachable and may be removed from the chainsaw and mounted on other tools for use, such as a hedge trimmer, a blower, a mower, a washing machine, and the like.

Figure 35:
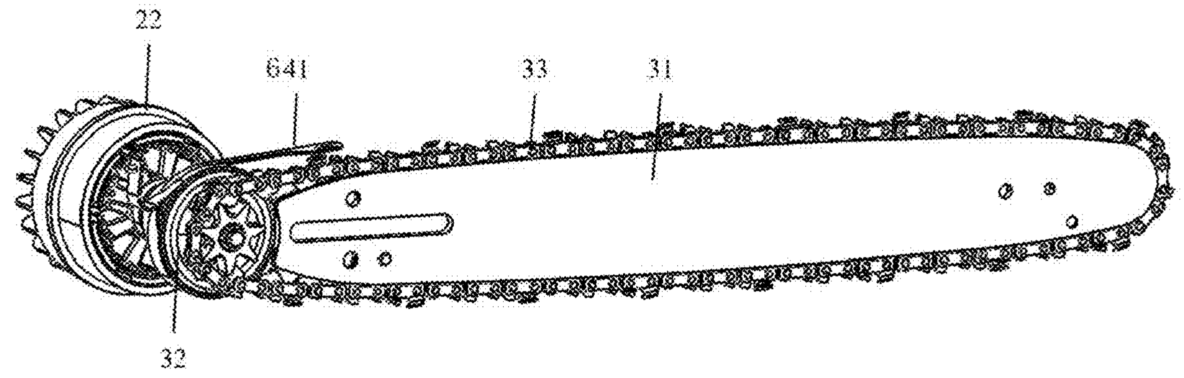
FIG. 35 is a schematic structural view of an assembly of the driving motor with the chainsaw according to an embodiment of the disclosure.
Figure 36:
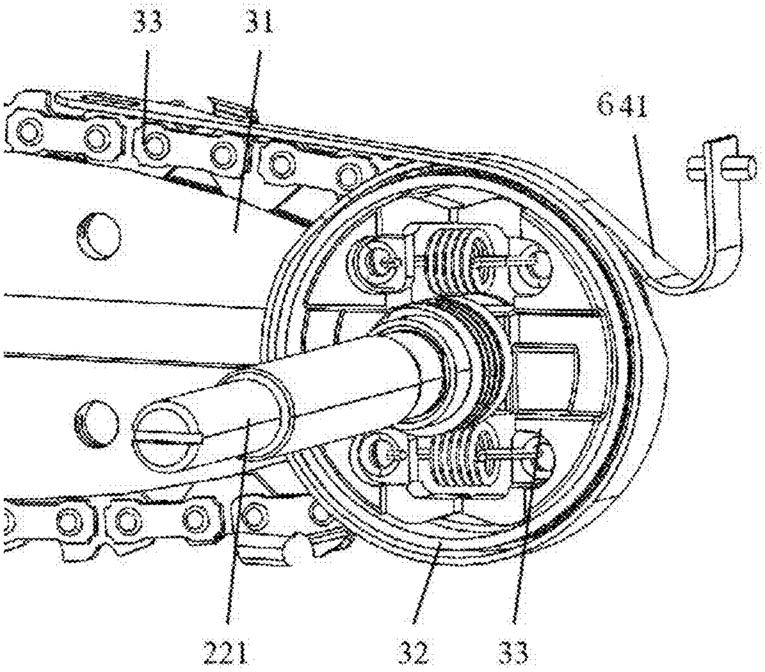
FIG. 36 is a schematic partial structural view of the chainsaw according to an embodiment of the disclosure.

Please refer to FIG. 34 through FIG. 36, in an embodiment of the disclosure, the cutter assembly 3 includes a guiding plate 31, a sprocket 32, a chain 33, a sprocket gasket 34 and a clutch 35. The driving motor and the chain perform transmission through the clutch 35 and the sprocket 32, which means that the sprocket 32 and the clutch are equivalent to transmission assemblies. The sprocket 32 is located in the mounting cavity defined between the second housing 12 and the third housing 13, and is mounted through the mounting groove. One end of the guiding plate 31 is located in the mounting cavity and connected with the housing 1 through a tension mechanism 7, the sprocket 32 is located on one side of the guiding plate 31, and there is a gap between the sprocket 32 and the guiding plate 31.

Figure 37:
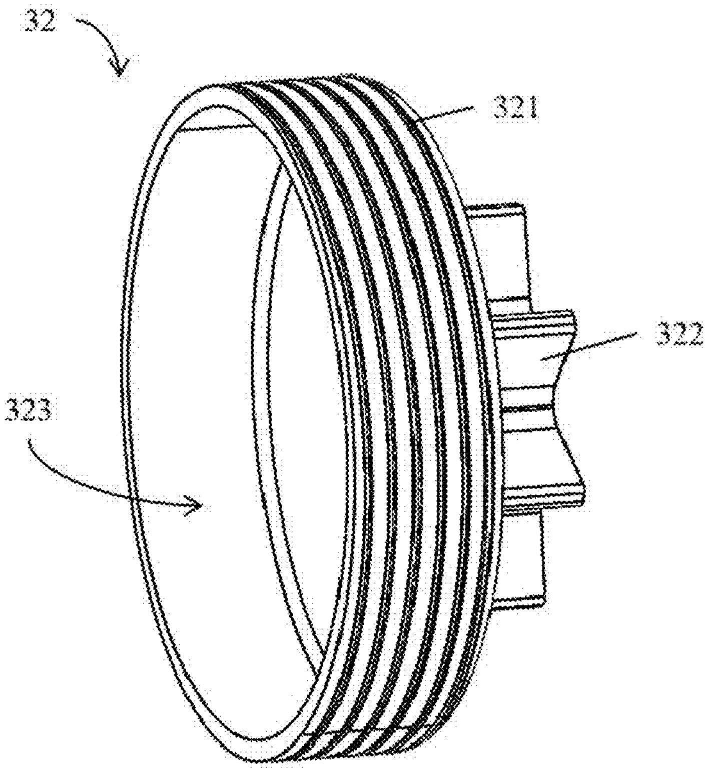
FIG. 37 is a schematic structural view of a sprocket in an embodiment of the disclosure.
Figure 38:
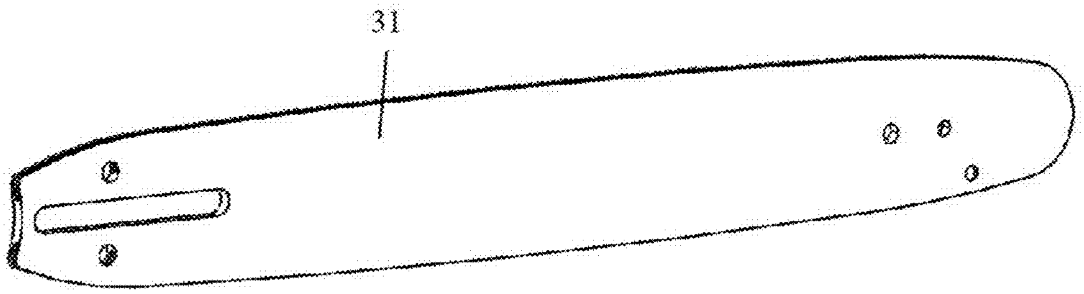
FIG. 38 is a schematic structural view of a guiding plate in an embodiment of the disclosure.
Figure 39:
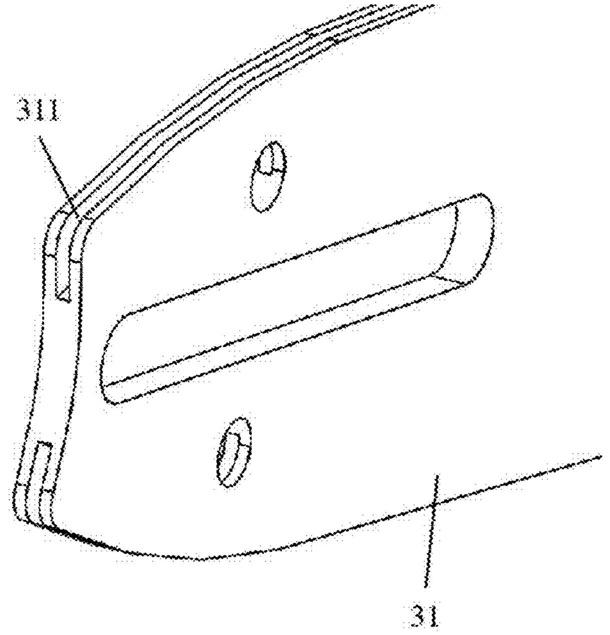
FIG. 39 is a schematic partial structural view of the guiding plate in an embodiment of the disclosure.

Please refer to FIG. 37 through FIG. 39, in an embodiment of the disclosure, the sprocket 32 includes a sprocket disc 321 and a sprocket teeth 322. The sprocket teeth 322 are fixedly connected with one side of the sprocket disc 321. The sprocket teeth 322 and the sprocket disc 321 are integrally formed, and the sprocket teeth 322 and the sprocket disc 321 are coaxially arranged. A through hole is arranged in a center of the sprocket teeth 322 for mounting the sprocket gasket 34. The chain 33 is arranged along a circumference of the guiding plate 31 and meshes with the sprocket teeth 321 for transmission. The guiding plate 31 is provided with a positioning groove 311 along its circumference. The transmission teeth 331 on the chain 33 are located in the positioning groove 311. When the driving motor 22 drives the sprocket 32 to rotate, the chain 33 moves along the positioning groove 311 to complete cutting.

Figure 40:
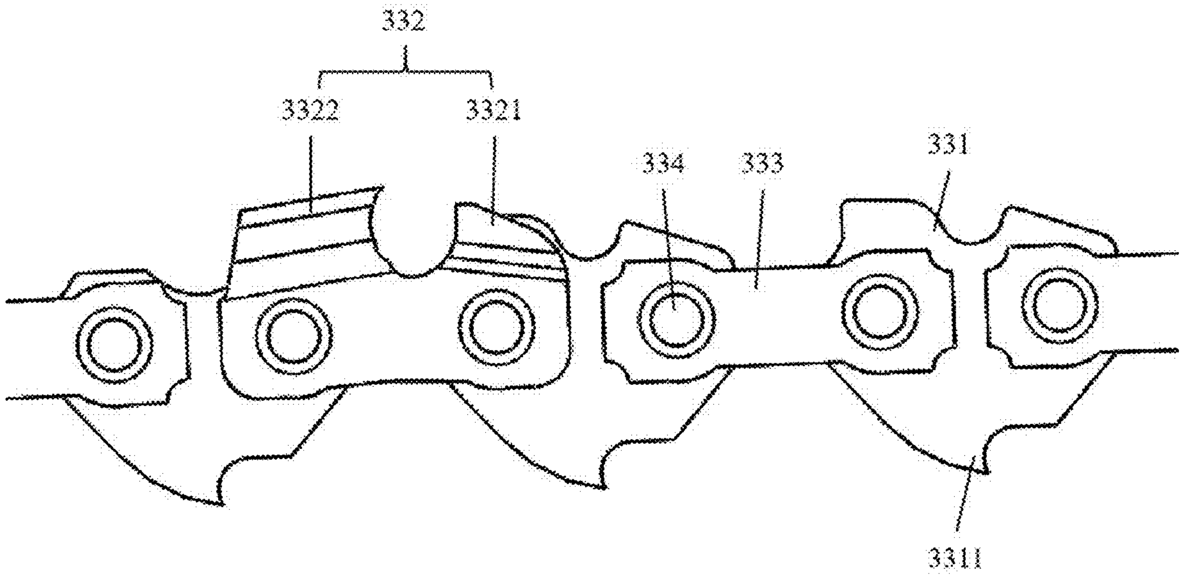
FIG. 40 is a schematic structural view of a chain in an embodiment of the disclosure.

Please refer to FIG. 40, in an embodiment of the disclosure, the chain 33 includes a transmission tooth 331, a cutting tooth 332 and a connecting link plate 333. Each two of the transmission teeth 331 is connected through the connecting link plate 333, and both sides of the transmission teeth 331 are connected with the connecting link plate 333, which means that the transmission teeth 331 are located between the two connecting link plates 333, and the plurality of transmission teeth 331 are connected through the plurality of connecting link plates 333 connected end to end to define the chain 33. The cutting teeth 332 are distributed evenly and at intervals on the connecting link plate 333 of the chain 33 and are integrally formed with the connecting link plate 333, and the cutting teeth 332 are staggeredly distributed on the connecting link plate 333 on both sides of the transmission teeth 331. The chain 33 includes a plurality of links. In one embodiment, each link of the chain 33 includes three transmission teeth 331 and one cutting tooth 332, each two transmission teeth 331 are connected through the connecting link plate 333, and both sides of the transmission teeth 331 are provided with a connecting link plate 333, which means that the transmission tooth 331 are located between the two connecting link plates 333. In other embodiments of the disclosure, each link of the chain may include other numbers of transmission teeth 331 and cutting teeth 332.

Please refer to FIG. 40, in an embodiment of the disclosure, the transmission tooth 331 are provided with a transmission protrusion 3311. The transmission protrusions 3311 mesh with the sprocket teeth 322 for transmission, and when the chain 33 rotates around the guiding plate 31, the transmission protrusion 3311 is located in the positioning groove 311 to prevent the chain from running or de-chaining. In this embodiment, the cutting teeth 332 include a cutting part 3321 and a depth limiting part 3322. The cutting part 3321 and the depth limiting part 3322 are respectively located at two ends of the connecting link plate 333.

Figure 41:
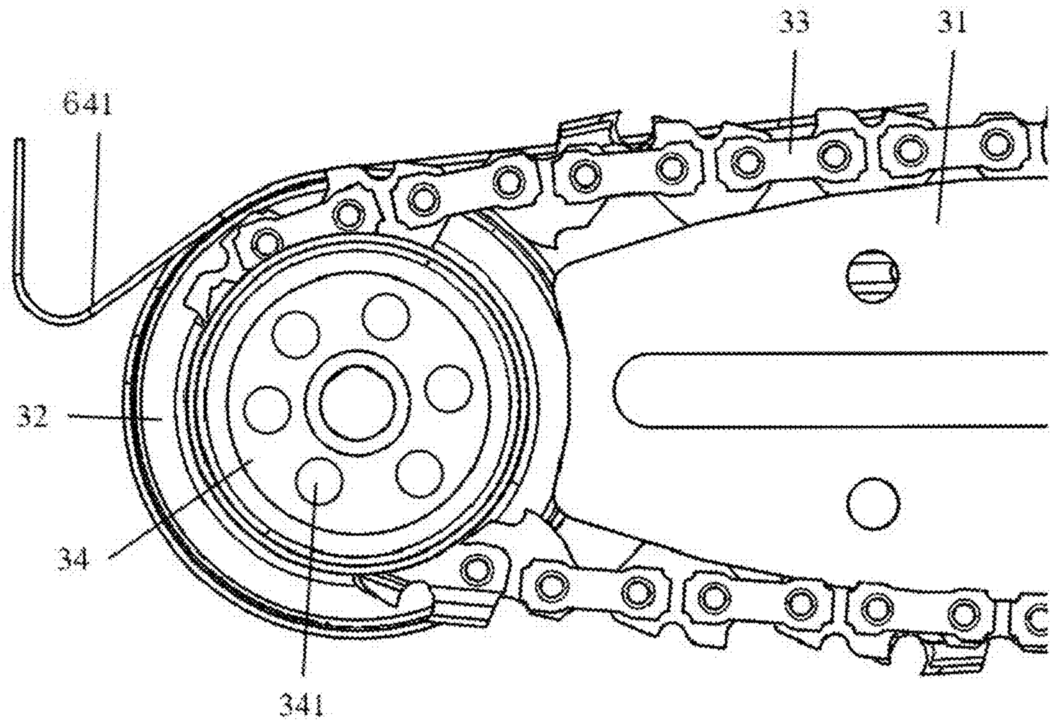
FIG. 41 is a schematic structural view of the guiding plate in an embodiment of the disclosure.
Figure 42:
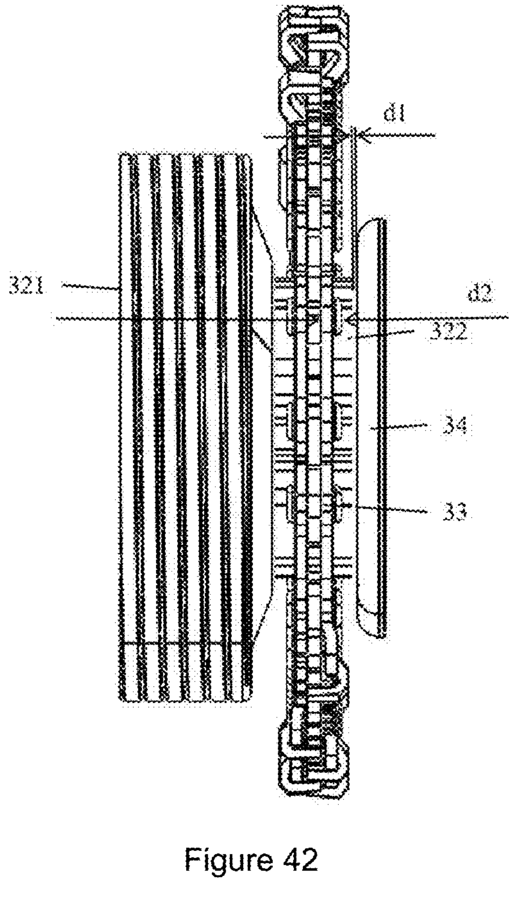
FIG. 42 is a schematic structural view of an assembly of a sprocket gasket with the sprocket in an embodiment of the disclosure.
Figure 43:
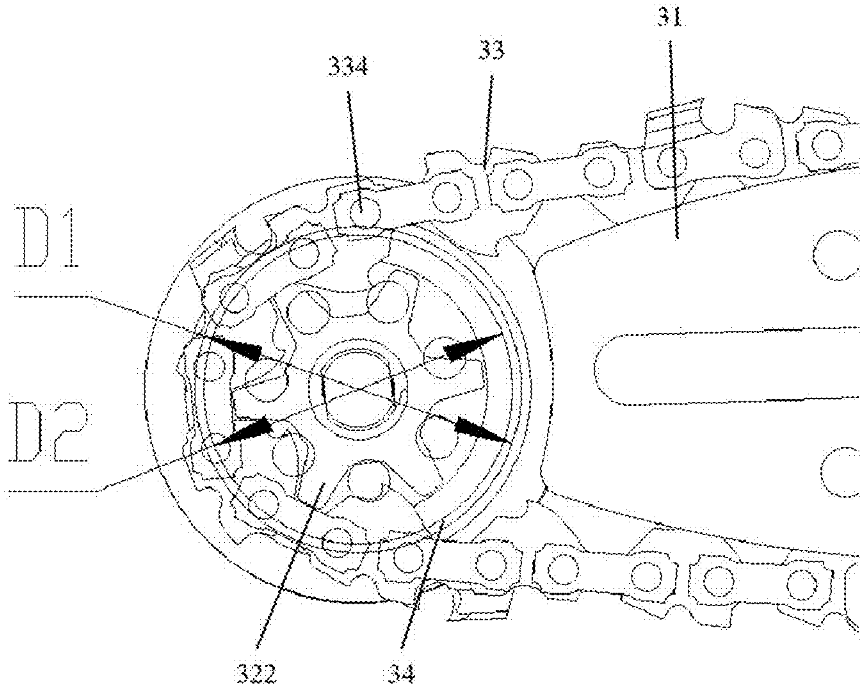
FIG. 43 is a schematic view of a diameter dimension of the sprocket gasket in an embodiment of the disclosure.

Please refer to FIG. 41 to FIG. 43, in an embodiment of the disclosure, the sprocket gasket 34 is mounted on the sprocket teeth 322, the sprocket teeth 322 is located between the sprocket gasket 34 and the sprocket disc 321, and an outer diameter D1 of the sprocket gasket 34 is greater than an outer diameter D2 of the riveting head where the chain 33 meshes with the sprocket teeth 322. The chain 33 meshed with the sprocket teeth 322 is located within the outer diameter of the sprocket gasket 34 or the riveting head of the chain 33 is partially or completely hidden within the outer diameter of the sprocket gasket 34. And a distance d2 between a top of a riveting head 334 and a surface of the transmission tooth 331 is greater than a distance d1 between the sprocket gasket 34 and the sprocket teeth 322. A vertical distance d2 between the top of the riveting head 334 and the surface of the transmission tooth 331 is greater than a vertical distance d1 between the surface of the sprocket gasket 34 and a surface on a side of the sprocket teeth 322 close to the sprocket gasket 34, so that there is a large fall between the riveting head 334 of the chain and the transmission teeth 331. The fall is much larger than a gap between the sprocket teeth 322 and the sprocket gasket 34. When the chain 33 is partially displaced, the riveting head 334 of the chain will interfere with the sprocket gasket 34, thereby preventing a further displacement of the chain 33, which prevents the transmission teeth 331 of the chain 33 from being caught in the gap between the sprocket teeth 322 and the sprocket gasket 34, and prevents a chain movement from being stuck and even an occurrence of high-risk failures such as chain running, chain jumping, and de-chaining. At the same time, when the riveting head 334 of the chain interferes with the sprocket gasket 34, an abnormal noise will occur due to a collision with each other, which may remind the operator to stop the chainsaw for inspection.

Please refer to FIG. 41 and FIG. 43, in an embodiment of the disclosure, a plurality of ventilation holes 341 are arranged on the sprocket gasket 34, so that when the sprocket is running, the sprocket may enable the air to enter through the ventilation holes of the sprocket gasket 34 on a side of the sprocket and follow the tooth shape of the sprocket teeth 322 to exhaust radially, so that airflow generated by an operation of the sprocket is equivalent to a small fan. In this way, the airflow is used to synchronously blow sawdust generated in a process of chain cutting, so as to avoid a continuous accumulation of sawdust in a gap between the sprocket disc 321 and the housing and prevent the sawdusts from filling the braking steel belt or other internal components. This eliminates an occurrence of failures such as micro switch failure, braking steel belt stuck and so on due to the sawdusts accumulation. In this embodiment, an outer circumference of the sprocket gasket 34 is provided with a flange outward. It should be noted that positions of the ventilation holes avoid an operation limiting position of the riveting head 334 of the chain 33 and the tooth shape of the sprocket teeth, and is set at a position of a tooth groove of the sprocket teeth, so that the air intake is smooth and a toothed air exhaust may be maximized and increase a dust removal effect.

Figure 44:
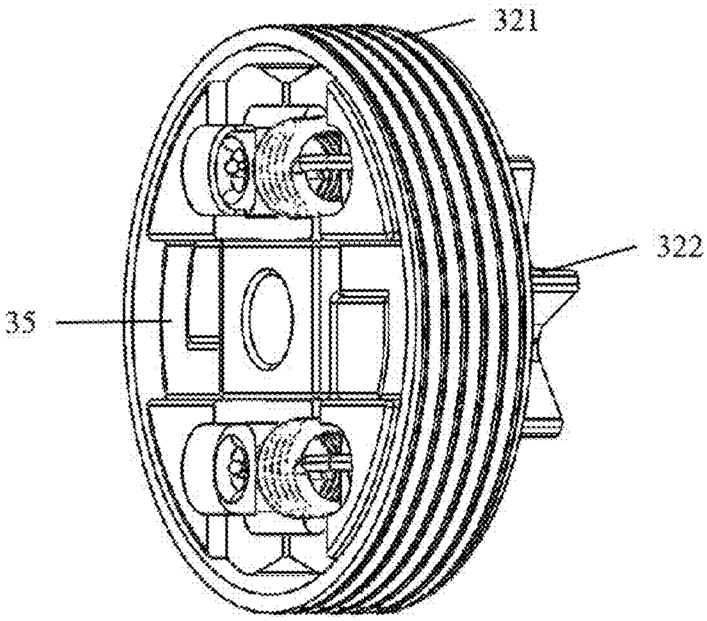
FIG. 44 is a left view of FIG. 42.
Figure 45:
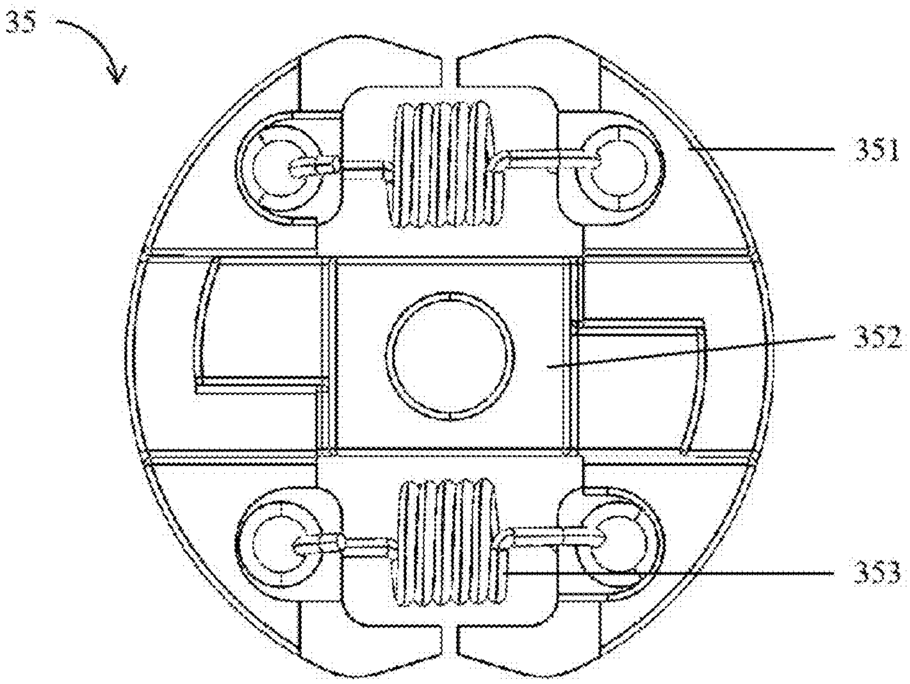
FIG. 45 is a schematic structural view of an assembly of a clutch with the sprocket in an embodiment of the disclosure.
Figure 46:
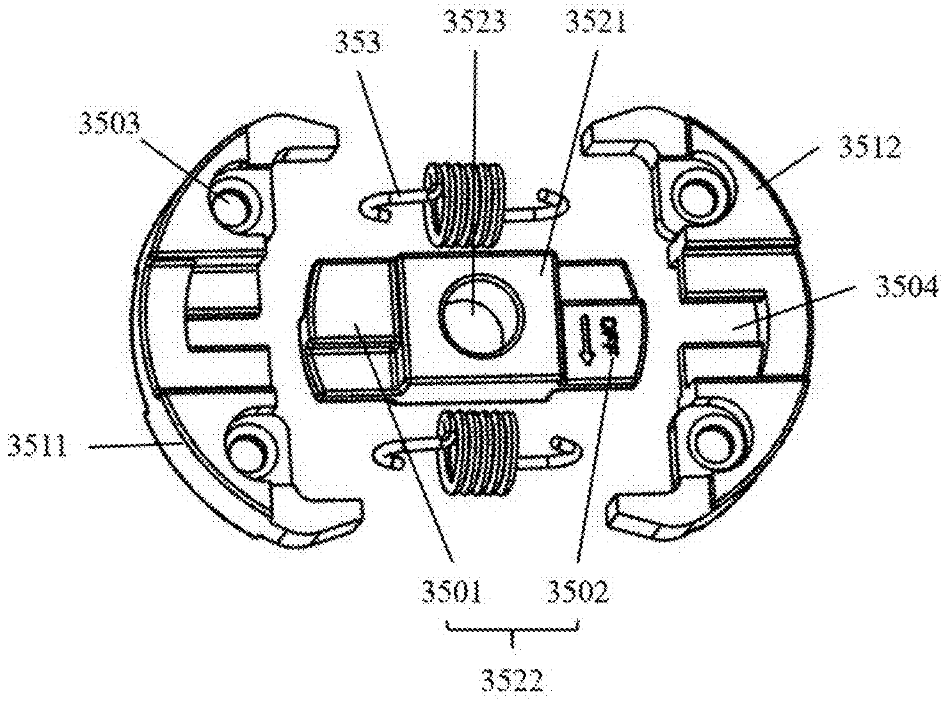
FIG. 46 is a schematic structural view of the clutch in an embodiment of the disclosure.

Please refer to FIG. 44 through FIG. 46, in an embodiment of the disclosure, an accommodating cavity 323 of the clutch is concavely defined on a side of the sprocket disc 321 opposite to the sprocket teeth 321. The clutch 35 is mounted in the accommodating cavity 323 of the clutch, and the clutch 35 is connected with the output shaft 221 of the driving motor 22. In the embodiment, the clutch 35 includes at least two clutch blocks 351, a clutch block holder 352 and a tension spring 353. The clutch blocks 351 are located on both sides of the clutch block holder 352, and the two clutch blocks 351 are connected through the tension spring 353.

Please refer to FIG. 44 through FIG. 46. The clutch block holder 352 includes a driving block 3521 and at least two limiting blocks 3522. The limiting blocks 3522 are arranged on both sides of the driving block 3521, and an output shaft connecting hole 3523 is arranged in a center of the driving block 3521 for fixedly connecting with the output shaft 221 of the driving motor 22. The limiting block 3522 includes a first limiting block 3501 and a second limiting block 3502, and the first limiting block 3501 and the second limiting block 3502 are centrally symmetric with respect to a center of the output shaft connecting hole 3523. The clutch block 351 includes a first clutch block 3511 and a second clutch block 3512. The first clutch block 3511 and the second clutch block 3512 are respectively mounted on the first limiting block 3501 and the second limiting block 3502, and both ends of the first clutch block 3511 and the second limit block 3512 are provided with a tension spring connecting hole 3503. The first clutch block 3511 and the second clutch block 3512 are respectively connected with each other through the tension spring 353, and both ends of the tension spring 353 are respectively connected with the tension spring connecting holes 3503.

Please refer to FIG. 44 through FIG. 46. In an embodiment of the disclosure, a groove 3504 is arranged on a side of the clutch block 351 connected with the clutch block holder 352. The limiting block 3522 is located in the groove 3504, and the limiting block 3522 is adapted to a shape of the groove 3504. When the driving motor 22 drives the output shaft 221 to rotate, the clutch block 351 is driven by the clutch block holder 352 to rotate. Under an action of centrifugal force, the pulling force of the tension spring 353 is overcome, so that the clutch block 351 moves along the limiting block 3522 in a direction away from the clutch block holder 352, and abuts against an inner wall of the sprocket disc 321, thereby driving the sprocket 32 to rotate, realizing a rotation of the chain 33 and a cutting operation.

When the operator brakes the tool or the tool suddenly stalls during work, the rotation speed of the driving motor decreases in a short period of time. At this time, a centrifugal force of the clutch block 351 of the clutch 35 is less than a pulling force of the tension spring 353, so that an outer surface of the clutch block 351 is separated from an inner surface of the sprocket disc 321 and the tool stops working. Therefore, a load of a sudden braking or blocked rotor will not be directly loaded on the motor shaft or other mechanical structures, and a duration life of the tool will be increased. In some embodiments, a braking assembly 6 is also included. A plurality of grooves are arranged on a circumference of an outer surface of the sprocket disc 321 and a braking steel belt 641 is arranged around the braking assembly 6. When a braking handle 642 is pulled, the braking steel belt 641 is tightened to drive the sprocket 32 to stop rotating, and the braking handle 642 is arranged on the housing 1.

With the chainsaw of the disclosure, the chain meshing with the sprocket teeth is located within the outer diameter of the sprocket gasket through enlarging the diameter of the sprocket gasket. And the distance between the top of the riveting head and the surface of the transmission teeth is greater than the distance between the sprocket gasket and the sprocket teeth, so that there is a large fall between the riveting head of the chain and the transmission teeth, the fall is much larger than the gap between the sprocket teeth and the sprocket gasket, which prevents the transmission teeth of the chain from being caught in the gap between the sprocket teeth and the sprocket gasket and avoids a chain movement stuck and even an occurrence of high-risk failures such as chain running, chain jumping, and de-chaining.

The disclosure is provided with a plurality of ventilation holes on the sprocket gasket, so that when the sprocket is running, the sprocket may enable the air to enter through holes of sprocket gasket on a side of the sprocket and follow the tooth shape of the sprocket teeth to exhaust radially, so that airflow generated by an operation of the sprocket is equivalent to a small fan. In this way, the airflow is used to synchronously blow sawdust generated in a process of chain cutting, so as to avoid a continuous accumulation of sawdust in a gap between the sprocket disc and the housing and prevent the sawdusts from filling the braking steel belt or other internal components. This eliminates an occurrence of failures such as micro switch failure, braking steel belt stuck and so on due to the sawdusts accumulation.

With the disclosure, through mounting the clutch in the sprocket disc, when an operator brakes the tool or a tool suddenly stalls during a work process, a rotation speed of the motor decreases in a short time, and a centrifugal force of the clutch block of the clutch is less than a tension force of the tension spring, so that an outer surface of the clutch block will be separated from an inner surface of the sprocket disc, and the tool stops working to avoid sudden braking or stuck load directly loading on a motor shaft or the rest of the mechanical structure, which increases the duration life of the tool, reduces costs and is easy for maintenance.

Figure 47:
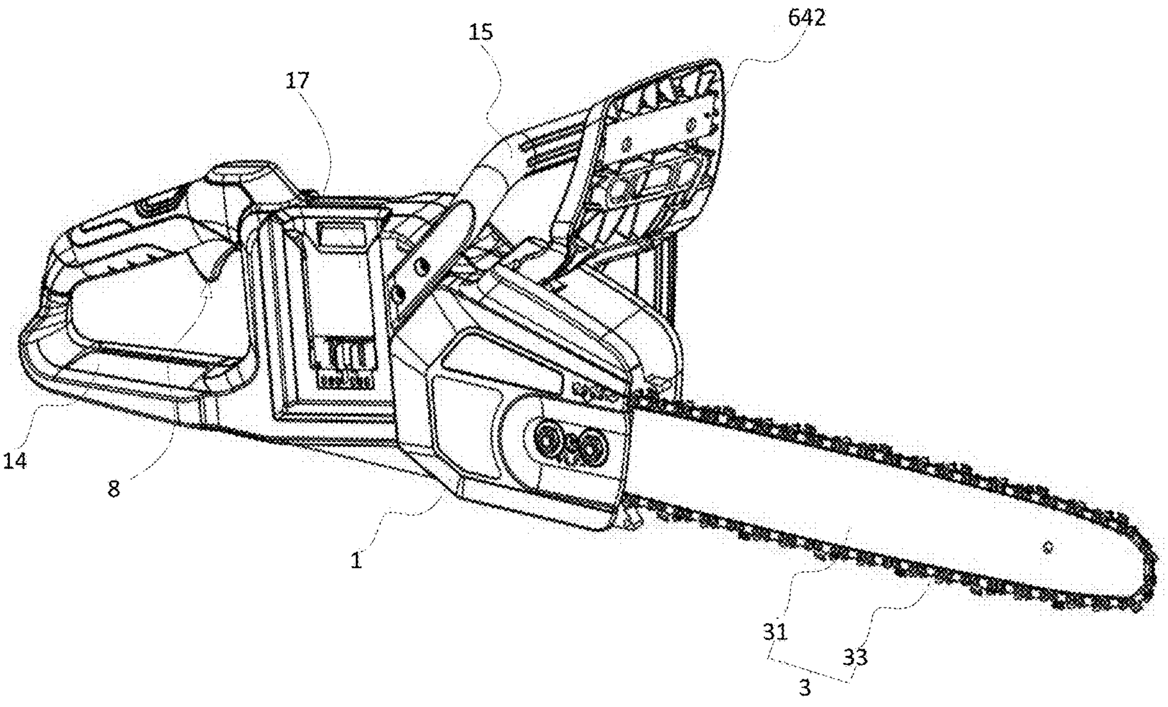
FIG. 47 is an axonometric view of the chainsaw in an embodiment of the disclosure.
Figure 48:
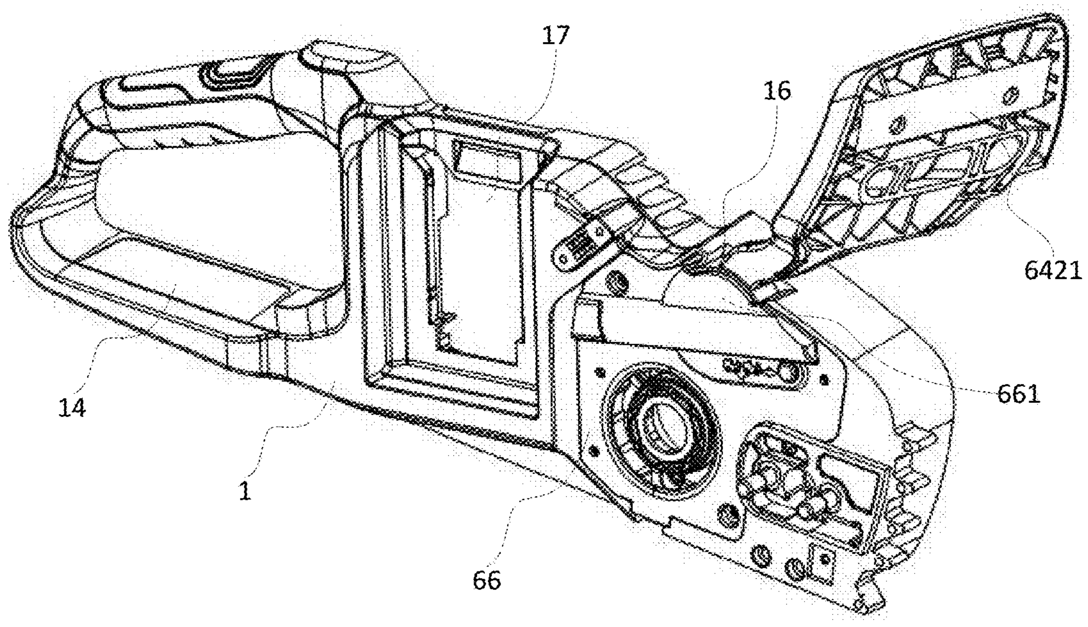
FIG. 48 is an assembly view of the braking handle, the housing and the middle blocking plate of the chainsaw in an embodiment of the disclosure.

Please refer to FIG. 47 and FIG. 48. The disclosure provides a chainsaw. The chainsaw includes the housing 1, the cutter assembly 3, the power assembly (not shown in figures), a control assembly 8 and a braking mechanism (not shown in figures). The cutter assembly 3 is mounted on the housing 1. The power assembly is housed in the housing 1 and is used to drive the cutter assembly 3 to cut. The control assembly 8 is mounted on an end of the housing 1 away from the cutter assembly 3, and is used to control the power assembly. The braking mechanism is mounted on the housing 1 near the cutter assembly 3 for braking the power assembly.

Please refer to FIG. 47 and FIG. 48. In an embodiment of the disclosure, the housing 1 includes two housings matched with each other, and the two housings together define a housing cavity (not marked in the figure), and the housing cavity is used for mounting parts of the chainsaw. The housing 1 is substantially box-shaped, and one end in a longitudinal direction of the housing 1 is open and used to mount the cutter assembly 3, so that the cutter assembly 3 is connected in a transmission with the internal power assembly.

Please refer to FIG. 47 and FIG. 48. In an embodiment of the disclosure, an end of the housing 1 away from the cutter assembly 3 defines the rear handle 14. The rear handle 14 is surrounded by the two housings in the housing 1, which means that the rear handle 14 is integrally formed with the housing 1. With this arrangement, on the one hand, a stability of the connection between the rear handle 14 and the housing 1 is enhanced, which is convenient for the user to hold the chainsaw for cutting. On the other hand, production steps and flow of the housing 1 are simplified, and the production cost of the chainsaw is reduced.

Additionally, the control assembly 8 is mounted at the rear handle 14. The control assembly 8 includes a control board (not shown in the figures) and a switch trigger (not shown in the figures). The control board is mounted inside the housing 1 to accept commands transmitted by the switch trigger and control an on and off of the power assembly. The switch trigger is mounted at the rear handle 14 and is connected with the control board. One end of the switch trigger is penetrated into housing 1, and is rotatably connected with an inner side wall of the housing 1. The other end of the switch trigger extends outside the housing 1, which is convenient for the user to toggle the switch trigger with fingers. In another embodiment of the disclosure, the rear handle 14 may also be arranged in a separate way from the housing 1, it is only necessary that a connection stability between the rear handle 14 and the housing 1 and a practicability of the user holding the chainsaw may be ensured.

Please refer to FIG. 47 and FIG. 48. In an embodiment of the disclosure, the front handle 15 is mounted around the housing 1. The front handle 15 is located between the rear handle 14 and the braking mechanism, and the front handle 15 is detachably mounted on the housing 1. The front handle 15 may further ensure the stability and portability of the chainsaw held by the user, and may complete the cutting operation more effectively.

Please refer to FIG. 47 and FIG. 48. In an embodiment of the disclosure, the cutter assembly 3 includes a chain 33 and a guiding plate 31 for holding the chain 33. One end of the guiding plate 31 is fixed inside the housing 1 through a fastener, and the other end of the guiding plate 31 extends forward along a length direction of the housing 1. The chain 33 is arranged around a side wall of the guiding plate 31. The chain 33 is rotatably connected on the guiding plate 31 and may rotate at a high speed under a driving action of the power assembly to cut.

Please refer to FIG. 47 and FIG. 48. In an embodiment of the disclosure, the power assembly includes a driving unit for driving the cutter assembly and a power source for supplying power to the driving unit. The power source includes a power socket 17 and a battery pack (not shown in the figures) detachably connected with the power socket 17. Further, the power socket 17 is arranged between the rear handle 14 and the front handle 15, so that a center of gravity of the chainsaw is located at center position of the rear handle 14 perpendicular to the housing, and a width of both sides of the power socket 17 is within a range of twice of a width of the housing 1. This arrangement may effectively ensure the stability of the chainsaw when it is placed.

In an embodiment of the disclosure, there are two power sockets 17 arranged symmetrically, and they are located on two sides in a width direction of the housing 1 respectively, so that the battery pack is plugged outside the housing. This arrangement may facilitate a replacement and charging of the battery pack, which further improves the practicability of the chainsaw.

The power source further includes an engaging component (not shown in the figures) arranged on the housing 1 for jointing the battery pack. The power socket 17 is arranged correspondingly to the engaging component, so that the battery pack is detachably connected with the housing 1 through the engaging component, and is connected with the power socket 17. In the embodiment, the engaging component includes a cavity and a guiding groove arranged in the cavity, and the engaging component is symmetrically arranged on both sides of the housing 1. The power socket 17 is housed in the cavity. The battery pack is clamped and housed in the cavity by the guiding groove, so that an connection between the battery pack and the power socket is stable, which effectively prevents an abnormal power supply of the chainsaw caused by a falling off between the battery pack and the cavity.

It should be noted that, in the disclosure, the engaging component with a combination of the cavity and the guiding groove is only taken as an example for illustration. In other embodiments of the disclosure, the engaging component may also be a structure that may be used to connect or house a battery pack, such as a holding groove, a connecting protrusion, or the like arranged on the housing 1, and one engaging component may engage and connect at least one battery pack, which means that a structure of the power source shown in the figures in the description of the disclosure is only exemplary and should not be limited thereto.

Please refer to FIG. 47 through FIG. 54. In an embodiment of the disclosure, the housing 1 is provided with the braking handle 642 located on a front side of the front handle 15 on the housing 1. The braking handle 642 is connected in a transmission with the braking mechanism. The user may toggle the braking handle 642 to brake the power assembly through a communication between the braking handle 642 and the brake mechanism, thereby controlling an emergency stop of the chainsaw. A guard plate 6421 is also integrated on the braking handle 642, and a plate surface of the guard plate 6421 faces an extension direction of the cutter assembly. On one hand, the guard plate 6421 may facilitate the user to toggle the braking handle 642, and on the other hand, the guard plate 6421 may block the sawdusts generated when the chainsaw is cutting, which prevents the sawdusts from splashing towards the user, thereby reducing an occurrence of accidental injury to the user.

In addition, the braking mechanism may be any of an electronic braking mechanism and/or a mechanical braking mechanism. The mechanical braking mechanism is a braking mechanism such as a torsion spring brake, a steel belt brake brake, or an electromagnetic brake through a rotation of the braking handle 642 in linkage. The electronic braking mechanism is a braking mechanism that controls the power-off or instantaneous short-circuit braking of the motor through the rotation of the brake handle 642 and linkage to realize the action of the signal switch. A combination of electronic braking and mechanical braking is a combination of braking mechanisms that firstly realizes a power-off or instantaneous short-circuit braking of the motor, and then realizes such as torsion spring brakes, steel belt brakes, or electromagnetic brakes, through the rotation of the brake handle 642 in linkage to realized an action of the signal switch. A specific arrangement form of the braking mechanism in the disclosure is not limited herein.

Figure 49:
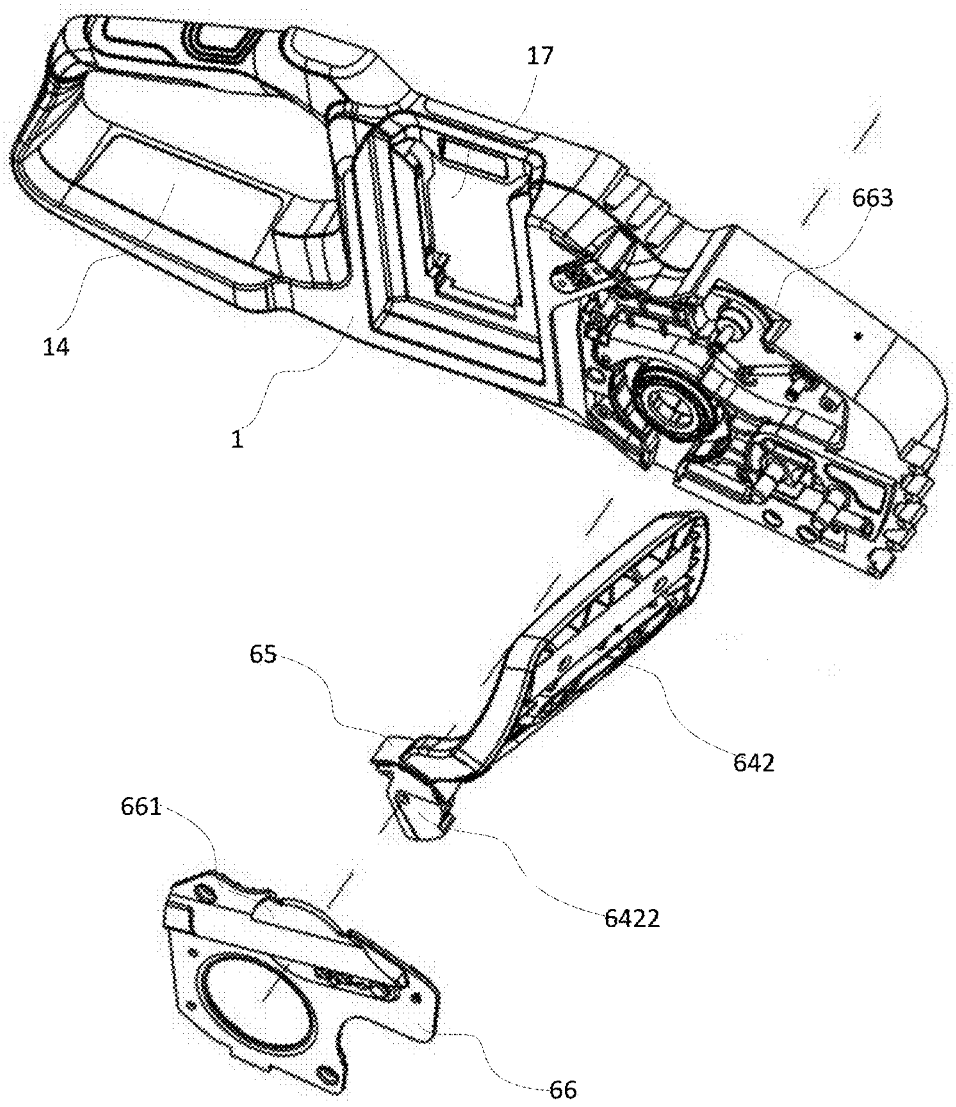
FIG. 49 is an exploded schematic view of the braking handle, the housing and the middle blocking plate of the chainsaw in an embodiment of the disclosure.

Please refer to FIG. 48 through FIG. 49. In an embodiment of the disclosure, a middle blocking plate 66 is fixed to one side surface in the width direction of the housing 1. An accommodating cavity 663 is defined between the middle blocking plate 66 and the housing 1, and one end of the braking handle 642 is set in the accommodating cavity 663 and is rotatably connected with the housing 1. In addition, the housing 1 is provided with an opening 16 for the braking handle 642 to move. The opening 16 is located on a side of the front handle 15 of the housing 1 away from the rear handle 14, and according to a size of the opening 16, a rotation range of the braking handle 642 is from 0 degree and 30 degrees.

Figure 51:
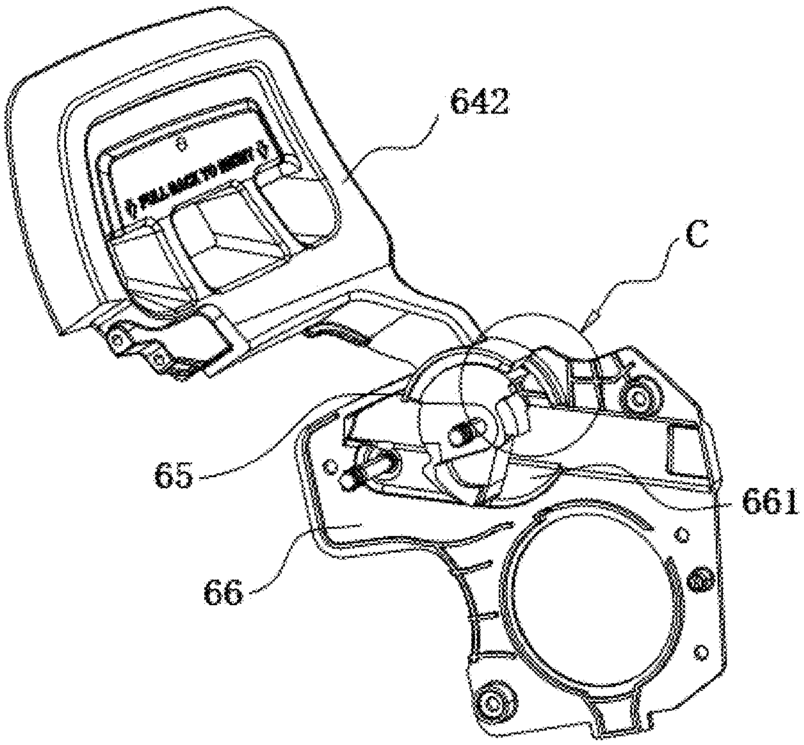
FIG. 51 is a schematic structural view of an eccentric block of the chainsaw in an embodiment of the disclosure.
Figure 53:
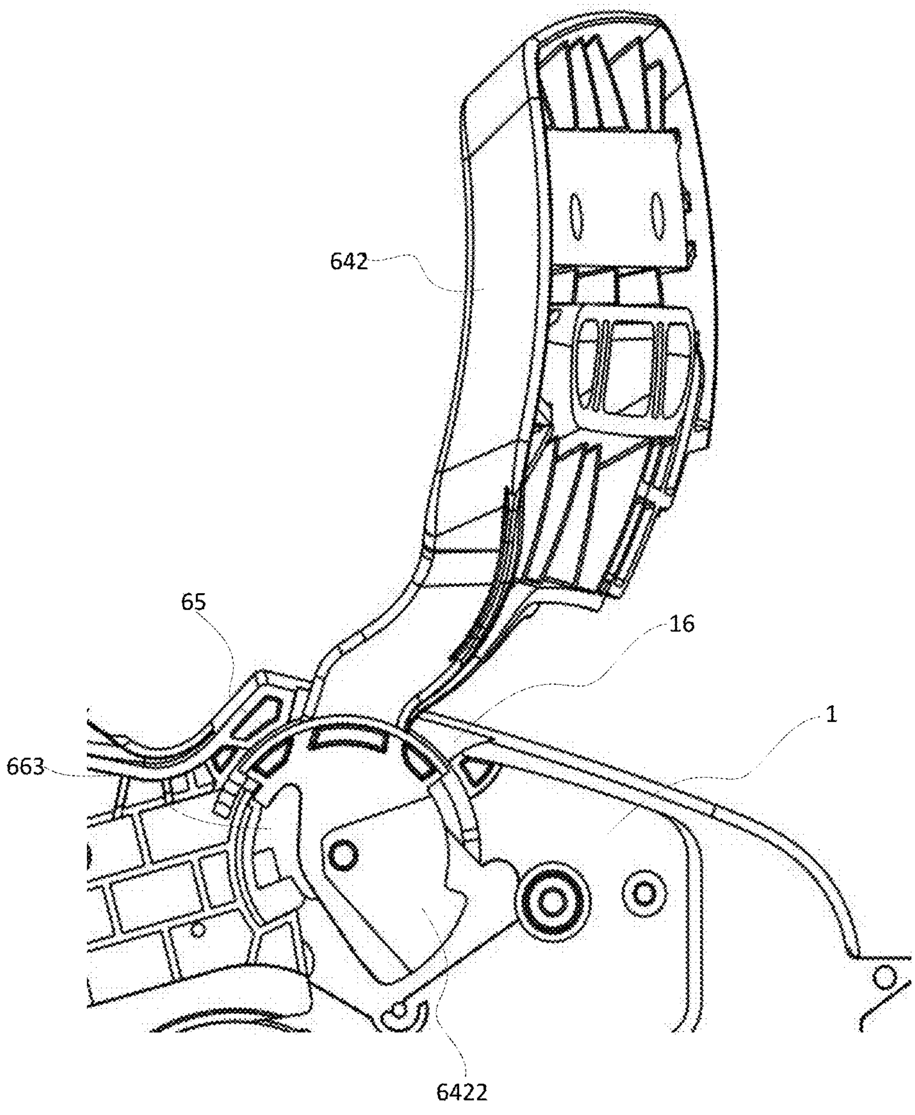
FIG. 53 is a schematic view of the chainsaw in an embodiment of the disclosure before the braking handle is started.
Figure 54:
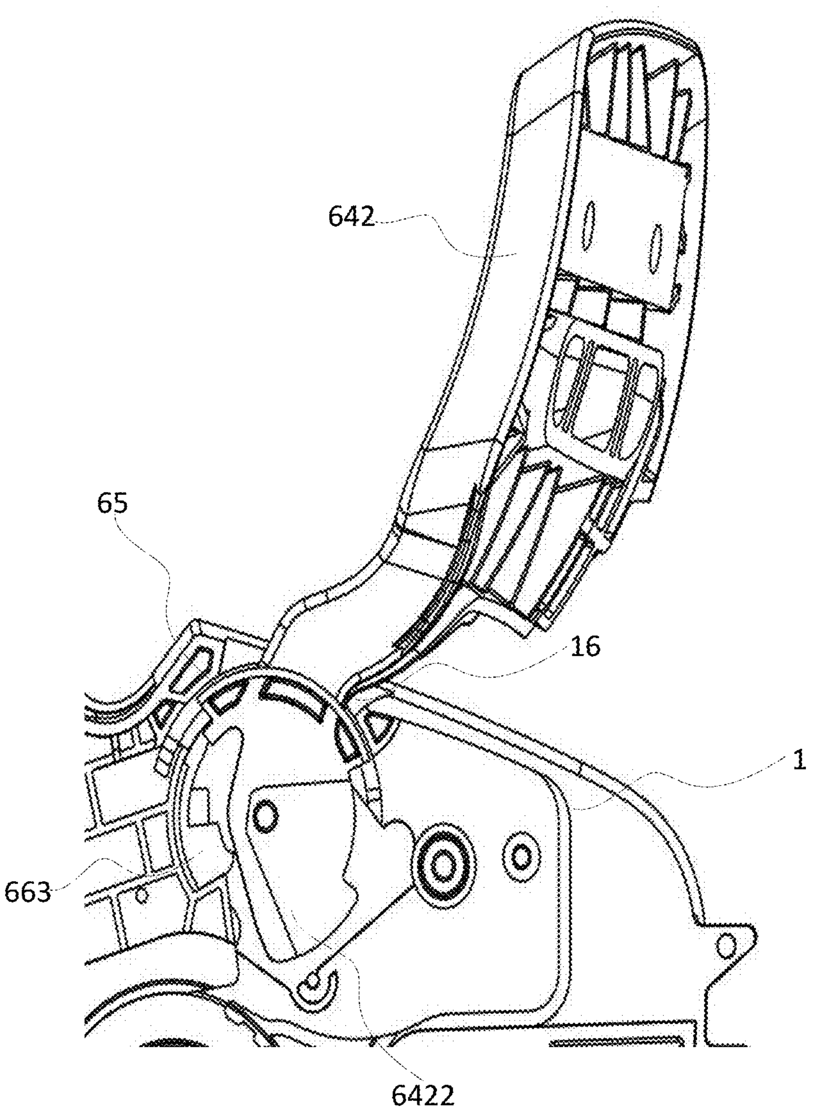
FIG. 54 is a schematic view of the chainsaw in an embodiment of the disclosure after the braking handle is started.

Please refer to FIG. 51, FIG. 53 and FIG. 54. In an embodiment of the disclosure, the braking handle 642 is integrally formed with a dust-proof plate 65 which abuts against an inner side wall of the opening 16 of the housing 1. In addition, the dust-proof plate 65 and the inner side wall of the opening 16 on the housing 1 are rotatably matched with each other, so that the opening 16 may be closed, thereby reducing an occurrence of sawdust entering the chainsaw from the opening 16 on the housing 1 and achieving a dust-proof effect, which prolongs the duration life of the machine. In an embodiment of the disclosure, the dust-proof plate 65 is circular arc-shaped, and its arc is from 60 degrees and 180 degrees. According to the rotation range of the braking handle 642 from 0 degree to 30 degrees, a radian of the dust-proof plate 65 is set to be from 60 degrees to 180 degrees, so that when the braking handle 642 is rotated to a braking limit position, the dust-proof plate 65 may always close the opening 16, and a gap between the inner side wall of the opening 16 of the housing 1 does not change, which achieves a dust-proof effect.

Figure 50:
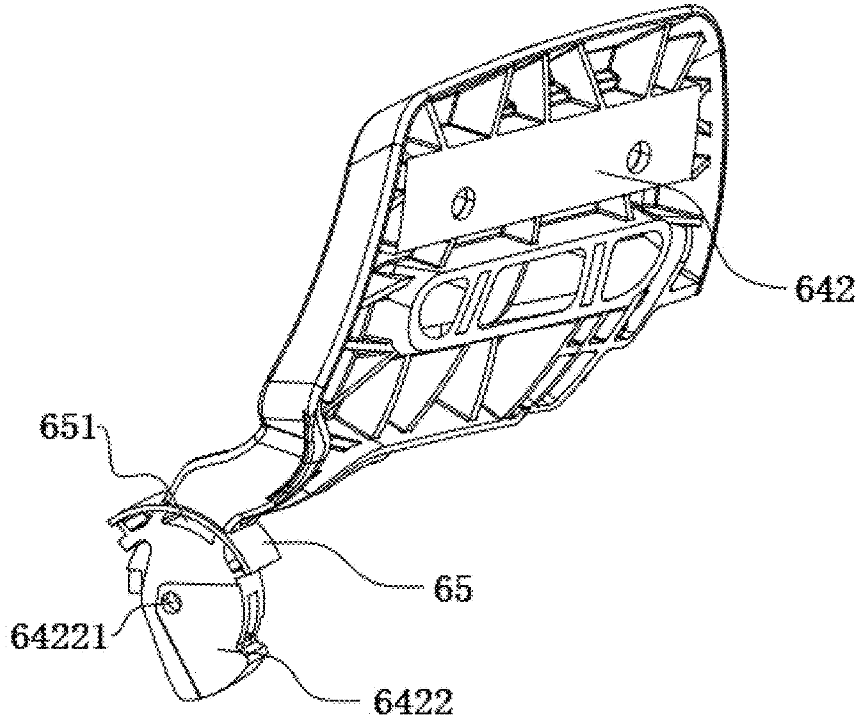
FIG. 50 is a schematic structural view of a dust-proof plate of the chainsaw in an embodiment of the disclosure.
Figure 52:
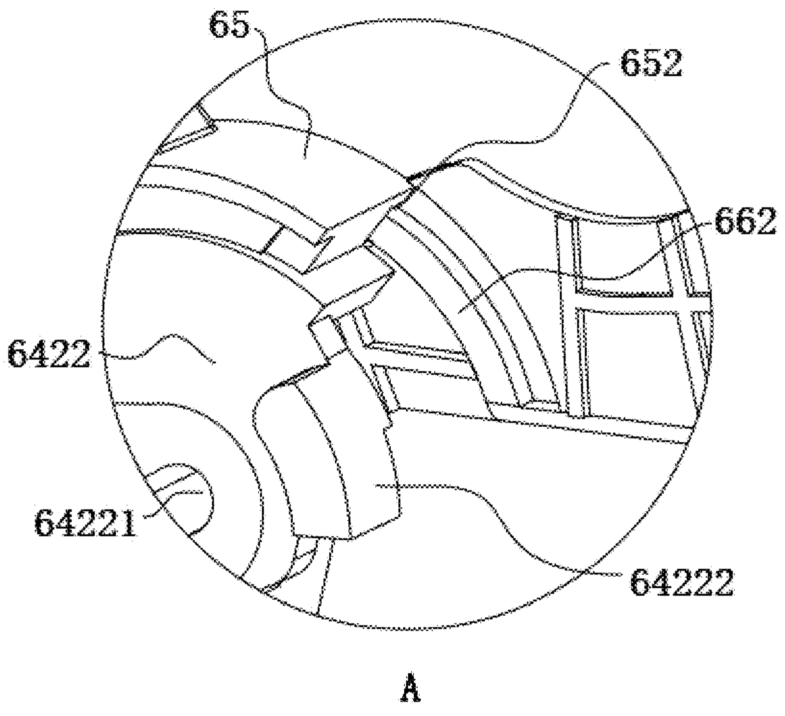
FIG. 52 is an enlarged view of part C in FIG. 51, mainly showing a structure of a clamping groove in the dust-proof plate.

Please refer to FIG. 50, FIG. 51 and FIG. 52. The dust-proof plate 65 is provided with a plurality of weight reduction grooves 651 which are located on a side wall of the dust-proof plate 65, and the plurality of weight reduction grooves 651 are arranged at intervals along an arc of the dust-proof plate. In this embodiment, three weight reduction grooves 651 are arranged on the dust-proof plate 65. Through arranging the weight reduction groove 651 on the dust-proof plate 65, a weight of the entire braking handle 642 may be reduced, which facilitates the user to toggle the braking handle 642, and reduces a production cost of the braking handle 642. Both sides of the dust-proof plate 65 in a width direction define arc-shaped clamping grooves 652 which are embedded and matched with arc-shaped clamping blocks 662 on the housing 1 and the middle blocking plate 66. On one hand, it improves a stability of the braking handle 642 when the braking handle 642 rotates. On the other hand, through a matching of the housing 1, the dust-proof plate 65 and the middle blocking plate 66, a sealing performance of the opening 16 on the housing 1 is greatly improved.

Please refer to FIG. 50 and FIG. 51. In an embodiment of the disclosure, an eccentric block 6422 is included at one end of the braking handle 642 rotatably connected with the housing 1. A side wall of the eccentric block 6422 is integrally formed with a plate surface of the dust-proof plate 65, and a thickness of the eccentric block 6422 is slightly less than a width of the plate surface of the dust-proof plate 65. A rotation shaft hole 64221 is arranged in a center of the eccentric block 6422, and the rotation shaft hole 64221 is rotatably connected with a pin inside the housing 1.

Please refer to FIG. 51. A protrusion 64222 is defined on one side of the eccentric block 6422 away from the middle blocking plate 66, and the protrusion 64222 is embedded and matched with a corresponding arc-shaped groove (not shown in the figures) on the housing 1. In an embodiment of the disclosure, there are two protrusions 64222 arranged on the eccentric block 6422. When the eccentric block 6422 is rotating, the protrusion 64222 may move along an arc of the arc-shaped groove, which increases a stability of a fixing of the braking handle 642 to the housing 1 on one hand, and increases a rotation stability of the braking handle 642 on the other hand.

Please refer to FIG. 48 and FIG. 51. In an embodiment of the disclosure, a sealing plate 661 is defined on the middle blocking plate 66 corresponds to the eccentric block 6422, and the sealing plate 661 is matched with a structure of the dust-proof plate A side wall of the sealing plate 661 abuts against an inner side wall of the dust-proof plate 65, and the side wall of the sealing plate 661 is matched with a shape of the dust-proof plate 65. Through inserting the sealing plate 661 of the middle blocking plate 66 into the eccentric block 6422, and enabling the side wall of the sealing plate 661 to abut against the inner side wall of the dust-proof plate 65, a sealing at a rotation position of the braking handle 642 may be realized, which further improves the sealing, thereby preventing sawdusts from entering the chainsaw through a gap and causing damage to the chainsaw.

In summary, in the disclosure, the dust-proof plate 65 abuts against the inner side wall of the opening 16 of the housing 1, so that the opening 16 may be closed, thereby reducing the occurrence of sawdusts entering the chainsaw from the opening 16 of the housing 1, achieving a dust-proof effect and prolonging the duration life of the machine. According to the rotation range of the braking handle 642 from 0 degree to 30 degrees, a radian of the dust-proof plate 65 is set to be from 60 degrees to 180 degrees, so that when the braking handle 642 is rotated to a braking limit position, the dust-proof plate 65 may always close the opening 16, and a gap between the inner side wall of the opening 16 of the housing 1 does not change, which achieves a dust-proof effect. Through inserting the sealing plate 661 of the middle blocking plate 66 into the eccentric block 6422, and enabling the side wall of the sealing plate 661 to abut against the inner side wall of the dust-proof plate 65, a sealing at a rotation position of the braking handle 642 may be realized, which further improves the sealing, thereby preventing sawdusts from entering the chainsaw through a gap and causing damage to the chainsaw.

The above-mentioned embodiments merely illustrate the principles and effects of the disclosure, but are not intended to limit the disclosure. Anyone skilled in the art may modify or change the above embodiments without departing from the range of the disclosure. Therefore, all equivalent modifications or changes made by those with ordinary knowledge in the technical field without departing from the range and technical disclosed in the disclosure should still be covered by the claims of the disclosure.

What is claimed is:

1. A container, configured to be mounted on a cutting tool, the container comprising:
- a box body, provided with a liquid storage cavity, the liquid storage cavity being provided with a liquid filling opening and a liquid suction opening,
- a cover, detachably mounted on the liquid filling opening, and the cover being provided with a one-way ventilation structure,
- a suction device, arranged outside the box body,
- a first tube, one end of the first tube being connected with the liquid suction opening, and the other end of the first tube being connected with a liquid suction port of the suction device, and
- a second tube, one end of the second tube being connected with a liquid drainage port of the suction device, and the other end of the second tube extending to a part to be lubricated or cooled of the cutting tool; wherein
- the one-way ventilation structure comprises a through hole arranged on the cover and a one-way valve mounted in the through hole, and a filter part to filter air is mounted on a side of the one-way valve away from an oil storage cavity of the container.

2. The container according to claim 1, wherein
- the cover is provided with an external thread, the external thread is provided with a screw positioning rib, the liquid filling opening is provided with an internal thread matched with the external thread, when the cover is screwed to a set position, an end of the internal thread facing the cover abuts on the screw positioning rib.

3. The container according to claim 2, wherein
- when the cover is screwed to the set position, a rotational torque of the cover is from 4 N·m to 7 N·m.

4. The container according to claim 1, wherein
- a filter device is arranged at one end of the first tube connected with the liquid suction opening.

5. The container according to claim 1, wherein
- the cover is provided with a sealing part and a sinking groove matched with a disassembling tool.

6. The container according to claim 1, wherein
- the cover is provided with a mounting hole, the mounting hole is provided with a spherical cavity.

7. The container according to claim 1, wherein
- the cover further comprises a pulling wire to prevent the cover from being lost, one end of the pulling wire is connected with the cover, the other end of the pulling wire extends into the liquid filling opening and is connected with a blocking part capable of entering the container, and the blocking part is an elastically deformable bracket.

* * * * *